United States Patent
Kii et al.

(10) Patent No.: US 7,301,856 B2
(45) Date of Patent: Nov. 27, 2007

(54) REPRODUCTION METHOD AND APPARATUS, AND RECORDING METHOD AND APPARATUS

(75) Inventors: Manabu Kii, Tokyo (JP); Seiji Ohbi, Tokyo (JP); Takashi Kawakami, Tokyo (JP); Masato Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 596 days.

(21) Appl. No.: 10/508,536

(22) PCT Filed: Mar. 31, 2003

(86) PCT No.: PCT/JP03/04077

§ 371 (c)(1),
(2), (4) Date: Sep. 27, 2004

(87) PCT Pub. No.: WO03/083867

PCT Pub. Date: Oct. 9, 2003

(65) Prior Publication Data

US 2005/0129232 A1 Jun. 16, 2005

(30) Foreign Application Priority Data

Apr. 1, 2002 (JP) ............................. 2002-099275
Jun. 28, 2002 (JP) ............................. 2002-190807

(51) Int. Cl.
*G11B 7/085* (2006.01)
(52) U.S. Cl. ............... 369/30.09; 369/47.1; 369/53.11; 386/126; 380/228

(58) Field of Classification Search ............. 369/30.09, 369/30.08, 30.07, 30.05, 47.1, 47.13, 53.11, 369/53.1, 83, 84; 386/126; 380/228, 227
See application file for complete search history.

(56) References Cited

U.S. PATENT DOCUMENTS 6,243,330 B1 * 6/2001 Oshima ....................... 380/228
2004/0130975 A1 * 7/2004 Kii et al. ................... 369/30.09

FOREIGN PATENT DOCUMENTS

| JP | 5-325500 | 12/1993 |
| JP | 2000-4421 | 1/2000 |
| JP | 2000-32378 | 1/2000 |
| JP | 2000-83217 | 3/2000 |
| JP | 2001-75869 | 3/2001 |
| JP | 2002-42425 | 2/2002 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

Decrypting information corresponding to a selected track, file pointer information, and index information are read out from a track information table having the decrypting information corresponding to each track, the file pointer information showing one of a plurality of files with headers, and the index information showing a position in the file. The header of the file with the header is read out on the basis of the file pointer information and position information in the file corresponding to the index information is detected from the header. A part of data of the file is read out on the basis of the position information and the read-out data is decrypted on the basis of the decrypting information.

14 Claims, 48 Drawing Sheets

RECORDABLE AREA
LEAD-OUT
LEAD-IN
(ADIP CONTROL INFORMATION)

← MOVING DIRECTION OF MAGNETIC WALL

*Fig. 20*

| RECORDING BLOCK (RB) NO. | BIT |
|---|---|
| 0 | 0 |
| 1 | 0 |
| 2 | 1 |
| 3 | 0 |
| ⋮ | ⋮ |

*Fig. 32*
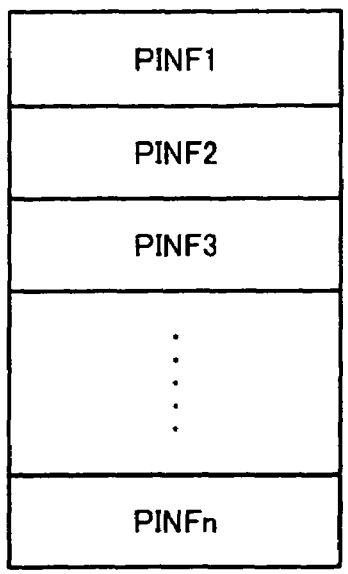
*Fig. 33A*
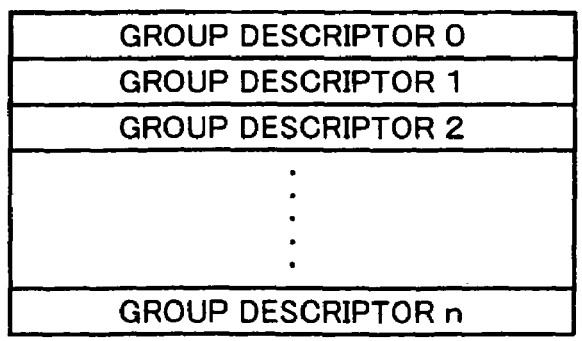
*Fig. 33B*
| START TRACK NO. | END TRACK NO. | GROUP NAME | FLAG |
|---|---|---|---|

Fig. 34A

| TRACK DESCRIPTOR 0 |
|---|
| TRACK DESCRIPTOR 1 |
| TRACK DESCRIPTOR 2 |
| ⋮ |
| TRACK DESCRIPTOR n |

Fig. 34B

| CODING SYSTEM | | |
|---|---|---|
| COPYRIGHT MANAGEMENT INFORMATION | KEY INFORMATION | |
| PART NO. | ARTIST NAME | TITLE |
| ORIGINAL MUSIC PIECE ORDER | RECORDING TIME | |

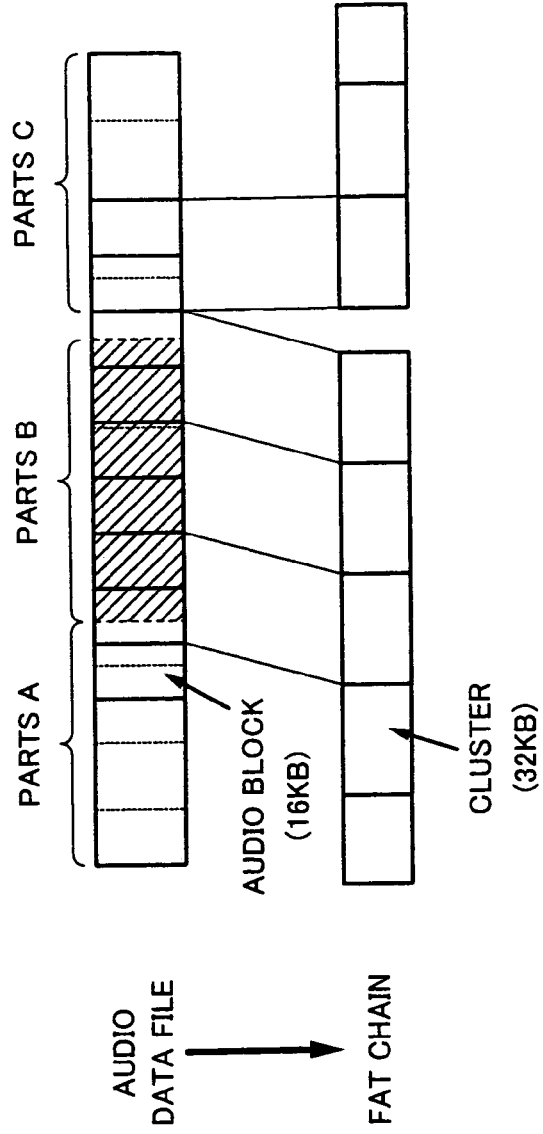
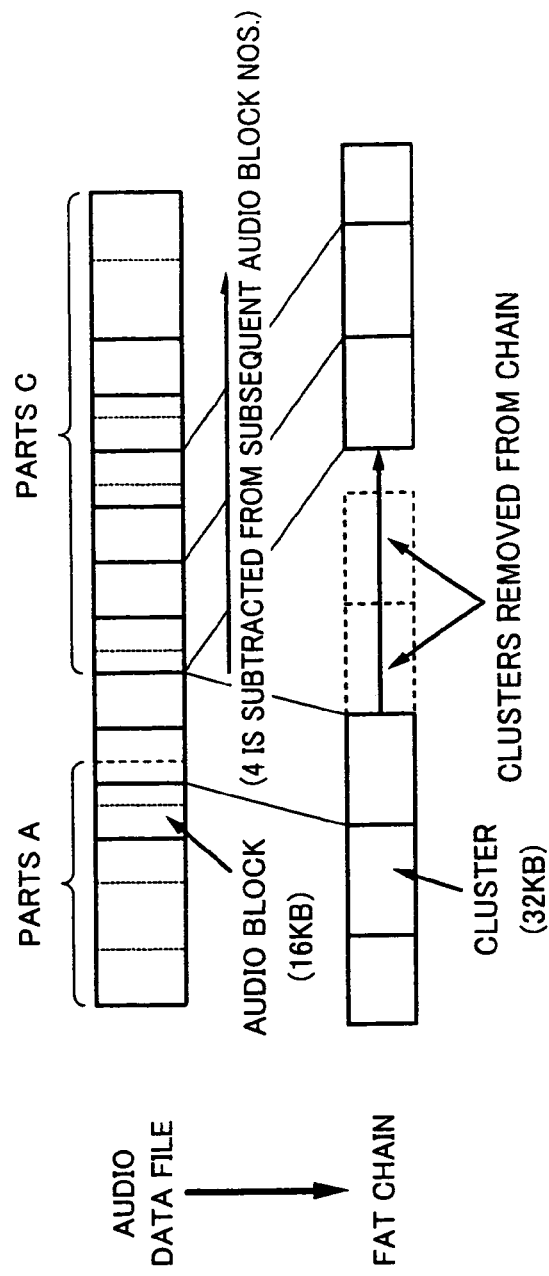
Fig. 39A
Fig. 39B

Fig. 45A

| GROUP DESCRIPTOR 0 |
|---|
| GROUP DESCRIPTOR 1 |
| GROUP DESCRIPTOR 2 |
| ⋮ |
| GROUP DESCRIPTOR n |

Fig. 45B

| START TRACK NO. | END TRACK NO. | NAME POINTER | FLAG |
|---|---|---|---|

Fig. 46A

| TRACK DESCRIPTOR 0 |
|---|
| TRACK DESCRIPTOR 1 |
| TRACK DESCRIPTOR 2 |
| |
| TRACK DESCRIPTOR n |

Fig. 46B

| CODING SYSTEM | | | |
|---|---|---|---|
| AUDIO FILE | INDEX | ARTIST NAME | TITLE |
| ORIGINAL MUSIC PIECE ORDER | | RECORDING TIME | |

Fig. 49
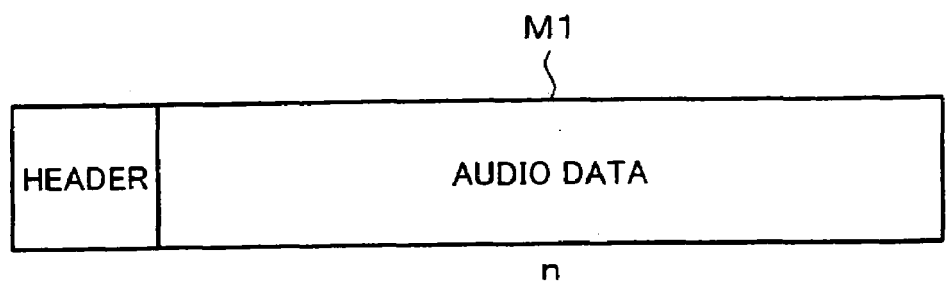
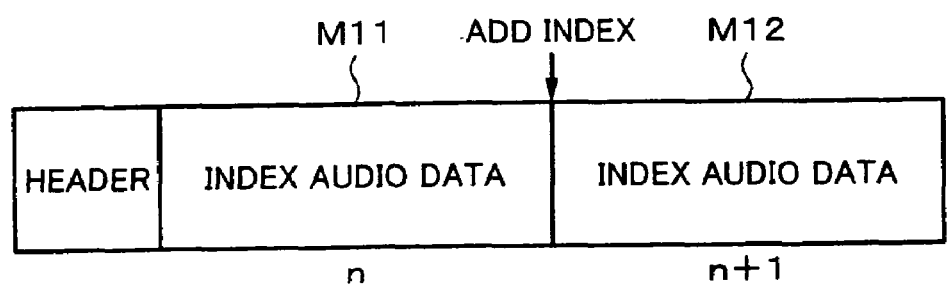
Fig. 50
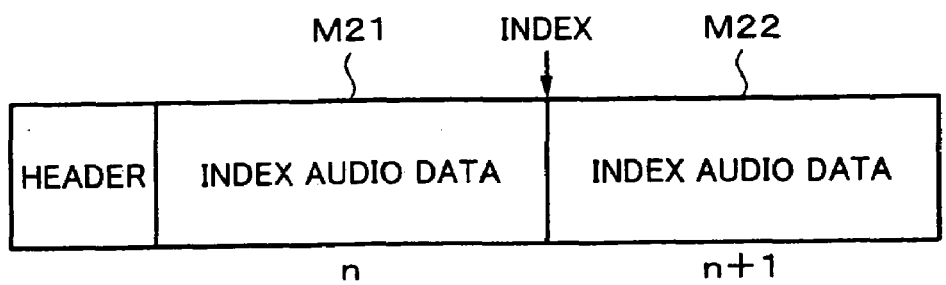
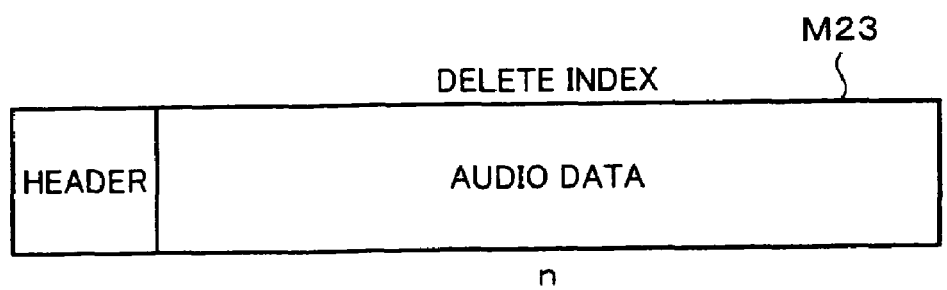

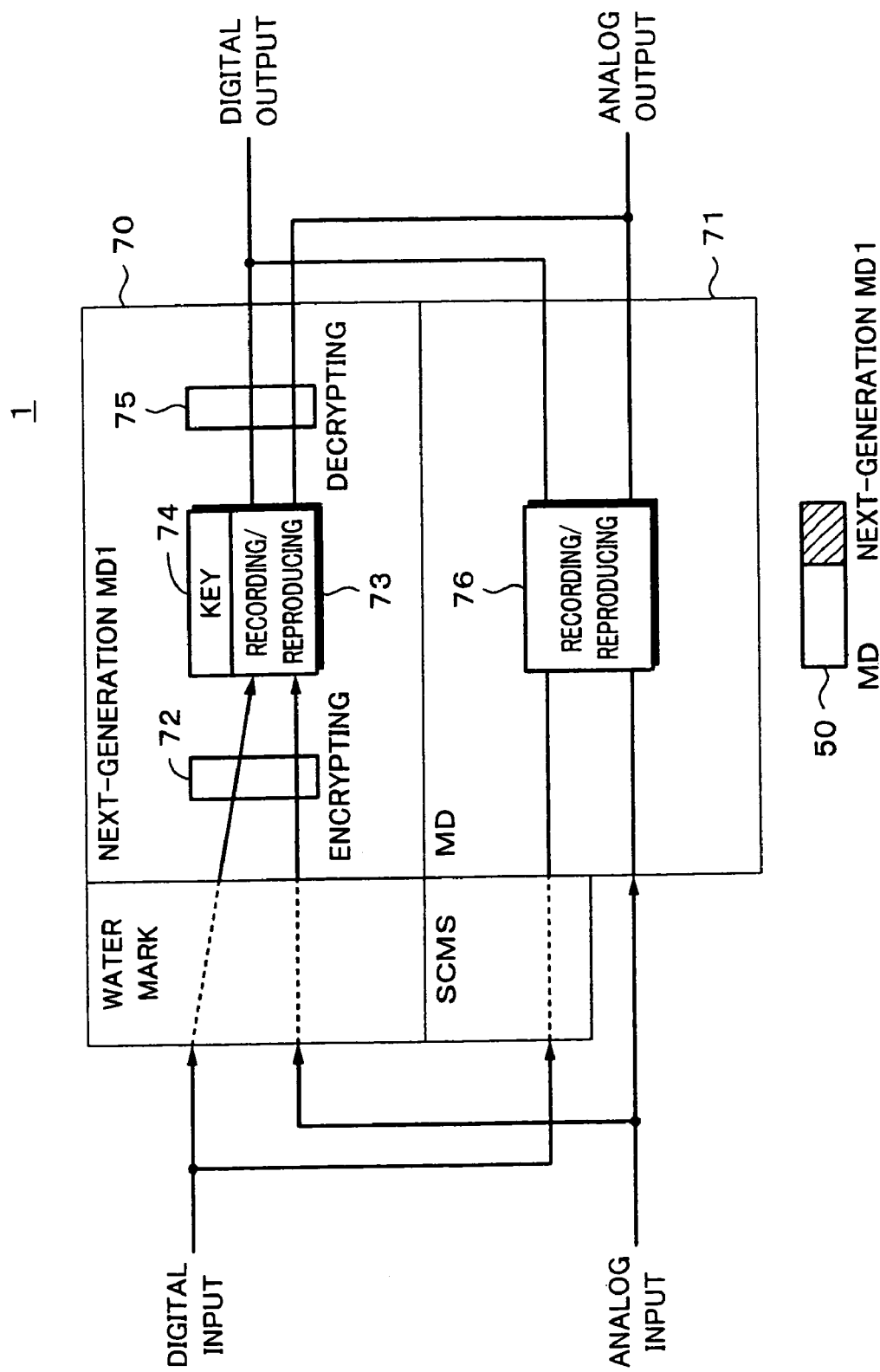

REPRODUCTION METHOD AND APPARATUS, AND RECORDING METHOD AND APPARATUS

TECHNICAL FIELD

The invention relates to a recording medium and a recording apparatus obtained by expanding a magnetooptic disc used in an existing MD system to thereby realize compatibility with the existing MD system.

BACKGROUND ART

As a recording medium for recording or reproducing digital audio data, a mini disc (MD) as a magnetooptic disc having a diameter of 64 mm and enclosed in a cartridge has widely been spread.

In an MD system, ATRAC (Adaptive TRansform Acoustic Coding) is used as a compression system of the audio data. ATRAC is a technique such that the audio data fetched at a predetermined time window is compression-coded by using MDTC (Modified Discrete Cosine Transform). Music data is compressed into ⅕ to 1/10 by ATRAC.

A convolutional code called ACIRC (Advanced Cross Interleave Reed-Solomon Code) is used as an error correction system and EFM (8 to 14 Modulation) is used as a modulation system. ACIRC is a convolutional code for executing error correction coding doubly to a C1 series (vertical direction) and in an oblique direction (C2 series) and a powerful error correcting process can be executed to sequential data such as audio data. In the case of the convolutional code, however, a sector for linking is necessary at the time of rewriting the data. ACIRC system and EFM similar to those for the existing compact disc (CD) are fundamentally used.

U-TOC (User TOC (Table Of Contents)) is used for management of the music data. That is, an area called U-TOC is provided for an inner rim of a recordable area on the disc. In the existing MD system, U-TOC is management information which is rewritten in accordance with order of music pieces, recording, erasure, or the like of tracks (audio tracks/data tracks) and manages a start position, an end position, and a mode with respect to each track (parts constructing the track).

The disc of the MD system is small and low-priced and has excellent characteristics as a medium for recording and reproducing the audio data. The MD system, therefore, has widely been spread.

However, some improvements have been needed in the existing MD system as a result of the passage of time. One of them is affinity with computers.

That is, music distribution for distributing the audio data on a network has extensively been performed owing to the spread of personal computers and the networks. There is a case where the personal computer is used as an audio server and the user downloads his favorite music pieces into a portable player and reproduces music. In the existing MD system, the affinity with the personal computers is insufficient. Therefore, for example, it is demanded to introduce a general management system such as an FAT system or the like and raise the affinity with the personal computers.

Since the audio data can be easily copied when the affinity with personal computers rises, necessity of protecting the copyright of the audio data increases. It is, therefore, demanded to encrypt the audio data and record it to thereby further enhance the protection of the copyright.

Further, a recording capacity of the disc of the existing MD system is equal to about 160 MB and such a capacity is no longer large. Therefore, it is demanded to increase the recording capacity while keeping the compatibility with the existing MD.

It is, therefore, an object of the invention to provide editing method and apparatus which can efficiently manage audio data.

DISCLOSURE OF INVENTION

To solve the foregoing problems, according to the invention of claim 1, there is provided a recording medium on which each independent data is recorded, comprising:

a single file storing area in which the respective data is recorded as a single file;

a position information recording area in which a position information file showing a recording position of each of the data in the single file is recorded; and a parts information recording area in which a parts information file having parts information that identifies each of the data and is associated with the position information in the position information file and decrypting information corresponding to each of the data is recorded.

According to the invention of claim 4, there is provided a reproducing method of reproducing designated recording data recorded on a recording medium, comprising the steps of:

reading out decrypting information of the designated recording data and position information recording position information showing a recording position of position information read out from a position information file in which the position information showing a recording position of the designated recording data has been recorded from a recording data information file;

reading out the position information from the position information file on the basis of the read-out position information recording position information; and reading out the designated recording data from a single file on the basis of the position information from the recording medium on which a plurality of recording data has been managed and recorded as a single file and decrypting the read-out recording data on the basis of the read-out decrypting information.

According to the invention of claim 8, there is provided a reproducing apparatus for reproducing designated recording data recorded on a recording medium, comprising:

recording data information file reading means for reading out decrypting information of the designated recording data and position information recording position information showing a recording position of position information read out from a position information file in which the position information showing a recording position of the designated recording data has been recorded from a recording data information file;

position information reading means for reading out the position information from the position information file on the basis of the read-out position information recording position information; and decrypting and reproducing means for reading out the designated recording data from a single file on the basis of the position information from the recording medium on which a plurality of recording data has been managed and recorded as a single file and decrypting the read-out recording data on the basis of the read-out decrypting information.

According to the invention of claim 12, there is provided a recording method of recording inputted data onto a recording medium, comprising the steps of:

encoding the inputted data and recording the encoded data so as to be coupled with a recorded data file;

recording management information of the data file with which the encoded data has been coupled and which has been recorded on the recording medium on the basis of an end position of the recording of the encoded data;

recording coupling position information of the coupled encoded data onto the recording medium; and recording a parts number for designating the coupling position information of the coupled encoded data which is recorded into a coupling position information file in which a plurality of coupling position information is recorded and encoding information at the time when the encoding is executed.

According to the invention, music data is enclosed in the audio data file. A header is provided for the audio data file. A title, decrypting key information, and copyright management information are recorded in the header and the index information is also provided. As for the index, a music piece of one track is divided into a plurality of music pieces.

A track information file is a file in which various information for managing the music data stored in the audio data file has been described. The track information file comprises: a play order table (reproducing order table); a programmed play order table; a group information table (group information table); a track information table (track information table); and a name table.

The play order table is a table showing play order defined by a default. Information showing a link destination to a track descriptor of the track information table regarding each track number (music piece number) has been stored in the play order table.

Information regarding each music piece has been described in the track information table. The track information table comprises a track descriptor of each track (every music piece). A file pointer, an index number, an artist name, a title name, an original music piece order information, recording time information, and the like of the audio data file in which the music piece has been stored have been described in each track descriptor.

When the number of the track to be reproduced is designated by the play order table, the track descriptor of the link destination is read out. The file pointer and the index number of the music piece, pointers of the artist name and the title name, the original music piece order information, the recording time information, and the like are read out from the track descriptor.

The audio data file is accessed from the file pointer of the music piece and the information of the header of the audio data file is read out. If the audio data has been encrypted, the key information read out from the header is used. The audio data file is reproduced. At this time, if the index number is designated, the position of the designated index number is detected from the information of the header and the reproduction is started from the position of this index number.

BRIEF DESCRIPTION OF DRAWINGS

FIG. 20 is a diagram for use in explanation of a signal recording bit map.

FIG. 32 is a diagram for use in explanation of a programmed play order table according to the first example of the management system of the audio data.

FIGS. 33A and 33B are diagrams for use in explanation of a group information table according to the first example of the management system of the audio data.

FIGS. 34A and 34B are diagrams for use in explanation of a track information table according to the first example of the management system of the audio data.

FIG. 38 is a diagram for explaining that a plurality of name slots in the name table can be referred to.

FIGS. 39A and 39B are diagrams for use in explanation of a process for erasing parts from the audio data file in the first example of the management system of the audio data.

FIGS. 45A and 45B are diagrams for use in explanation of a group information table according to the second example of the management system of the audio data.

FIGS. 46A and 46B are diagrams for use in explanation of a track information table according to the second example of the management system of the audio data.

FIG. 49 shows the second example of the management system of the audio data and is a diagram for explaining that data of one file is divided into a plurality of index areas by indices.

FIG. 50 shows the second example of the management system of the audio data and is a diagram for use in explanation of coupling of tracks.

FIG. 54 is a schematic diagram conceptually showing a state of coexistence of the next-generation MD1 system and the existing MD system in the disc drive apparatus.

BEST MODE FOR CARRYING OUT THE INVENTION

1. Outline of Recording System

Figure 1:
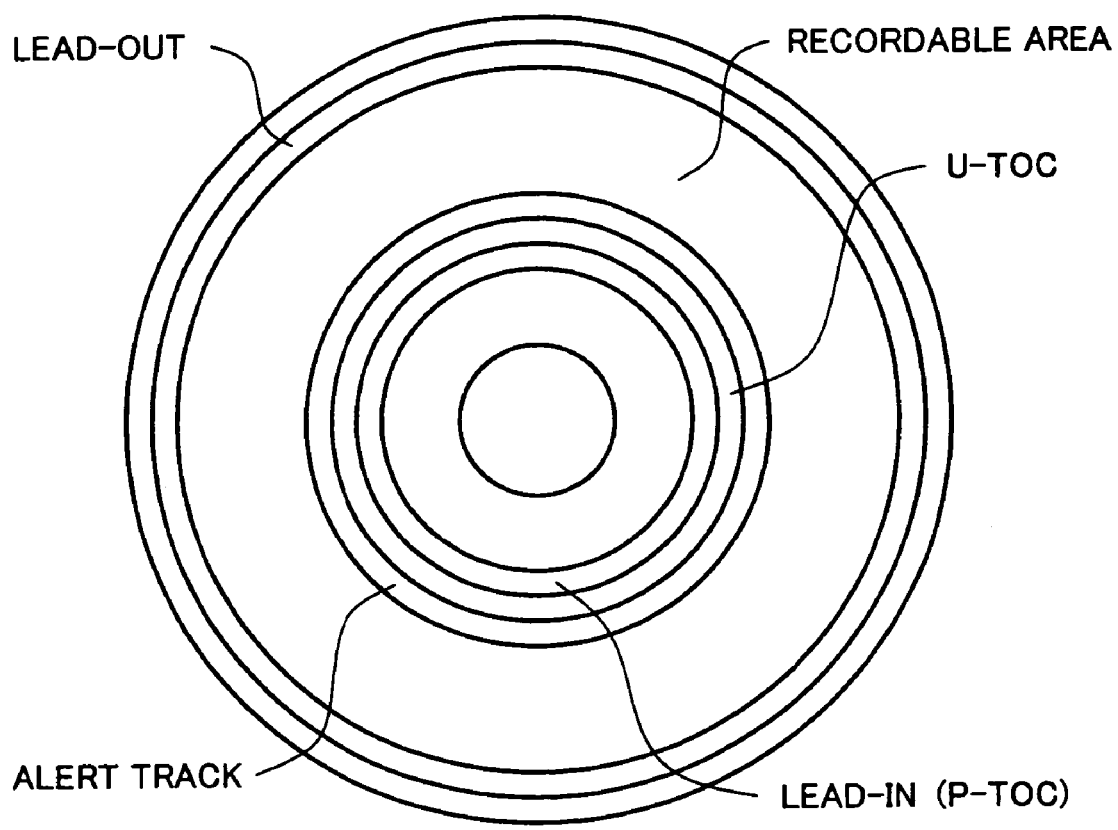
FIG. 1 is a diagram for use in explanation of a disc of specifications of a next-generation MD1 system.

In a recording and reproducing apparatus to which the invention is applied, a disc similar to that used in an MD (mini disc) system or a magnetooptic recording disc which conforms with the disc used in the MD system is used as a recording medium, and contents data such as audio data is recorded and reproduced by using an FAT (File Allocation Table) system as a file management system so as to obtain affinity with the existing personal computer. By improving an error correction system and a modulation system for the existing MD system, a recording capacity of data is increased and reliability of the data is raised. Further, the contents data is encrypted and illegal copy is prevented, thereby protecting copyright of the contents data.

As recording/reproducing formats, there have been proposed: specifications of the next-generation MD1 in which a disc that is substantially similar to the disc used in the existing MD system is used; and specifications of the next-generation MD2 in which, although a disc whose outer shape is similar to that of the disc used in the existing MD system is used, a recording density in the linear recording direction is raised by using a magnetically induced super resolution (MSR) technique, thereby further increasing a recording capacity.

In the existing MD system, a magnetooptic disc having a diameter of 64 mm and enclosed in a cartridge is used as a recording medium. A thickness of disc is equal to 1.2 mm and a center hole having a diameter of 11 mm is formed at the center. The cartridge has a shape in which a length is equal to 68 mm, a width is equal to 72 mm, and a thickness is equal to 5 mm.

In both of the specifications of the next-generation MD1 and the specifications of the next-generation MD2, all shapes of those discs and shapes of those cartridges are the same, respectively. A start position of a lead-in area of each of the discs of the specifications of the next-generation MD1 and the specifications of the next-generation MD2 starts from 29 mm and is similar to that of the disc used in the existing MD system.

It is being examined that a track pitch is set to a value in a range from 1.2 μm to 1.3 μm (for example, 1.25 μm) in the next-generation MD2 system. On the other hand, in the next-generation. MD1 using the disc of the existing MD system in common, a track pitch is set to 1.6 μm. A bit length of the next-generation MD1 is set to 0.44 μm/bit and that of the next-generation MD2 is set to 0.16 μm/bit. A redundancy of each of the next-generation MD1 and the next-generation MD2 is equal to 20.50%.

In the disc of the specifications of the next-generation MD2 system, the recording capacity in the linear density direction is improved by using the magnetically induced super resolution technique. The magnetically induced super resolution technique uses a principle such that when the disc reaches a predetermined temperature, a cut layer enters a magnetically neutral state, and a magnetic wall transferred to a reproducing layer moves, so that a micro mark seems large in a beam spot.

That is, in the disc of the specifications of the next-generation MD2 system, at least a magnetic layer serving as a recording layer for recording information, the cut layer, and a magnetic layer for reproducing the information are laminated onto a transparent substrate. The cut layer becomes a layer for adjusting an exchange coupling power. When the disc reaches the predetermined temperature, the cut layer enters the magnetically neutral state and the magnetic wall transferred to the recording layer is transferred to the magnetic layer for reproduction. Thus, the micro mark can be seen in the beam spot. Upon recording, the micro mark can be formed by using a laser pulse magnetic field modulation technique.

In the disc of the specifications of the next-generation MD2, to improve a detrack margin, a crosstalk from a land, a crosstalk of a wobble signal, and a leakage of focusing, a groove is made deeper and an inclination of the groove is made more sharp. In the disc of the specifications of the next-generation MD2, the depth of groove lies within a range from, for example, 160 nm to 180 nm, the inclination of the groove lies within a range from, for example, 60° to 70°, and a width of groove lies within a range from, for example, 600 nm to 700 nm.

With respect to optical specifications, in the specifications of the next-generation MD1, a laser wavelength $\lambda$ is set to 780 nm and a numerical aperture NA of an objective lens of the optical head is set to 0.45. Also with respect to the specifications of the next-generation MD2, a laser wavelength $\lambda$ is set to 780 nm and a numerical aperture NA of the optical head is set to 0.45.

As a recording system, a groove recording system is used in both of the specifications of the next-generation MD1 and the specifications of the next-generation MD2. That is, the groove (the groove on the surface of the disc) is used as a track for recording and reproduction.

As an error correction coding system, the convolutional code according to the ACIRC (Advanced Cross Interleave Reed-Solomon Code) has been used in the existing MD system. However, in the specifications of the next-generation MD1 and the specifications of the next-generation MD2, the code of a block completion type in which an RS-LDC (Reed Solomon-Long Distance Code) and a BIS (Burst Indicator Subcode) are combined is used. By using the error correction code of the block completion type, a linking sector becomes unnecessary. According to the error correction system in which the LDC and the BIS are combined, when a burst error is caused, an error location can be detected by the BIS. Erasure correction can be made by the LDC code by using the error location.

As an address system, a wobbled groove system in which after a groove according to a single spiral is formed, wobbles serving as address information are formed on both sides of the groove is used. Such an address system is called ADIP (Address in Pregroove). In the specifications of the existing MD system and the specifications of the next-generation MD1 and the next-generation MD2, linear densities are different. In the existing MD system, the convolutional code called ACIRC is used as an error correction code. Since the code of the block completion type in which the LDC and the BIS are combined are used in the specifications of the next-generation MD1 and the next-generation MD2, redundancies differ and a relative positional relation between the ADIP and the data is changed. Therefore, in the specifications of the next-generation MD1 using the disc of the existing MD system in common, a method of handling the ADIP signal is set to be different from that in the existing MD system. In the specifications of the next-generation MD2, the specifications of the ADIP signal are changed so as to be matched more with the specifications of the next-generation MD2.

With respect to the modulating system, while the EFM (8 to 14 Modulation) is used in the existing MD system, an RLL (1, 7) PP (RLL: Run Length Limited, PP: Parity Preserve/Prohibit rmtr (repeated minimum transition runlength)) (hereinafter, referred to as 1-7 pp modulation) is used in the specifications of the next-generation MD1 and the next-generation MD2. As a detection system of the data, a Viterbi decoding system using Partial Response PR (1, 2, 1) ML is used in the next-generation MD1 and a Viterbi decoding system using Partial Response PR (1, −1) ML is used in the next-generation MD2.

A CLV (Constant Linear Verocity) or a ZCAV (Zone Constant Angular Verocity) is used as a disc driving system. Its standard linear velocity is set to 0.2.4 m/sec in the specifications of the next-generation MD1 and set to 1.98 m/sec in the specifications of the next-generation MD2. In the specifications of the existing MD system, it is set to 1.2 m/sec in the disc of 60 minutes and set to 1.4 m/sec in the disc of 74 minutes.

In the specifications of the next-generation MD1 using the disc which is used in the existing MD system as it is in common, the total recording capacity of data per disc is equal to about 300 Mbytes (in the case where the disc of 80 minutes is used). By changing the modulation system from EFM to 1-7 pp modulation, a window margin is changed from 0.5 to 0.666, so that 1.33 times as high density can be realized in this respect. By changing the error correction system from the ACIRC system to the combination of the BIS and the LDC, data efficiency is raised, so that 1.48 times as high density can be realized in this respect. Overall, the data capacity which is about two times as large as that of the existing MD system is realized by using substantially the same disc.

In the disc of the specifications of the next-generation MD2 using the magnetically induced super resolution, the further high density in the linear density direction is realized and the total data recording capacity is equal to about 1 Gbytes.

A data rate as a standard linear velocity is equal to 4.4 Mbits/sec in the next-generation MD1 and is equal to 9.8 Mbits/sec in the next-generation MD2.

2. With Respect to the Disc

FIG. 1 shows a construction of the disc of the next-generation MD1. As a disc of the next-generation MD1, the disc of the existing MD system is used as it is in common. That is, the disc is formed by laminating a dielectric film, a magnetic film, a dielectric film, and a reflective film onto a transparent polycarbonate substrate. A protective film is further laminated on them.

In the disc of the next-generation MD1, as shown in FIG. 1, a P-TOC (premastered TOC (Table Of Contents)) area is provided in a lead-in area of an inner rim of the disc. This area becomes a premastered area as a physical structure. That is, control information or the like has been recorded as P-TOC information by an emboss pit.

An outer rim of the lead-in area in which the P-TOC area is provided is set to a recordable area (magnetooptically recordable area) and is a recordable/reproducible area in which a groove has been formed as a guide groove of a recording track. A U-TOC (user TOC) is provided for an inner rim of the recordable area.

The U-TOC has a construction similar to that of the U-TOC used for recording management information of the disc in the existing MD system. In the existing MD system, the U-TOC is management information which is rewritten in accordance with order of music pieces, recording, erasure, or the like of the tracks (audio tracks/data tracks) and manages a start position, an end position, and a mode with respect to each track (parts constructing the track).

An alert track is provided for an outer rim of the U-TOC. The alert track is a warning track in which an alarm sound showing that the disc is used in the next-generation MD1 system and cannot be reproduced by the player of the existing MD system has been recorded.

Figure 2:
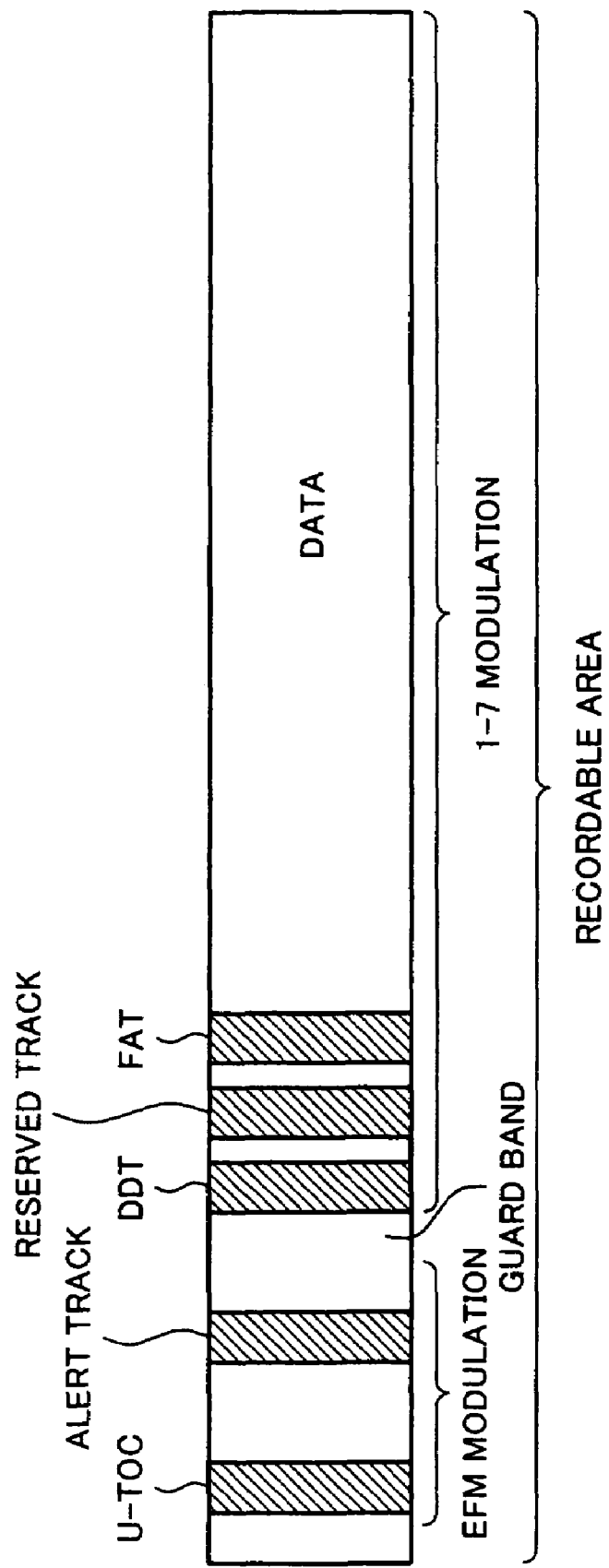
FIG. 2 is a diagram for use in explanation of a recording area of the disc of the specifications of the next-generation MD1 system.

FIG. 2 shows a construction of the recordable area of the disc of the specifications of the next-generation MD1 shown in FIG. 1. As shown in FIG. 2, the U-TOC and the alert track are provided at the head (on the inner rim side) of the recordable area. In the area in which the U-TOC and the alert track are included, data is modulated by the EFM and recorded so that it can be reproduced also by the player of the existing MD system. An area in which the data is modulated by the 1-7 pp modulation of the next-generation MD1 system and recorded is provided for an outer rim of the area in which the data is modulated by the EFM modulation and recorded. The area in which the data is modulated by the EFM and recorded and the area in which the data is modulated by the 1-7 pp modulation and recorded are away from each other at a predetermined distance and a guard band is provided between them. Since such a guard band is provided, a situation such that the disc of the specifications of the next-generation MD1 is loaded into the existing MD player and inconvenience is caused is prevented.

A DDT (Disc Description Table) area and a reserved track are provided at the head (on the inner rim side) of the area in which the data is modulated by the 1-7 pp modulation and recorded. The DDT area is provided for executing an alternating process to an area which is physically defective. A unique ID (UID) is further recorded into the DDT area. The UID is an identification code that is peculiar to each recording medium and is based on, for example, random numbers generated in a predetermined manner. Information to protect the contents is stored in the reserved track. Information to protect the contents is stored in the reserved track.

Further, an FAT (File Allocation Table) area is provided for the area in which the data is modulated by the 1-7 pp modulation and recorded. The FAT area is an area for managing the data by an FAT system. The FAT system makes data management which conforms with the FAT system used in the general personal computer. The FAT system makes file management by an FAT chain by using a directory indicative of a file on a route or an entry point of the directory and an FAT table in which coupling information of an FAT cluster has been described.

In the disc of the specifications of the next-generation MD1, information of a start position of the alert track and information of a start position of the area in which the data is modulated by the 1-7 pp modulation and recorded are recorded in the U-TOC area.

When the disc of the next-generation MD1 is loaded into the player of the existing MD system, the U-TOC area is read, the position of the alert track is known from the information of the U-TOC, the alert track is accessed, and the reproduction of the alert track is started. The alarm sound showing that the disc is used in the next-generation MD1 system and cannot be reproduced by the player of the existing MD system has been recorded in the alert track. The fact that the disc cannot be used in the player of the existing MD system is notified by this alarm sound.

As an alarm sound, a warning by words such as "this player cannot be used" can be made. Naturally, a buzzer sound can be also used.

When the disc of the next-generation MD1 is loaded into the player which conforms with the next-generation MD1, the U-TOC area is read. The start position of the area in which the data has been recorded by the 1-7 pp modulation is known from the information of the U-TOC and the DDT, reserved track, and FAT area are read out. In the data area of the 1-7 pp modulation, data management is made by using the FAT system without using the U-TOC.

Figure 3A:
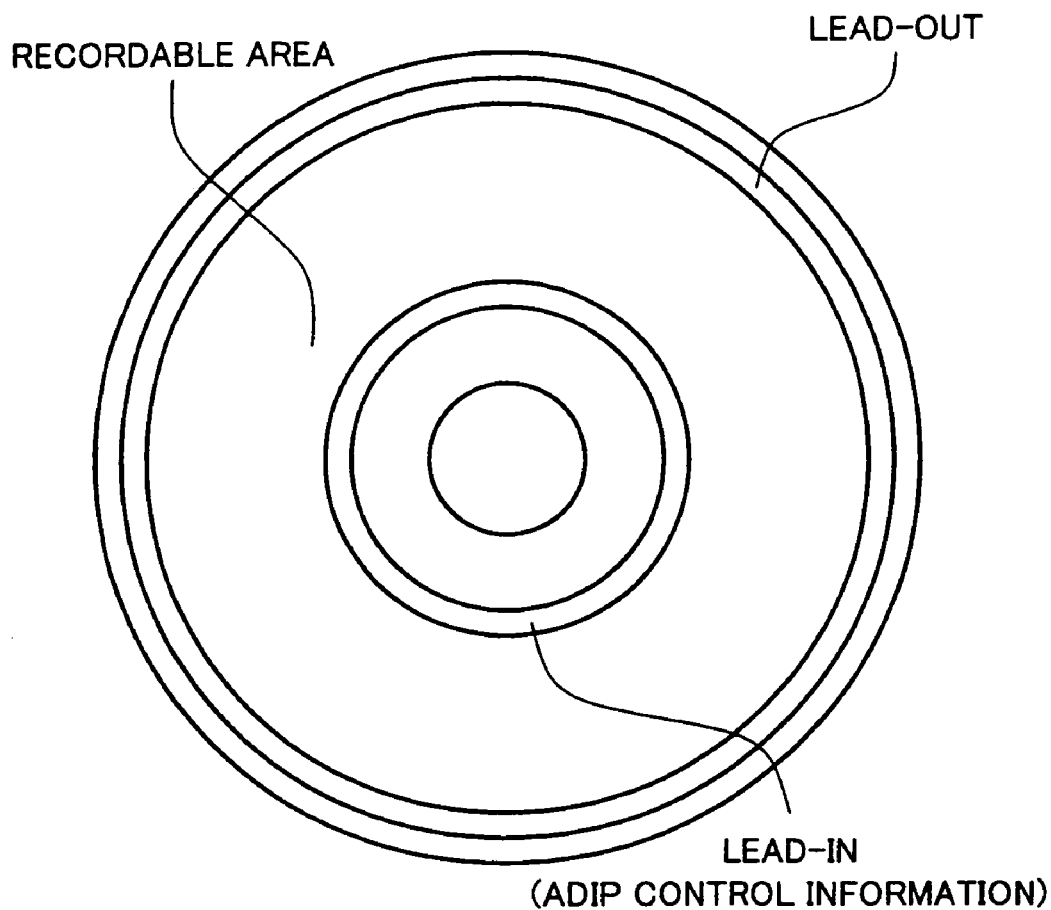
FIGS. 3A and 3B are diagrams for use in explanation of a disc of specifications of a next-generation MD2 system.
Figure 3B:
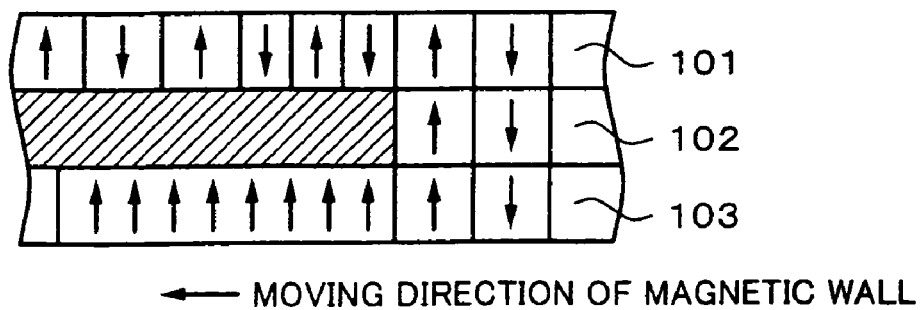

FIGS. 3A and 3B show a disc of the next-generation MD2. The disc is formed by laminating a dielectric film, a magnetic film, a dielectric film, and a reflective film onto a transparent polycarbonate-substrate. A protective film is further laminated on them.

In the disc of the next-generation MD2, as shown in FIG. 3A, control information has been recorded in the lead-in area of the inner rim of the disc by the ADIP signal. In the disc of the next-generation MD2, the P-TOC by the emboss pit is not provided for the lead-in are abut the control information by the ADIP signal is used in place of it. A recordable area starts from the outer rim of the lead-in area and is a recordable and reproducible area in which the groove has been formed as a guide groove of the recording track. The data is modulated by the 1-7 pp modulation and recorded in such a recordable area.

In the disc of the next-generation MD2, as shown in FIG. 3B, a layer formed by laminating a magnetic layer 101 serving as a recording layer for recording information, a cut layer 102, and a magnetic layer 103 for reproducing the information is used as a magnetic film. The cut layer 102 is a layer for adjusting an exchange coupling power. When the cut layer 102 reaches a predetermined temperature, it enters a magnetically neutral state, and a magnetic wall transferred to the recording layer 101 is transferred to the magnetic layer 103 for reproduction. Thus, a micro mark seems enlarged in a beam spot of the magnetic layer 103 for reproduction in the recording layer 101.

Whether the system is the next-generation MD1 or the next-generation MD2 can be discriminated, for example, from the information of the lead-in area. That is, if the P-TOC by the emboss pit is detected in the lead-in area, it is possible to determine that the disc is a disc of the existing MD or the next-generation MD1. If the control information by the ADIP signal is detected in the lead-in area and the P-TOC by the emboss pit is not detected, it is possible to determine that the disc is a disc of the next-generation MD1. A method of discriminating the next-generation MD1 and the next-generation MD2 is not limited to such a method but they can be discriminated from a phase of a tracking error signal in an on-track state and that in an off-track state. A detection hole or the like for identifying the disc can be also formed.

Figure 4:
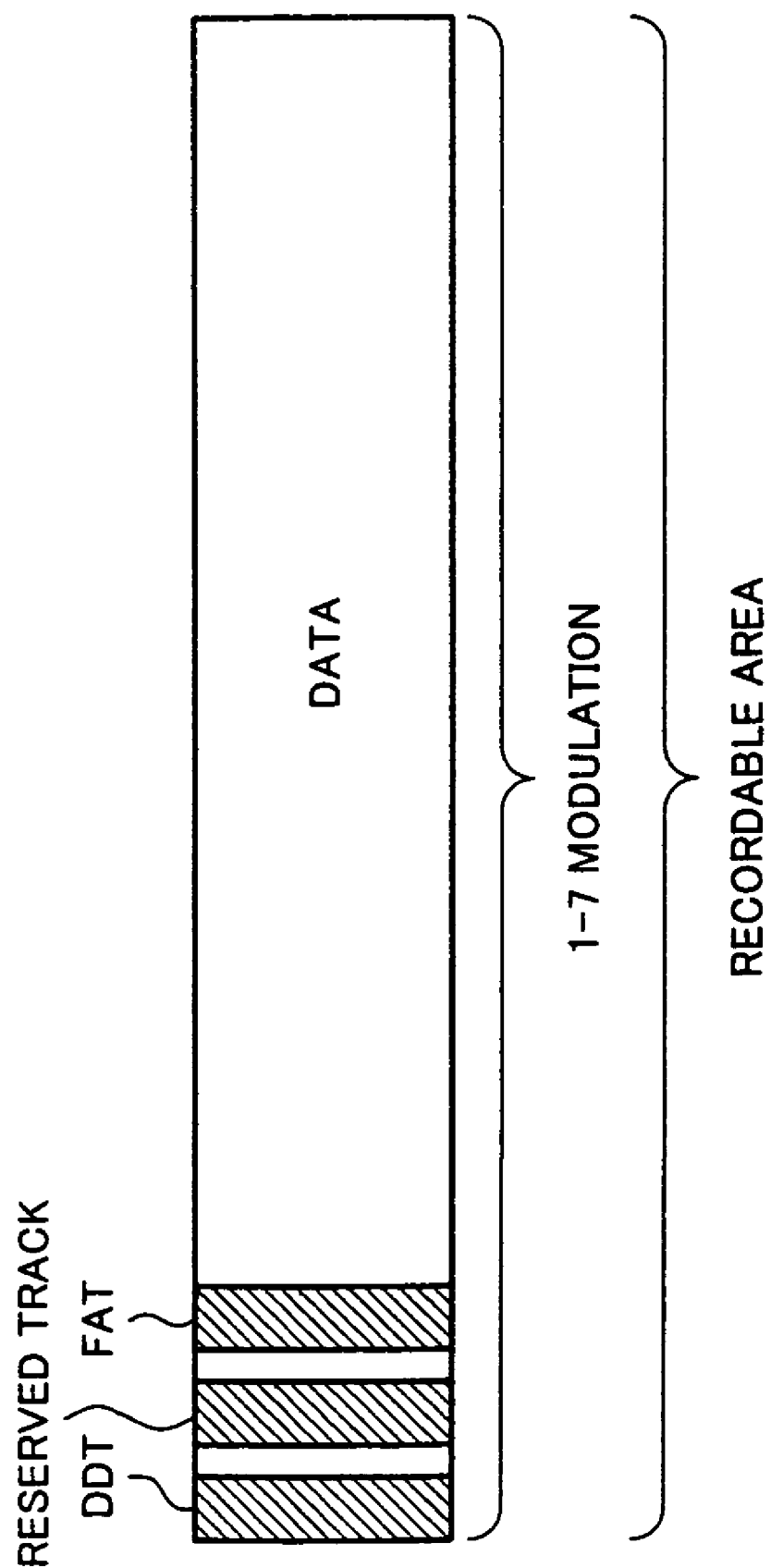
FIG. 4 is a diagram for use in explanation of a recording area of the disc of the specifications of the next-generation MD2 system.

FIG. 4 shows the construction of the recordable area of the disc of the specifications of the next-generation MD2. As shown in FIG. 4, all of the data is modulated by the 1-7 pp modulation and recorded in the recordable area. A DDT area and a reserved track are provided at the head (on the inner rim side) of the area in which the data is modulated by the 1-7 pp modulation and recorded. The DDT area is provided as a recording area of alternating area management data for managing an alternating area for an area which is physically defective. Further, the foregoing UID is recorded in the DDT area. Information for protecting the contents is stored in the reserved track.

Further, the FAT area is provided for the area in which the data is modulated by the 1-7 pp modulation and recorded. The FAT area is an area for managing the data by the FAT system. The FAT system makes data management according to the FAT system used in the general personal computer.

In the disc of the next-generation MD2, the U-TOC area is not provided. If the disc of the next-generation MD2 is loaded into the player which conforms with the next-generation MD2, the DDT, reserved track, and FAT area existing in predetermined positions are read out and the data management is made by using the FAT system.

In the disc of the next-generation MD1 and the disc of the next-generation MD2, the initializing operation which takes a long time is unnecessary. That is, in the discs of the specifications of the next-generation MD1 and the next-generation MD2, the initializing operation other than the operation to form the necessary least table of the DDT, reserved track, FAT table, and the like is unnecessary. The recording and reproduction of the recordable area can be directly executed from the unused disc.

3. Signal Format

Subsequently, signal formats of the next-generation MD1 system and the next-generation MD2 system will be described. In the existing MD system, the ACIRC as a convolutional code is used as an error correction system and a sector consisting of 2352 bytes corresponding to a data amount of the subcode block is used as an access unit of the recording and reproduction. In the case of the convolutional code, since an error correction coding series strides over a plurality of sectors, when the data is rewritten, it is necessary to prepare a linking sector between the adjacent sectors. As an address system, an ADIP as a wobbled groove system in which after a groove was formed by a single spiral, wobbles serving as address information are formed on both sides of the groove is used. In the existing MD system, the ADIP signals are arranged so as to be optimum in the case of accessing the sector consisting of 2352 bytes.

On the other hand, in the specifications of the next-generation MD1 system and the specifications of the next-generation MD2 system, the code of the block completion type in which the LDC and the BIS are combined is used and 64 kbytes are used as an access unit of the recording and the reproduction. In the code of the block completion type, the linking sector is unnecessary. Therefore, in the specifications of the next-generation MD1 system using the disc of the existing MD system in common, a way of handling the ADIP signal is changed so as to cope with a new recording system. In the specifications of the next-generation MD2 system, the specifications of the ADIP signal are changed so as to be matched more with the specifications of the next-generation MD2.

Figure 5:
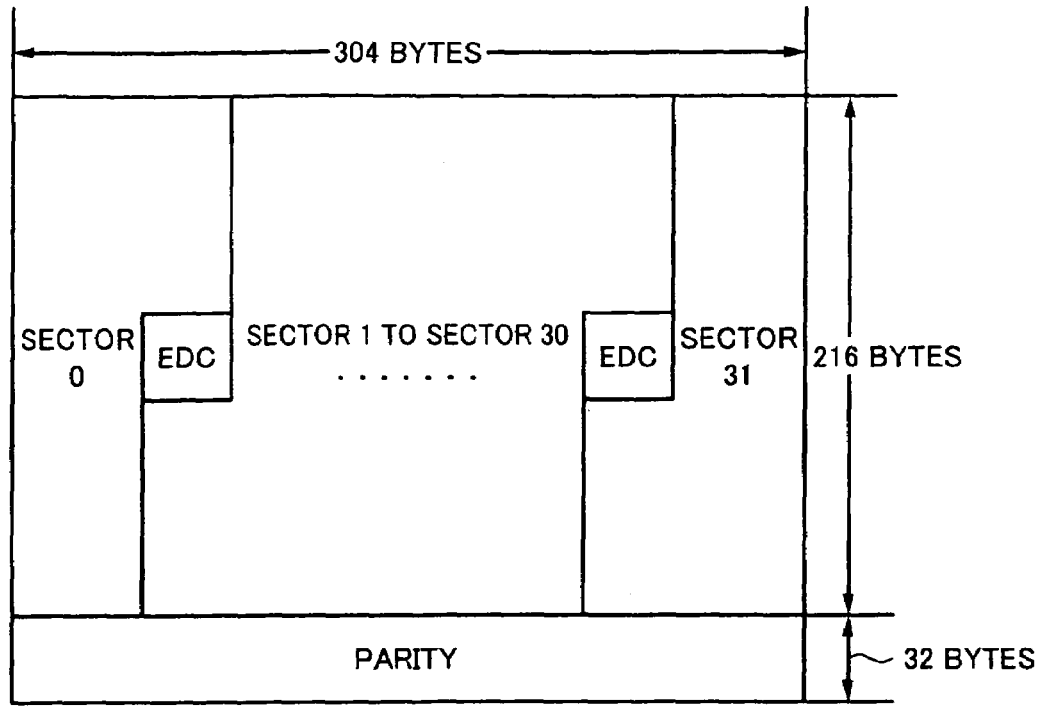
FIG. 5 is a diagram for use in explanation of error correction coding processes of a next-generation MD1 and a next-generation MD2.
Figure 6:
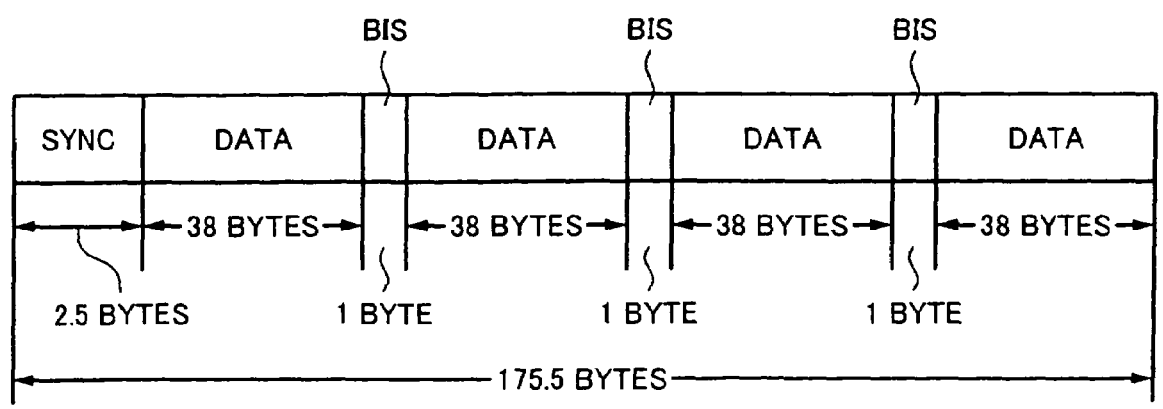
FIG. 6 is a diagram for use in explanation of the error correction coding processes of the next-generation MD1 and the next-generation MD2.
Figure 7:
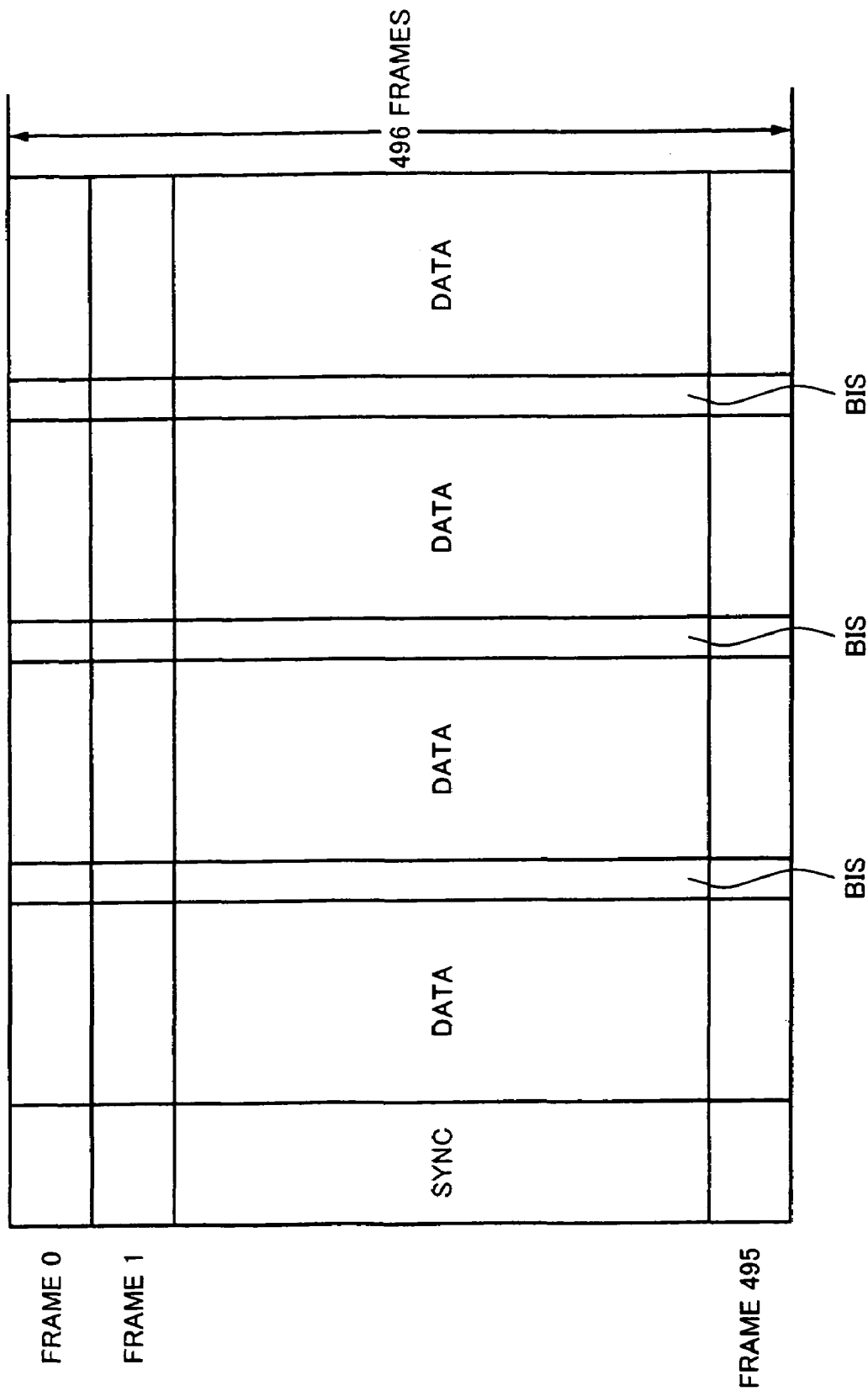
FIG. 7 is a diagram for use in explanation of the error correction coding processes of the next-generation MD1 and the next-generation MD2.

FIGS. 5, 6, and 7 are used for explaining the error correction system which is used in the next-generation MD1 system and the next-generation MD2 system. In the next-generation MD1 system and the next-generation MD2 system, an error correction coding system by an LDC as shown in FIG. 5 and a BIS system as shown in FIGS. 6 and 7 are combined.

FIG. 5 shows a construction of a coding block of the error correction coding by the LDC. As shown in FIG. 5, an error detection code EDC of 4 bytes is added to data of each error correction coding sector, and the data is two-dimensionally arranged to an error correction coding block of 304 bytes in the horizontal direction and 216 bytes in the vertical direction. Each error correction coding sector comprises data of 2 kbytes. As shown in FIG. 5, 32 error correction coding sectors each consisting of 2 kbytes are arranged in the error correction coding block consisting of 304 bytes in the horizontal direction and 216 bytes in the vertical direction. A parity of a Reed-Solomon code of 32 bits for error correction is added in the vertical direction to the data of the error correction coding block of the 32 error correction coding sectors which have two-dimensionally been arranged in a manner such that 304 bytes are arranged in the horizontal direction and 216 bytes are arranged in the vertical direction as mentioned above.

FIGS. 6 and 7 show constructions of the BIS. As shown in FIG. 6, the BIS of 1 byte is inserted every data of 38 bytes, and a total of 157.5 bytes of data of (38×4=152 bytes), BIS data of 3 bytes, and a frame sync of 2.5 bytes are set to one frame.

As shown in FIG. 7, the block of the BIS is constructed by collecting 496 frames each of which is constructed as mentioned above. User control data of 576 bytes, an address unit number of 144 bytes, and an error correction code of 768 bytes are included in the BIS data (3×496=1488 bytes).

As mentioned above, since the error correction code of 768 bytes is added to the data of 1488 bytes in the BIS data, the error correction can be powerfully made. By embedding the BIS code every 38 bytes, when a burst error occurs, an error location can be detected. Erasure correction can be made by the LDC code by using the error location.

Figure 8:
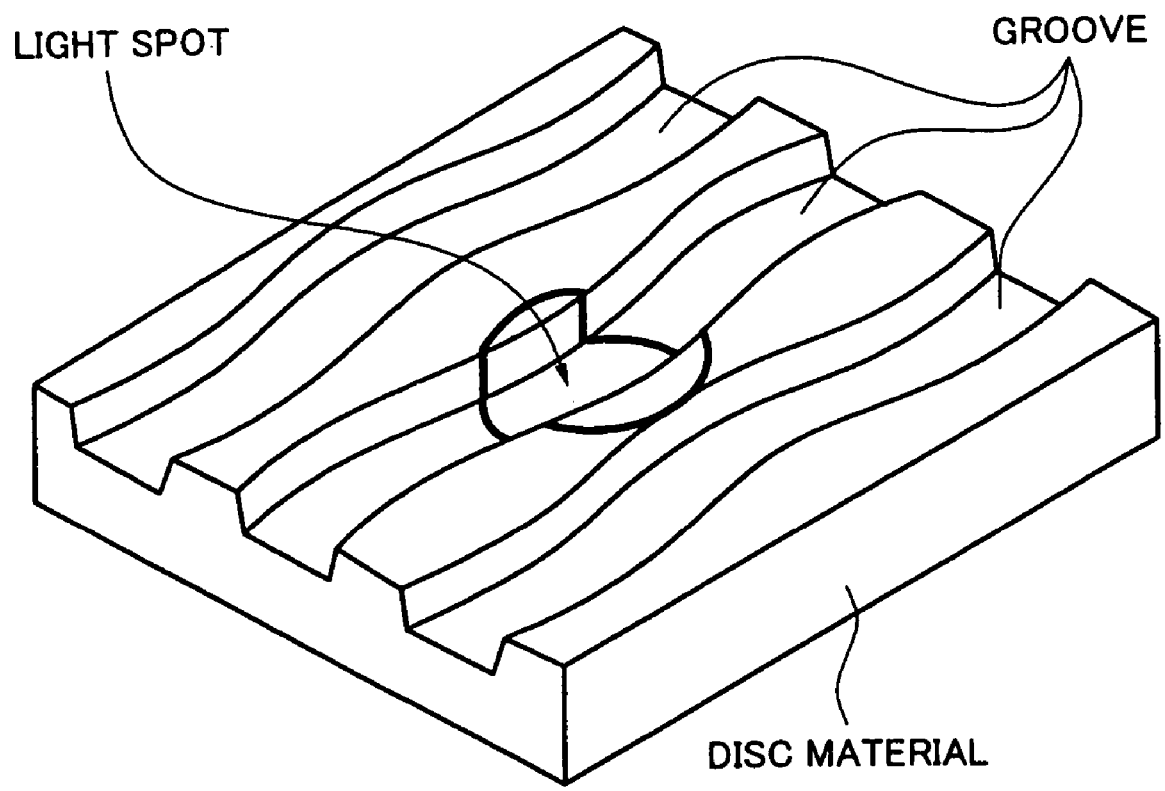
FIG. 8 is a perspective view for use in explanation of generation of an address signal using wobbles.

As shown in FIG. 8, the ADIP signal is recorded by forming the wobbles on both sides of the single spiral groove. That is, the ADIP signal is recorded as a wobble of the groove by frequency modulating the address data.

Figure 9:
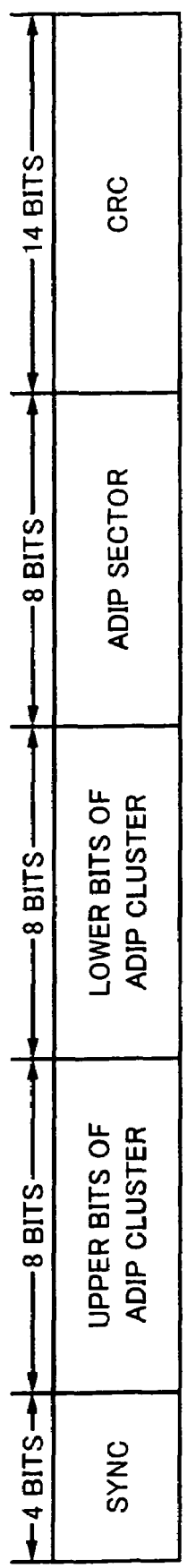
FIG. 9 is a diagram for use in explanation of an ADIP signal in the existing MD system and the next-generation MD1 system.

FIG. 9 shows a sector format of the ADIP signal in the case of the next-generation MD1.

As shown in FIG. 9, 1 sector (ADIP sector) of the ADIP signal comprises: a sync of 4 bits; upper bits of the ADIP cluster number of 8 bits; lower bits of the ADIP cluster number of 8 bits; an ADIP sector number of 8 bits; and an error detection code CRC of 14 bits.

The sync is a signal of a predetermined pattern for detecting the head of the ADIP sector. In the conventional MD system, since the convolutional code is used, the linking sector is necessary. The sector number for linking is a sector number having a negative value and is one of the sector numbers "FCh", "FDh", "FEh", and "FFh" (h denotes a hexadecimal number). Since the disc of the existing MD system is used in common in the next-generation MD1, the format of the ADIP sector is similar to that of the existing MD system.

Figure 10:
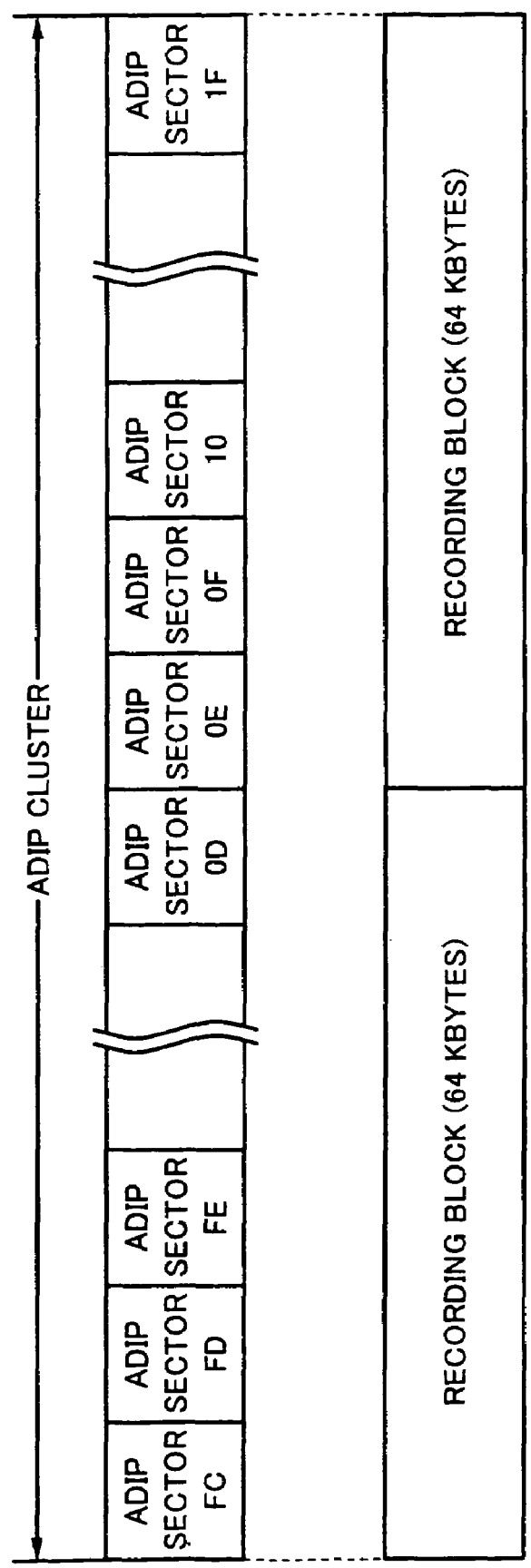
FIG. 10 is a diagram for use in explanation of the ADIP signal in the existing MD system and the next-generation MD1 system.

In the next-generation MD1 system, as shown in FIG. 10, the ADIP cluster is constructed by 36 sectors of the ADIP sector numbers "FCh" to "FFh" and "0Fh" to "1Fh". As shown in FIG. 10, the data of two recording blocks (64 kbytes) is arranged in one ADIP cluster.

Figure 11:
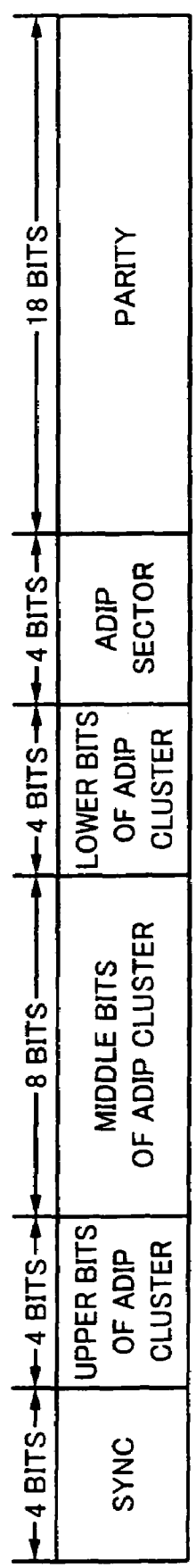
FIG. 11 is a diagram for use in explanation of an ADIP signal in the next-generation MD2 system.

FIG. 11 shows a construction of the ADIP sector in the case of the next-generation MD2. In the specifications of the next-generation MD2, the ADIP sector is constructed by 16 ADIP sectors. Therefore, the sector number of ADIP can be expressed by 4 bits. In the next-generation MD, since the block completion error correction code is used, the linking sector is unnecessary.

As shown in FIG. 11, the ADIP sector of the next-generation MD2 comprises: a sync of 4 bits; upper bits of the ADIP cluster number of 4 bits; middle bits of the ADIP cluster number of 8 bits; lower bits of the ADIP cluster number of 4 bits; an ADIP sector number of 4 bits; and a parity for error correction of 18 bits.

Figure 12:
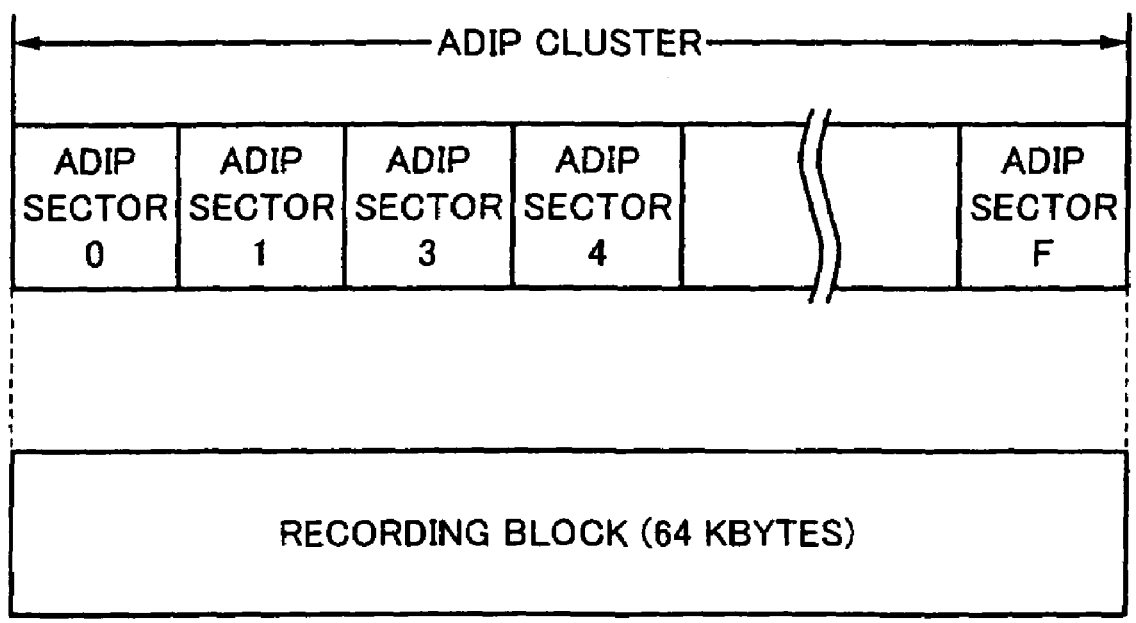
FIG. 12 is a diagram for use in explanation of the ADIP signal in the next-generation MD2 system.

The sync is a signal of a predetermined pattern for detecting the head of the ADIP sector. As an ADIP cluster number, a total of 16 bits of upper 4 bits, middle 8 bits, and lower 4 bits are described. Since the ADIP cluster is constructed by 16 ADIP sectors, the sector number of the ADIP sector consists of 4 bits. While the error detection code of 14 bits is used in the existing MD system, the parity for error correction of 18 bits is used. In the specifications of the next-generation MD2, as shown in FIG. 12, data of one recording block (64 kbytes) is arranged in one ADIP cluster.

Figure 13:
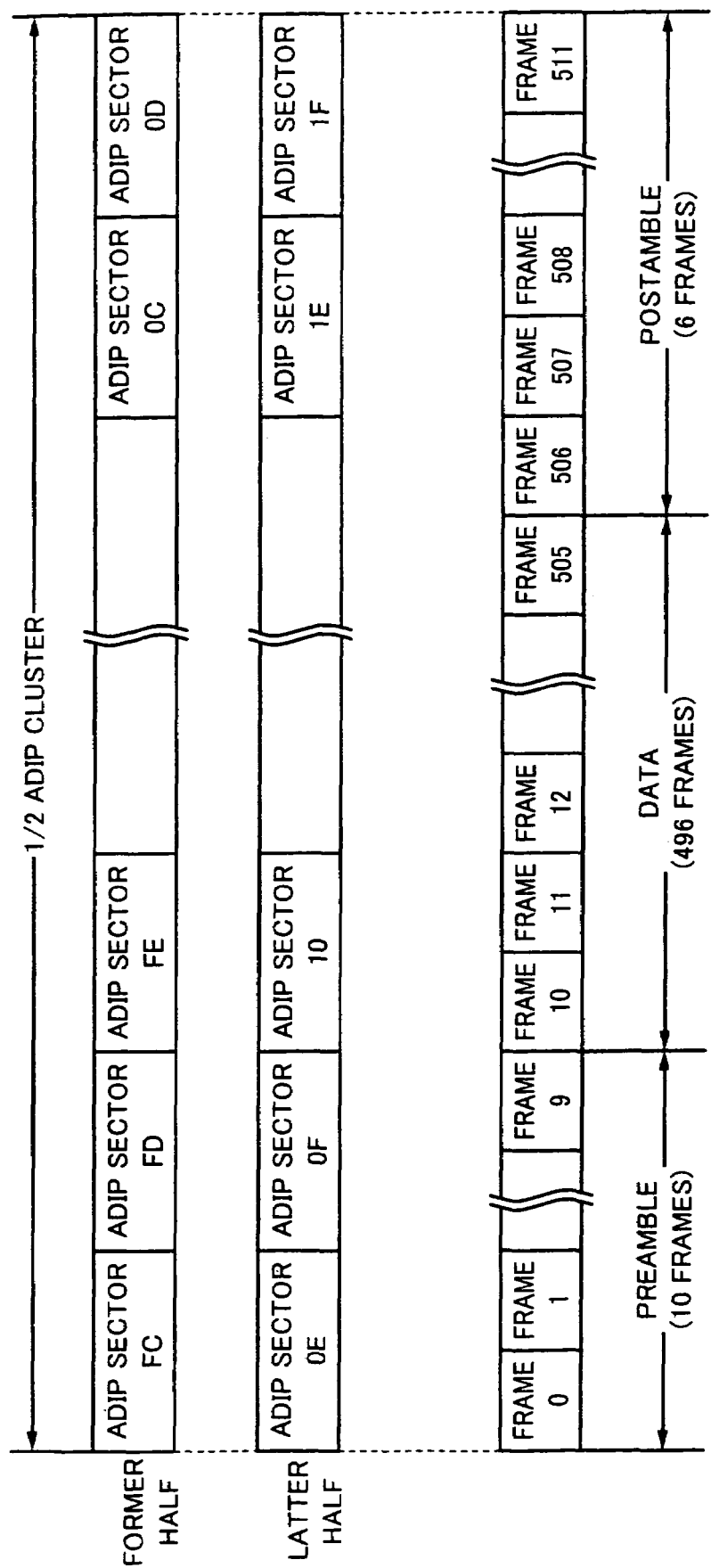
FIG. 13 is a diagram showing a relation between the ADIP signal and frames in the existing MD system and the next-generation MD1 system.

FIG. 13 shows a relation between the ADIP cluster and frames of the BIS in the case of the next-generation MD1.

As shown in FIG. 10, in the specifications of the next-generation MD1, one ADIP cluster is constructed by 36 sectors of the ADIP sectors "FC" to "FF" and the ADIP sectors "00" to "1F". Two data each consisting of one recording block (64 kbytes) serving as a unit of the recording and the reproduction are arranged in one ADIP cluster.

As shown in FIG. 13, one ADIP sector is separated into 18 sectors of the former half and 18 sectors of the latter half.

The data of one recording block serving as a unit of the recording or reproduction is arranged into the block of the BIS consisting of 496 frames. A preamble of 10 frames (frame "0" to frame "9") is added before frames (frame "10" to frame "505") of the data of 496 frames corresponding to the block of the BIS. A postamble of 6 frames (frame "506" to frame "511") is added after the frames of the data. The data of a total of 512 frames is arranged in the former half of the ADIP cluster in a range from the ADIP sector "FCh" to the ADIP sector "0Dh" and in the latter half of the ADIP cluster in a range from the ADIP sector "0Eh" to the ADIP sector "1Fh". The frames of the preamble before the data frames and the frames of the postamble after the data are used to protect the data upon linking with the adjacent recording block. The preamble is also used for pull-in of the PLL for data, control of the signal amplitude, control of the signal offset, and the like.

A physical address at the time of recording or reproducing the data of the recording block is designated by the ADIP cluster and a discrimination result about whether it is located before or after the cluster. When the physical address is designated upon recording or reproducing, the ADIP sector is readout from the ADIP signal, the ADIP cluster number and the ADIP sector number are read out from the reproduction signal of the ADIP sector, and whether it is located before or after the ADIP cluster is discriminated.

Figure 14:
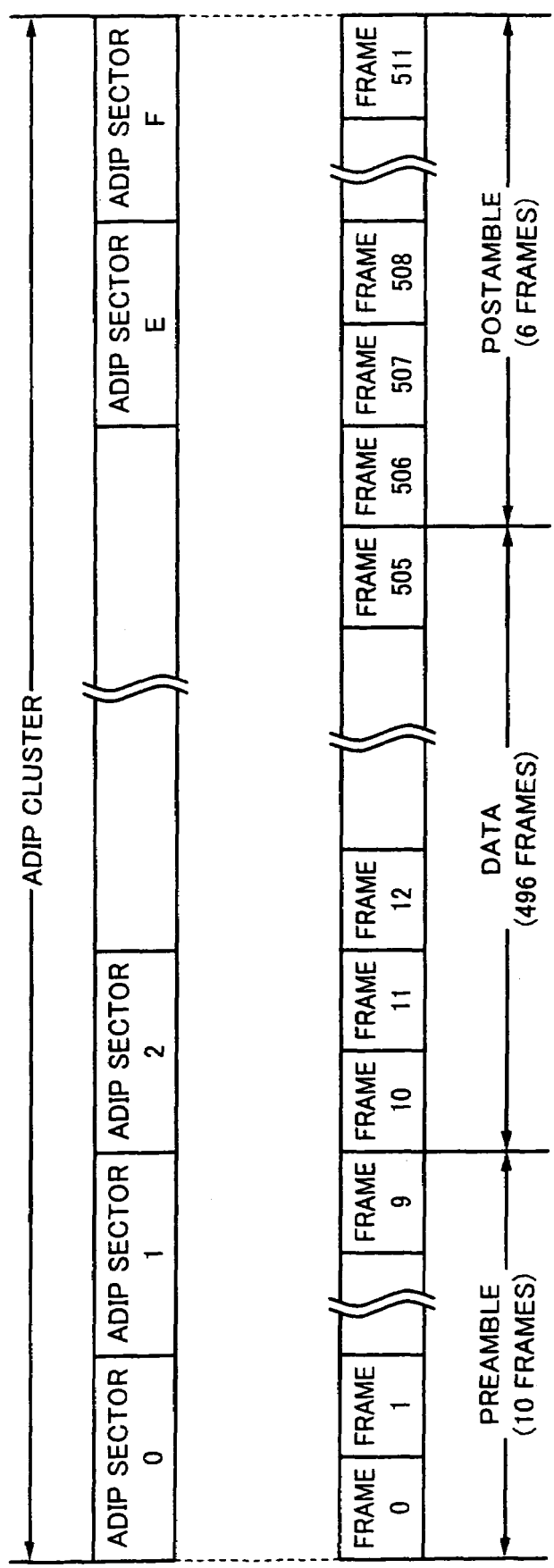
FIG. 14 is a diagram showing a relation between the ADIP signal and the frames in the next-generation MD1 system.

FIG. 14 shows a relation between the ADIP cluster and the frames of the BIS in the case of the specifications of the next-generation MD2 system. As shown in FIG. 12, in the specifications of the next-generation MD2, one ADIP cluster is constructed by 16 ADIP sectors. The data of one recording block (64 kbytes) is arranged in one ADIP cluster.

As shown in FIG. 14, the data of one recording block (64 kbytes) serving as a unit of the recording or reproduction is arranged into the block of the BIS consisting of 496 frames. A preamble of 10 frames (frame "0" to frame "9") is added before the frames (frame "10" to frame "505") of the data of 496 frames corresponding to the block of the BIS. Frames (frame "506" to frame "511") of a postamble of 6 frames are added after the frames of the data. The data of a total of 512 frames is arranged in the ADIP cluster comprising the ADIP sectors "0h" to "Fh".

The frames of the preamble before the data frames and the frames of the postamble after the data are used to protect the data upon linking with the adjacent recording block. The preamble is also used for pull-in of a PLL for data, control of a signal amplitude, control of a signal offset, and the like.

A physical address at the time of recording or reproducing the data of the recording block is designated by the ADIP cluster. When the physical address is designated upon recording or reproducing, the ADIP sector is read out from the ADIP signal and the ADIP cluster number is read out from the reproduction signal of the ADIP sector.

In such a disc, since control or the like of a laser power is made when the recording or reproduction is started, various control information is necessary. In the disc of the specifications of the next-generation MD1, as shown in FIG. 1, the P-TOC is provided in the lead-in area and the various control information is obtained from the P-TOC.

In the disc of the specifications of the next-generation MD2, the P-TOC by the emboss pit is not provided and the control information is recorded by the ADIP signal in the lead-in area. In the disc of the specifications of the next-generation MD2, since the magnetically induced super resolution technique is used, it is important to control the laser power. In the disc of the specifications of the next-generation MD2, calibration areas for power control adjustment are provided in the lead-in area and the lead-out area.

Figure 15:
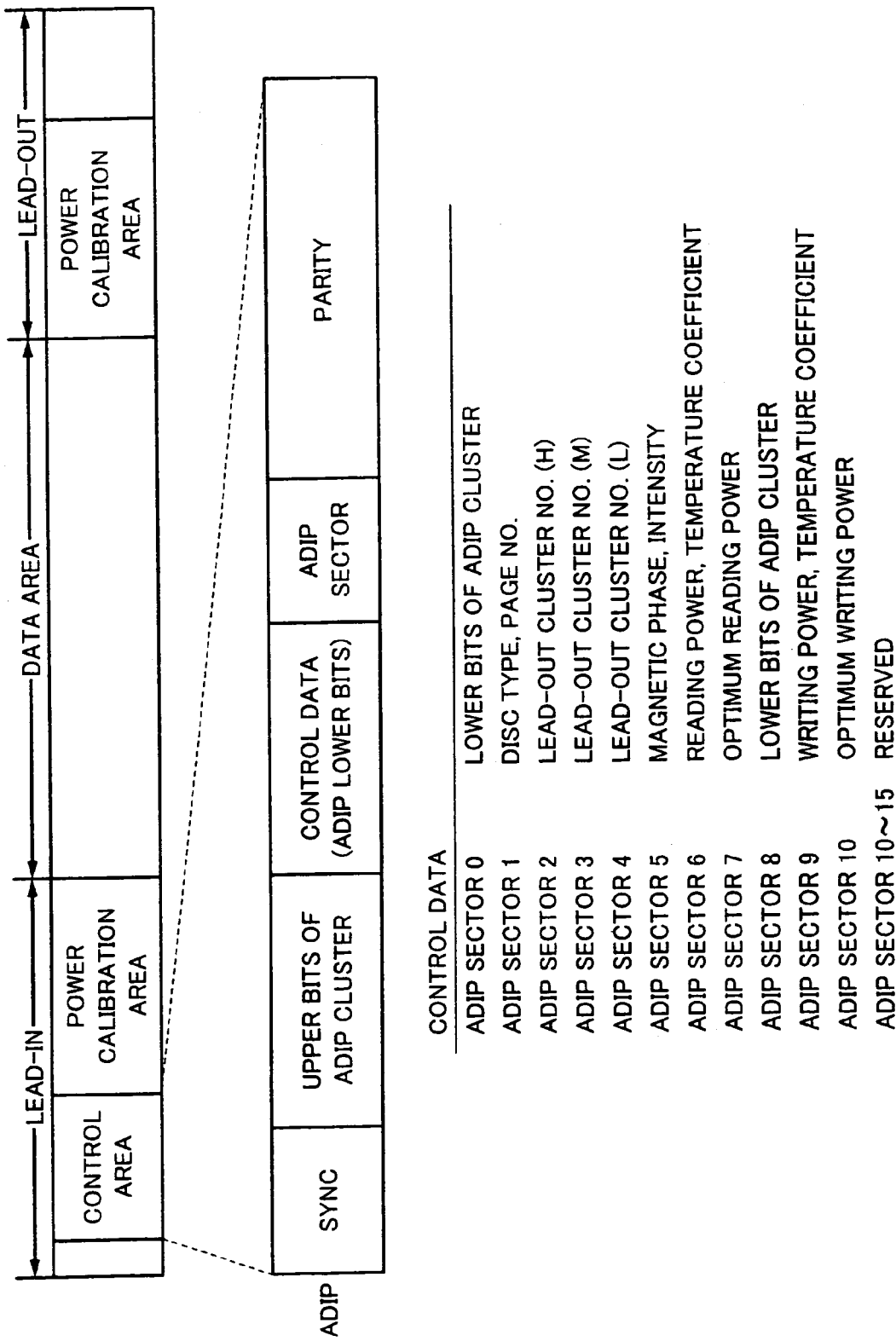
FIG. 15 is a diagram for use in explanation of a control signal in the next-generation MD2 system.

That is, FIG. 15 shows constructions of the lead-in area and the lead-out area of the disc of the specifications of the next-generation MD2. As shown in FIG. 15, the power calibration areas are provided as power control areas of the laser beam in the lead-in area and the lead-out area of the disc.

A control area in which the control information by the ADIP has been recorded in the lead-in area. The recording of the control information of the disc by the ADIP denotes that the control information is described by using the areas allocated as lower bits of the ADIP cluster number.

That is, the ADIP cluster number starts from the start position of the recordable area and is set to a negative value in the lead-in area. As shown in FIG. 15, the ADIP sector of the next-generation MD2 comprises: a sync of 4 bits; upper bits of the ADIP cluster number of 8 bits; control data of 8 bits (lower bits of the ADIP cluster number) of 8 bits; an ADIP sector number of 4 bits; and a parity for error correction of 18 bits. Control information such as disc type, magnetic phase, intensity, reading power, and the like is described in 8 bits allocated as lower bits of the ADIP cluster number as shown in FIG. 15.

Since the upper bits of the ADIP cluster are left as they are, the present position can be known at certain precision. With respect to the ADIP sectors "0" and "8", by leaving lower eight bits of the ADIP cluster number, the ADIP cluster can be accurately known at predetermined intervals.

A technique regarding the recording of the control information by the ADIP signal is disclosed in detail in the specification of Japanese Patent Application No. 2001-123535 which has been proposed before by the same applicant as the present invention.

4. Construction of the Recording and Reproducing Apparatus

Subsequently, a construction of a disc drive apparatus (recording and reproducing apparatus) corresponding to the discs of the specifications of the next-generation MD1 and the next-generation MD2 will be described with reference to FIGS. 16 and 17.

Figure 16:
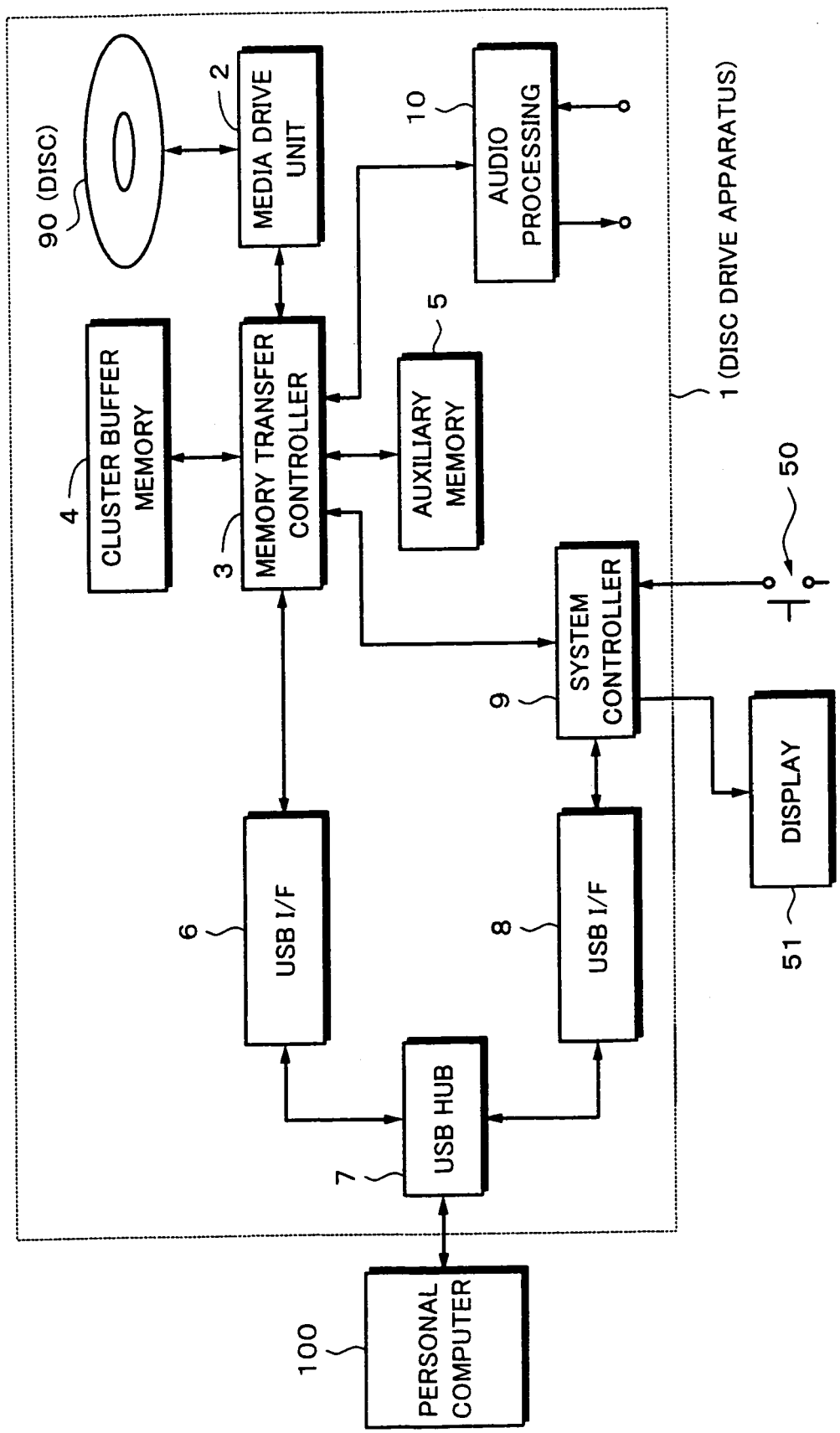
FIG. 16 is a block diagram of a disc drive apparatus.

In FIG. 16, a disc drive apparatus 1 is shown as an apparatus which can be connected to, for example, a personal computer 100.

The disc drive apparatus 1 has: a media drive unit 2; a memory transfer controller 3; a cluster buffer memory 4; an auxiliary memory 5; USB (Universal Serial Bus) interfaces 6 and 8; a USB hub 7; a system controller 9; and an audio processing unit 10.

The media drive unit 2 executes the recording/reproduction to/from a loaded disc 90. The disc 90 is a disc of the next-generation MD1, a disc of the next-generation MD2, or a disc of the existing MD. An internal construction of the media drive unit 2 will be explained hereinlater with reference to FIG. 17.

The memory transfer controller 3 controls transmission and reception of reproduction data from the media drive unit 2 and recording data which is supplied to the media drive unit 2.

The cluster buffer memory 4 executes a buffering operation of data read out from the data tracks of the disc 90 by the media drive unit 2 on a recording block unit basis on the basis of control of the memory transfer controller 3.

The auxiliary memory 5 stores various management information and special information read out from the disc 90 by the media drive unit 2 on the basis of the control of the memory transfer controller 3.

The system controller 9 controls the whole disc drive apparatus 1 and controls communication with the connected personal computer 100.

That is, the system controller 9 can communicate with the personal computer 100 connected via the USB I/F 8 and the USB hub 7 and executes reception of a command such as writing request, reading request, or the like, transmission of status information and other necessary information, and the like.

The system controller 9 instructs the media drive unit 2 to read out the management information or the like from the disc 90, for example, in accordance with the loading of the disc 90 into the media drive unit 2, thereby allowing the read-out management information or the like to be stored into the auxiliary memory 5 by the memory transfer controller 3.

If a reading request of a certain FAT sector is made by the personal computer 100, the system controller 9 allows the media drive unit 2 to execute the reading of the recording block including the FAT sector. Data of the read-out recording block is written into the cluster buffer memory 4 by the memory transfer controller 3.

The system controller 9 makes control for reading out the data of the requested FAT sector from the data of the recording block written in the cluster buffer memory 4 and transmitting it to the personal computer 100 via the USB I/F 6 and the USB hub 7.

If a writing request of a certain FAT sector is made by the personal computer 100, first, the system controller 9 allows the media drive unit 2 to execute the reading of the recording block including the FAT sector. The read-out recording block is written into the cluster buffer memory 4 by the memory transfer controller 3.

The system controller 9 allows the data (recording data) of the FAT sector from the personal computer 100 to be supplied to the memory transfer controller 3 via the USB I/F 6 and allows the rewriting of the data of the corresponding FAT sector to be executed on the cluster buffer memory 4.

The system controller 9 instructs the memory transfer controller 3 to transfer the data of the recording block stored in the cluster buffer memory 4 in a state where the necessary FAT sector has been rewritten to the media drive unit 2 as recording data. In the media drive unit 2, the recording data of the recording block is modulated and written onto the disc 90.

A switch 50 is connected to the system controller 9. The switch 50 sets an operating mode of the disc drive apparatus 1 into either the next-generation MD1 system or the existing MD system. That is, in the disc drive apparatus 1, the audio data can be recorded onto the disc 90 according to the existing MD system in both of the format of the existing MD system and the format of the next-generation MD1 system. The operating mode of the disc drive apparatus 1 main body can be clearly shown to the user by the switch 50.

A display 51 comprising, for example, an LCD (Liquid Crystal Display) is provided for the disc drive apparatus 1. The display 51 can display text data, simple icons, or the like and displays information regarding a status of the disc drive apparatus 1, a message to the user, or the like on the basis of a display control signal which is supplied from the system controller 9.

As an input system, the audio processing unit 10 has an analog audio signal input unit such as line input circuit, microphone input circuit, and the like, an A/D converter, and a digital audio data input unit. The audio processing unit 10 also has an ATRAC compression encoder/decoder and a buffer memory of compression data. Further, as an output system, the audio processing unit 10 has a digital audio data output unit, a D/A converter, and an analog audio signal output unit such as line output circuit, headphones output circuit, and the like.

If the disc 90 is a disc of the existing MD, when an audio track is recorded onto the disc 90, digital audio data (or analog audio signal) is inputted to the audio processing unit 10. Inputted linear PCM digital audio data or linear PCM audio data obtained by being inputted as an analog audio signal and converted by the A/D converter is ATRAC compression encoded and stored into the buffer memory. The audio data is read out from the buffer memory at predetermined timing (data unit corresponding to the ADIP cluster) and transferred to the media drive unit 2. In the media drive unit 2, the transferred compression data is EFM modulated and written as an audio track onto the disc 90.

If the disc 90 is a disc of the existing MD system, when the audio track of the disc 90 is reproduced, the media drive unit 2 demodulates the reproduction data into data in an ATRAC compression data state and transfers it to the audio processing unit 10 via the memory transfer controller 3. The audio processing unit 10 executes ATRAC compression decoding so as to obtain the linear PCM audio data and outputs it from the digital audio data output unit, or it is converted into an analog audio signal by the D/A converter and outputted by a line output/headphones output.

The connection to the personal computer 100 is not limited to the USB but can be made by using another external interface such as IEEE (Institute of Electrical and Electronics Engineers) 1394 or the like.

The recording/reproduction data management is made by using the FAT system. With respect to the conversion between the recording block and the FAT sector, it has been disclosed in detail in the specification of Japanese Patent Application No. 2001-289380 which has been proposed before by the same applicant as the present invention.

As mentioned above, in the case of rewriting the FAT sector, there are executed processes such that the recording block (RB) including the FAT sector is accessed, the data of the recording block is read out on the cluster buffer memory 4 and temporarily written into the cluster buffer memory 4, the FAT sector of the recording block is rewritten, and the recording block in which the FAT sector has been rewritten is written again onto the disc from the cluster buffer memory 4.

However, since the recordable area is not initialized in the discs of the next-generation MD1 and the next-generation MD2, there is a case where when the FAT sector is rewritten, if the recording block has not been used, when the data of the recording block is read out, an RF signal cannot be obtained, the reproduction data becomes an error, it cannot be read out, and the FAT sector cannot be written.

Also in the case of reading out the FAT sector, there are executed processes such that the recording block including the FAT sector is accessed, the data of the recording block is read out on the cluster buffer memory 4 and temporarily written into the cluster buffer memory 4, and the data of the target FAT sector is extracted from the recording block. Since the recordable area is not initialized either in this case, if this recording block has not been used, there is a case where the RF signal is not-obtained, the data cannot be read out, or error data is reproduced.

Therefore, whether the accessed recording block has not been used or not is discriminated. If this recording block has not been used, the reading of the recording block is not executed.

Figure 20:
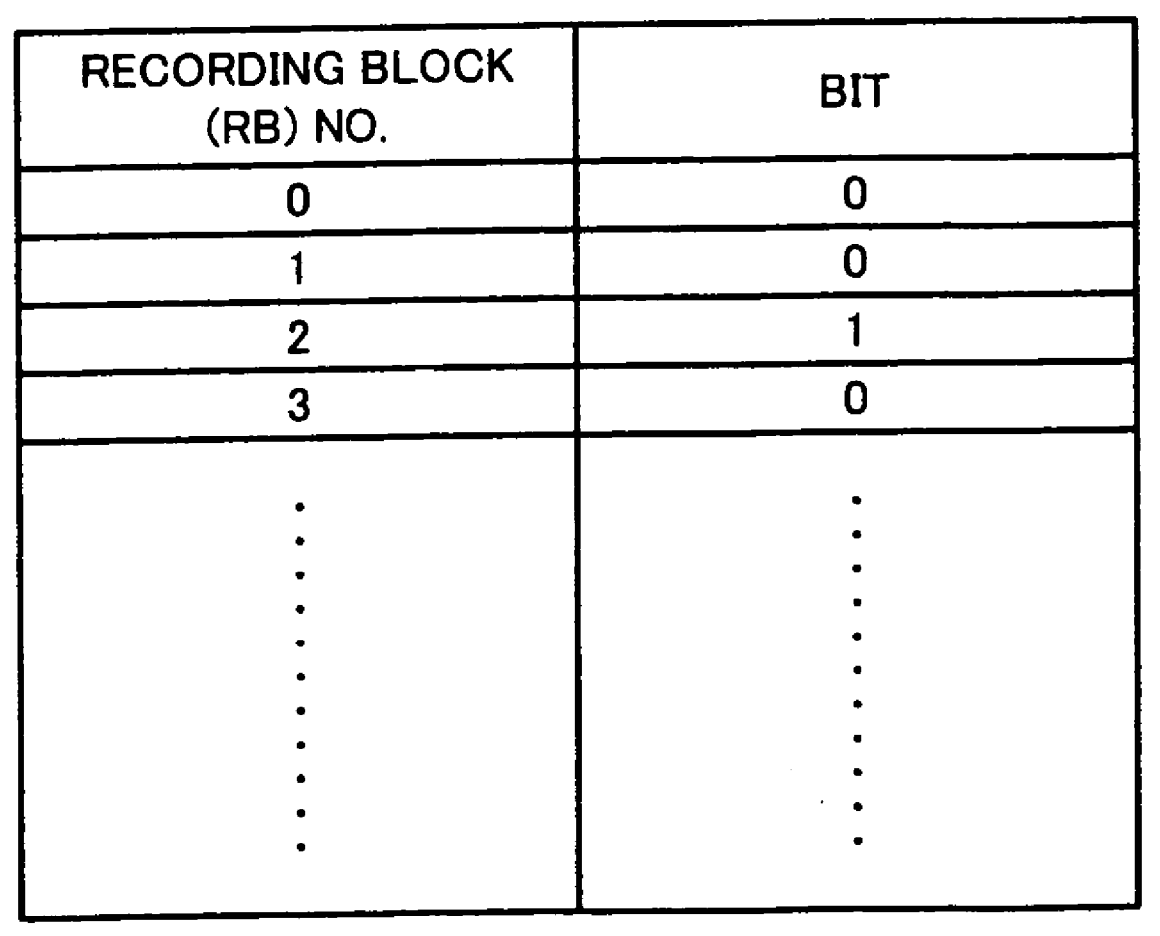

That is, as shown in FIG. 20, a signal recording bit map (SRB) showing whether the recording block has been used or not is formed every recording block number. A value of the bit of the signal recording bit map is equal to, for example, "0" if the writing operation has never been performed in this recording block. It is equal to, for example, "1" if the writing operation has been performed in this recording block.

Figure 21:
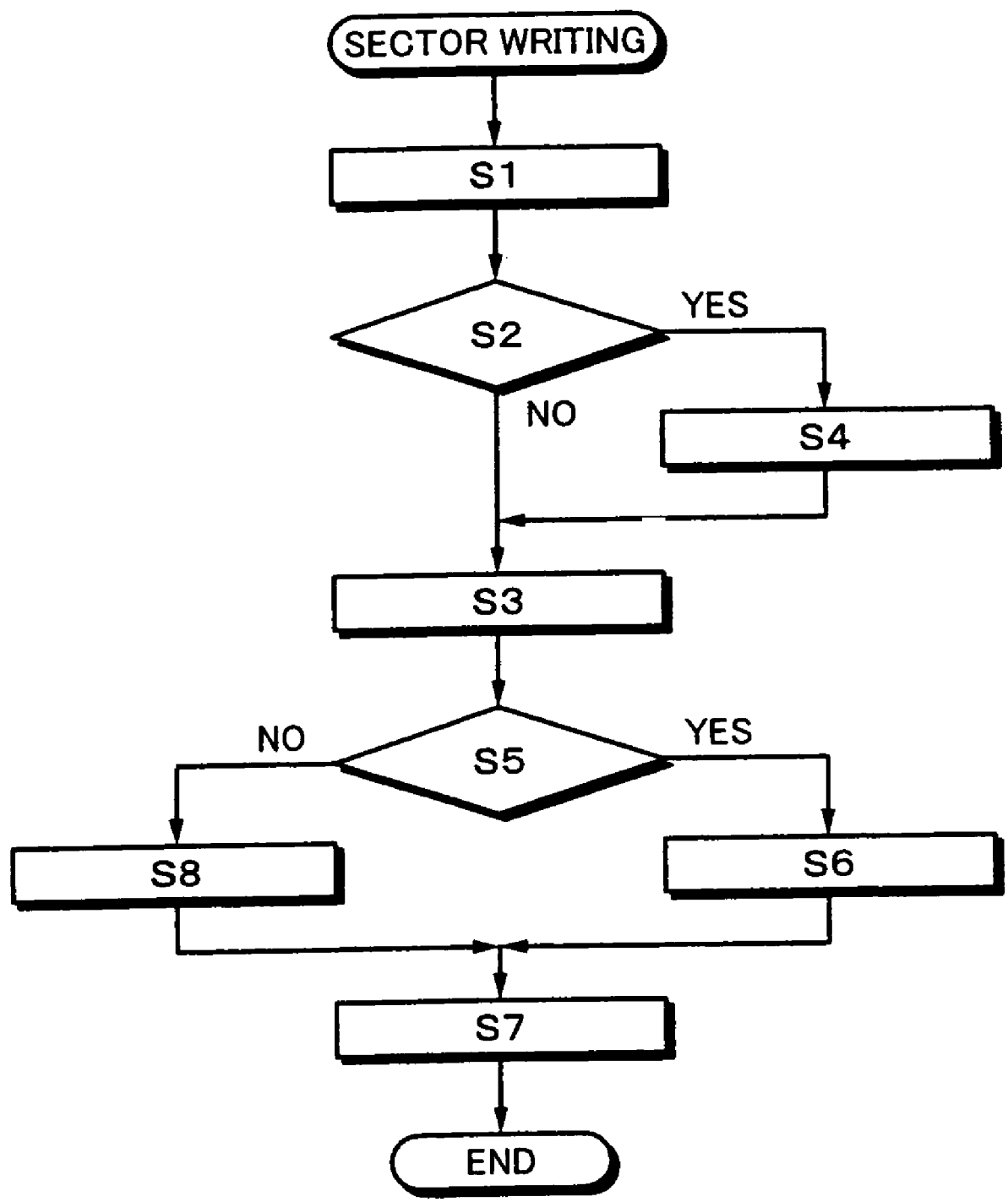
FIG. 21 is a flowchart showing a reading process of an FAT sector.

FIG. 21 is a flowchart showing processes which are executed in the case where the disc drive apparatus corresponding to the discs of the specifications of the next-generation MD1 and the next-generation MD2 is connected to the personal computer and the data is read out on an FAT sector unit basis.

In FIG. 21, if a read command of the FAT sector is issued from the personal computer side, the number of the recording block in which such a sector has been stored is obtained (step S1). The sector number which is instructed is an absolute sector number in which the head of a user area of the disc is set to 0. Whether an alternating process has been performed to the FAT sector or not is discriminated (step S2).

If it is determined in step S2 that the alternating process is not performed to the FAT sector, the target FAT sector is included in the recording block obtained in step S1. Therefore, the bit ("0" or "1") of the signal recording bit map corresponding to the recording block number is obtained (step S3).

If it is determined in step S2 that the alternating process has been performed to the FAT sector, since the FAT sector to be actually read out/written is an alternation sector, the number of the recording block of the alternation sector to be actually read out/written is obtained from an alternation table of the DDT (step S4). The bit ("0" or "1") of the signal recording bit map corresponding to the number of the recording block in which the alternation sector is included is obtained (step S3).

The signal recording bit map is constructed as shown in FIG. 20. If the writing operation has never been performed in this recording block, its value is equal to, for example, "0". If the writing operation has been performed in this recording block, its value is equal to, for example, "1". Whether this recording block is a recording block having a writing history or not is discriminated from the signal recording bit map (step S5).

If it is determined in step S5 that the value of the bit of the signal recording bit map of the recording block number is equal to "1" and this recording block is a recording block having the writing history, the data of this recording block is read out from the disc into the cluster buffer memory 4 (step S6). The portion corresponding to the target FAT sector is extracted from the cluster buffer memory 4 and outputted as read data (step S7).

If it is determined in step S5 that the value of the bit of the signal recording bit map of the recording block number is equal to "0" and this recording block is a recording block without a writing history, the cluster buffer memory 4 is embedded with all "0" (step S8). The portion corresponding to the target FAT sector is extracted from the cluster buffer memory 4 and outputted as read data (step S7).

Figure 22:
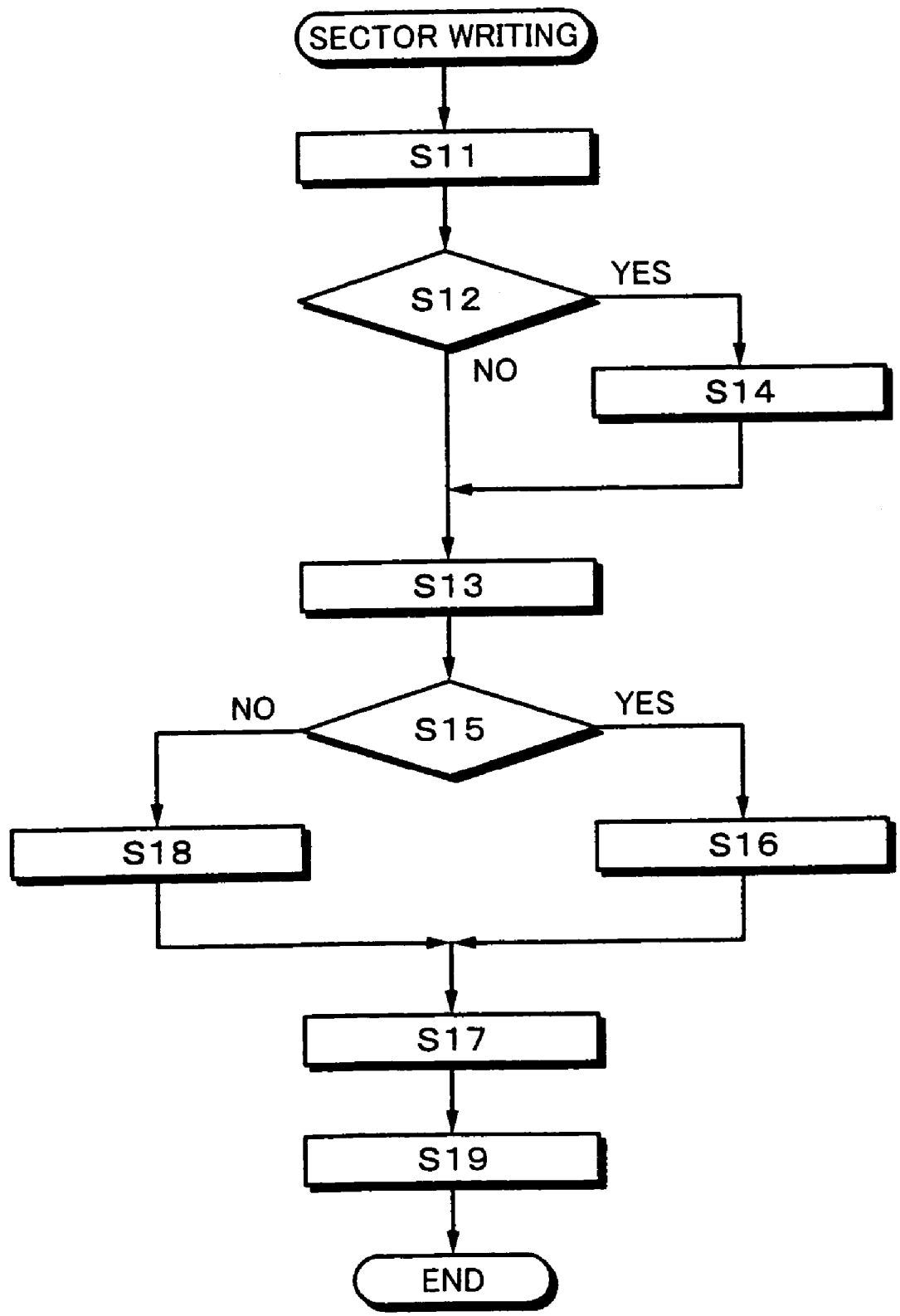
FIG. 22 is a flowchart showing a writing process of the FAT sector.

FIG. 22 is a flowchart showing processes which are executed in the case where the disc drive apparatus corresponding to the discs of the specifications of the next-generation MD1 and the next-generation MD2 is connected to the personal computer and the data is written on an FAT sector unit basis.

In FIG. 22, if a write command of the FAT sector is issued from the personal computer side, the number of the recording block in which such a sector has been stored is obtained (step S11). The sector number which is instructed is the absolute sector number in which the head of the user area of the disc is set to 0. Whether the alternating process has been performed to the FAT sector or not is discriminated (step S12).

If it is determined in step S12 that the alternating process is not performed to the FAT sector, the target FAT sector is included in the recording block obtained in step S11. Therefore, the bit ("0" or "1") of the signal recording bit map corresponding to the recording block number is obtained (step S13).

If it is determined in step S12 that the alternating process has been performed to the FAT sector, since the FAT sector to be actually read out/written is an alternation sector, the number of the recording block of the alternation sector to be actually read out/written is obtained from the alternation table of the DDT (step S14). The bit ("0" or "1") of the signal recording bit map corresponding to the number of the recording block in which the alternation sector is included is obtained (step S13).

The signal recording bit map is constructed as shown in FIG. 20. If the writing operation has never been performed in this recording block, its value is equal to, for example, "0". If the writing operation has been performed in this recording block, its value is equal to, for example, "1". Whether this recording block is a recording block having the writing history or not is discriminated from the signal recording bit map (step S15).

If it is determined in step S15 that the value of the bit of the signal recording bit map of the recording block number is equal to "1" and this recording block is a recording block having the writing history, the data of this recording block is read out from the disc into the cluster buffer memory 4 (step S16). The data of the portion corresponding to the target FAT sector of this recording block is replaced with the write data on the cluster buffer memory 4 (step S17).

If it is determined in step S15 that the value of the bit of the signal recording bit map of the recording block number is equal to "0" and this recording block is a recording block without a writing history, the cluster buffer memory 4 is embedded with all "0" (step S18). The data of the portion corresponding to the target FAT sector of the recording block is replaced with the write data on the cluster buffer memory 4 (step S17).

If the data of the portion corresponding to the target FAT sector of the recording block is replaced with the write data on the cluster buffer memory 4 in step S17, the data of the recording block is written onto the disc (step S19).

As mentioned above, in the case of reading or writing the FAT sector, whether the recording block including the FAT sector has not been used or not is discriminated. If it is the recording block which has not been used, the reading of the recording block is not performed but the cluster buffer memory 4 is embedded with all "0". Thus, the recording block which has not been used is processed as an initial value "0". Therefore, when the recording or reproduction is performed on an FAT sector unit basis, even if the recording block including the FAT sector has not been used and the RF signal is not obtained, no error data is caused.

In the foregoing example, the disc drive apparatus corresponding to the discs of the specifications of the next-generation MD1 and the next-generation MD2 is connected to the personal computer and the data is read out and written. In this case, the FAT sector to be read out or written is given as an absolute sector number in which the head of the user area is set to 0 from the personal computer. On the other hand, if the disc drive apparatus is solely used, as shown in FIGS. 23 and 24, the target FAT sector is obtained by the directory entry of the file and the FAT chain.

Figure 23:
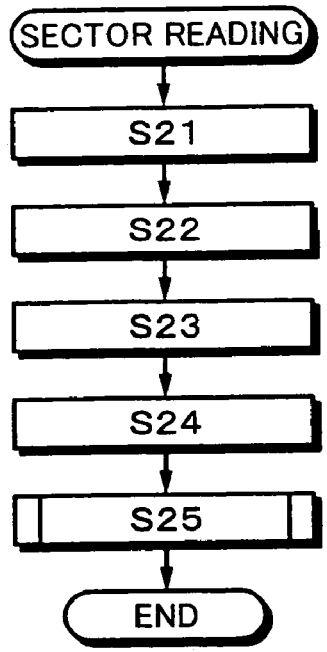
FIG. 23 is a flowchart showing a reading process of the FAT sector in a single apparatus.

FIG. 23 is a flowchart showing processes which are executed in the case of reading out the FAT sector solely by the disc drive apparatus corresponding to the discs of the specifications of the next-generation MD1 and the next-generation MD2.

In FIG. 23, a relative cluster number of the FAT cluster in which the target FAT sector is included is obtained (step S21). The head absolute cluster number is obtained from the directory entry of the file (step S22). The absolute cluster number of the target FAT cluster is obtained from the head absolute cluster number by tracing the chain of the FAT table (step S23). The absolute sector number of the target FAT sector is obtained from the absolute cluster number of the target FAT cluster (step S24). If the absolute sector number of the target FAT sector is obtained, the reading process of the FAT sector is executed (step S25). The reading process of the sector is similar to that shown in FIG. 21.

Figure 24:
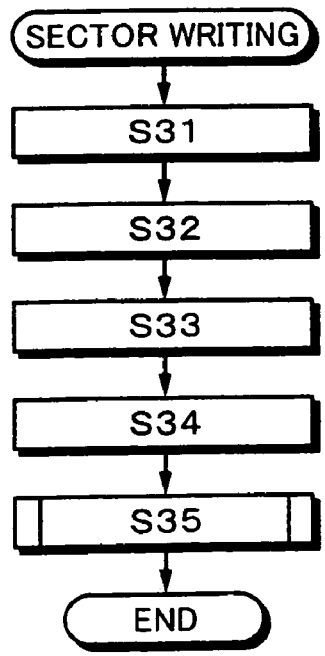
FIG. 24 is a flowchart showing a writing process of the FAT sector in the single apparatus.

FIG. 24 is a flowchart showing processes which are executed in the case of writing the FAT sector solely by the disc drive apparatus corresponding to the discs of the specifications of the next-generation MD1 and the next-generation MD2.

In FIG. 24, a relative cluster number of the FAT cluster in which the target FAT sector is included is obtained (step S31). The head absolute cluster number is obtained from the directory entry of the file (step S32). The absolute cluster number of the target FAT cluster is obtained from the head absolute cluster number by tracing the chain of the FAT table (step S33). The absolute sector number of the target FAT sector is obtained from the absolute cluster number of the target FAT cluster (step S34). If the absolute sector number of the target FAT sector is obtained, the writing process of the FAT sector is executed (step S35). The writing process of the sector is similar to that shown in FIG. 22.

In the above example, whether the recording block in which the target FAT sector is included has been used or not can be discriminated by using the signal recording bit map shown in FIG. 20. The FAT is managed on an FAT cluster unit basis of, for example, 32 kbytes. By using the information of the FAT, whether the recording block has been used or not can be discriminated on an FAT cluster unit basis. From the information of the FAT, the signal recording bit map showing whether the recording block has been used or not can be formed every recording block of, for example, 64 kbytes.

Figure 25:
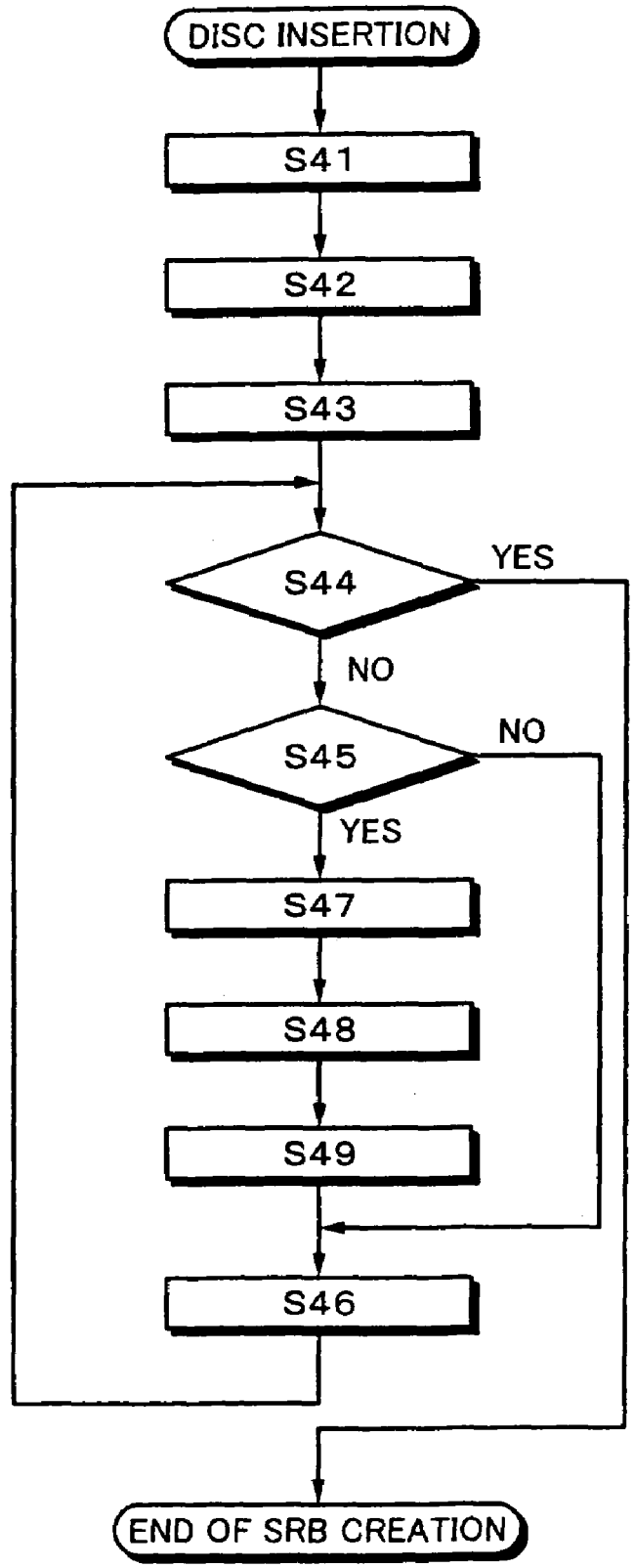
FIG. 25 is a flowchart for use in explanation of creation of the signal recording bit map.

FIG. 25 is a flowchart showing processes which are executed in the case of forming the signal recording bit map by using the FAT information. In FIG. 25, when the disc is inserted, values of the recording blocks of the signal recording bit map are set to all "0" (step S41). The FAT information is read (step S42). The head of the entry of the FAT is accessed (step S43).

Subsequently, whether the FAT cluster is an FAT cluster in which the head to final entries of the FAT have been used or not is discriminated. Processes such that the value of the bit of the signal recording bit map corresponding to the FAT cluster which has not been used is held to "0" and the value of the bit of the signal recording bit map corresponding to the FAT cluster which has been used is set to "1" are executed.

That is, if the head of the entry of the FAT is accessed in step S43, whether the entry is the final FAT entry or not is discriminated (step S44). If it is not the final FAT entry, whether the FAT cluster is an FAT cluster which has been used or not is discriminated (step S45).

If it is determined in step S45 that the FAT cluster is an FAT cluster which has not been used, the processing routine advances to the next FAT entry (step S46) and is returned to step S44.

If it is determined in step S45 that the FAT cluster is an FAT cluster which has been used, the number of the signal recording bit map in which such an FAT cluster has been stored is obtained (step S47). The value of the bit corresponding to the signal recording bit map is set to "1" (step S48). The processing routine advances to the next FAT entry (step S49) and is returned to step S44.

By repeating the processes in steps S44 to S49, the value of the bit of the signal recording bit map corresponding to the FAT cluster which has not been used is held to "0" and the value of the bit of the signal recording bit map corresponding to the FAT cluster which has been used is set to "1".

If it is determined in step S44 that the FAT entry is the final FAT entry, the creation of the signal recording bit map is completed here (step S50).

As mentioned above, by using the information of the FAT, the signal recording bit map can be formed. However, in accordance with an operating system, there is a case where the FAT cluster which is obtained from the FAT information and has been used does not denote an FAT cluster in which the data has actually been written. In the case of using such an operating system, there is a case where in spite of the fact that the FAT cluster is determined to be the used cluster from the FAT information, the FAT cluster in an unused state exists actually.

Therefore, the signal recording bit map is left on the disc. That is, as shown in FIGS. 2 and 4, the reserved track is provided between the DDT track and the FAT track on the discs of the specifications of the next-generation MD1 and the next-generation MD2. This reserved track is assumed to be a recording track of the signal recording bit map. The information of the signal recording bit map shown in FIG. 20 is recorded onto the recording track of the signal recording bit map.

If the position of the recording track of the signal recording bit map has previously been determined in accordance with the system, the recording track can be directly accessed from the predetermined position. If the positions of the DDT track and the FAT track have also previously been determined in accordance with the system, they can be directly accessed from the predetermined positions. Naturally, the positions of those special tracks can be written into a managing area (the U-TOC in the case of the next-generation MD1; the control area in which the control information according to the ADIP has been recorded in the case of the next-generation MD2). When the disc is loaded, the information of the DDT track or the FAT track is read out and stored into the buffer memory, and alternation sector information and FAT information are formed on the basis of it. Those information is updated while the disc is used. When the disc is ejected, the updated alternation sector information or FAT information is written back to the DDT track or the FAT track. Processes of the recording track of the signal recording bit map are fundamentally similar to those of the DDT track and the FAT track.

When the disc is inserted, the information of the recording track of the signal recording bit map is read out and stored into the memory. The signal recording bit map in the memory is updated each time data is newly recorded into the recording block. When the disc is ejected, the updated signal recording bit map on the memory is recorded onto the recording track of the signal recording bit map.

Figure 26:
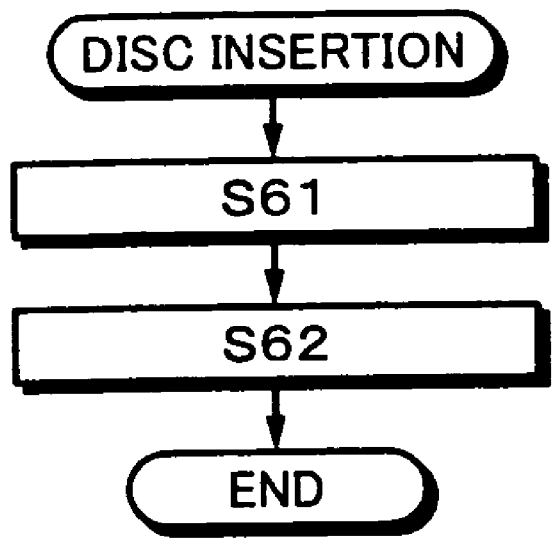
FIG. 26 is a flowchart for use in explanation of the creation of the signal recording bit map.

FIG. 26 is a flowchart showing a reading process of the recording track of the signal recording bit map. As shown in FIG. 26, when the disc is inserted, the recording track of the signal recording bit map is read out (step S61). The information of the read-out recording track of the signal recording bit map is stored into the memory and the signal recording bit map is formed into the memory (step S62).

Figure 27:
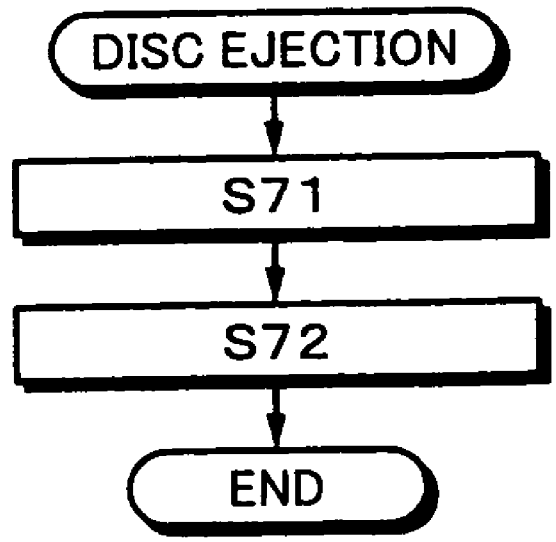
FIG. 27 is a flowchart for use in explanation of the creation of the signal recording bit map.

FIG. 27 is a flowchart showing processes which are executed when the signal recording bit map is written back to the recording track of the signal recording bit map. The signal recording bit map in the memory is updated each time data is newly recorded into the recording block.

As shown in FIG. 27, when the disc is ejected, the updated signal recording bit map is read out from the memory (step S71). The updated signal recording bit map is written onto the recording track of the signal recording bit map (step S72).

The information of the signal recording bit map track is set to all "0" in an initial state. By repetitively using the disc, the value of the bit of the signal recording bit map corresponding to the recording block used for writing the data is updated to "1". The information of the signal recording bit map is written onto the recording track of the signal recording bit map of the disc. When the disc is subsequently used, by reading out the information of the recording track of the signal recording bit map, the signal recording bit map can be formed. By executing the above processes, the signal recording bit map can be formed independently of the FAT information.

Subsequently, a construction of the media drive unit 2 having the functions for recording and reproducing both of the data track and the audio track will be described with reference to FIG. 17.

Figure 17:
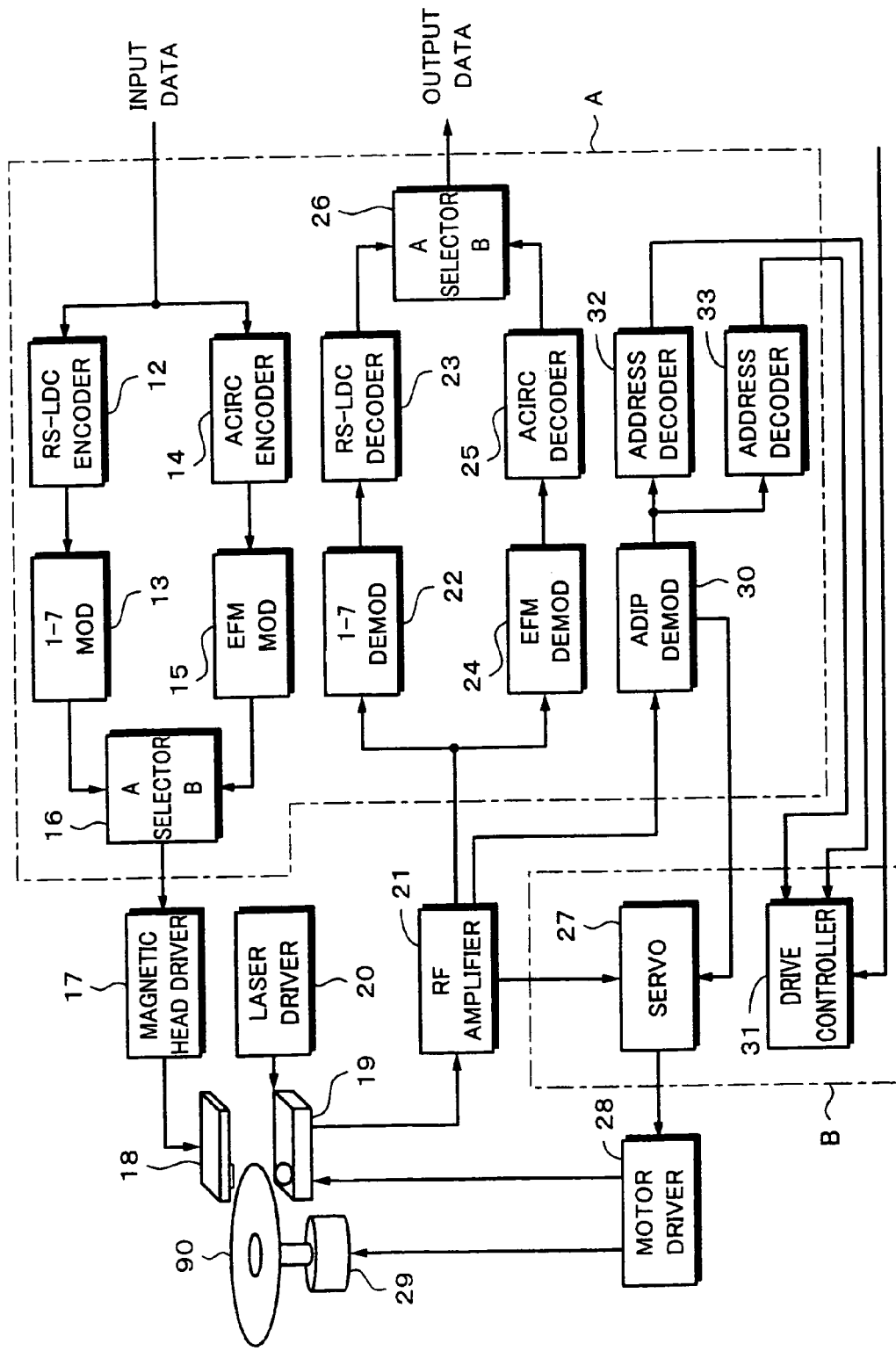
FIG. 17 is a block diagram showing a construction of a media drive unit.

FIG. 17 shows the construction of the media drive unit 2. The media drive unit 2 has a turntable on which the disc of the existing MD system, the disc of the next-generation MD1, and the disc of the next-generation MD2 are mounted. In the media drive unit 2, the disc 90 mounted onto the turntable is rotated by a spindle motor 29 in accordance with the CLV system. A laser beam is irradiated onto the disc 90 by an optical head 19 upon recording/reproduction.

The optical head 19 generates the laser beam of a high level for heating the recording track to a Curie temperature upon recording and generates the laser beam of a relatively low level for detecting data from a reflected light by a magnetic Kerr effect upon reproduction. Therefore, although not shown in detail here, an optical system comprising a laser diode serving as laser output means, a polarization beam splitter, an objective lens, and the like and a detector for detecting the reflected light are provided for the optical head 19. The objective lens provided for the optical head 19 is held so that it can be displaced by, for example, a biaxial mechanism in the disc radial direction and the direction where it is come into contact with and is away from the disc.

A magnetic head 18 is arranged in a position where it faces the optical head 19 through the disc 90. The magnetic head 18 executes the operation for applying a magnetic field modulated by the recording data to the disc 90. Although not shown, a sled motor and a sled mechanism for moving the whole optical head 19 and the magnetic head 18 in the disc radial direction are provided.

In the case of the disc of the next-generation MD2, the optical head 19 and the magnetic head 18 can form a micro mark by executing pulse drive magnetic field modulation. In the case of the disc of the existing MD or the disc of the next-generation MD1, a magnetic field modulation system of DC light emission is used.

In the media drive unit 2, a recording processing system, a reproduction processing system, a servo system, and the like are provided in addition to the recording and reproducing head system comprising the optical head 19 and the magnetic head 18 and a disc rotating system by the spindle motor 29.

As a disc 90, there is a possibility that the disc of the existing MD specifications, the disc of the specifications of the next-generation MD1, or the disc of the specifications of the next-generation MD2 is mounted. Linear velocities are different independence on those discs. The spindle motor 29 can rotate the disc at a rotational speed corresponding to each of a plurality of types of discs of different linear velocities. The disc 90 mounted on the turntable is rotated in correspondence to each of the linear velocity of the disc of the existing MD specifications, the linear velocity of the disc of the specifications of the next-generation MD1, and the linear velocity of the disc of the specifications of the next-generation MD2.

In the recording processing system, there are provided: a portion where in the case of the disc of the existing MD system, upon recording of the audio track, error correction coding is performed by the ACIRC and data is modulated by the EFM and recorded; and a portion where in the case of the next-generation MD1 or the next-generation MD2, error correction coding is performed by a system in which the BIS and the LDC are combined and data is modulated by the 1-7 pp modulation and recorded.

In the reproduction processing system, there are provided: a portion where in the case of reproducing the disc of the existing MD system, the demodulation of the EFM and the error correcting process by the ACIRC are executed; and a portion where in the case of reproducing the disc of the next-generation MD1 or next-generation MD2 system, the 1-7 demodulation based on the data detection using Partial Response and the Viterbi decoding and the error correcting process by the BIS and the LDC are executed.

A portion where addresses by the ADIP signal of the existing MD system or the next-generation MD1 are decoded and a portion where the ADIP signal of the next-generation MD2 is decoded are provided.

Information detected as a reflected light by the laser irradiation onto the disc 90 by the optical head 19 (photo current which is obtained by detecting the reflected laser beam by a photodetector) is supplied to an RF amplifier 21.

In the RF amplifier 21, current-voltage conversion, amplification, a matrix arithmetic operation, and the like are executed to the inputted detection information and a reproduction RF signal as reproduction information, a tracking error signal TE, a focusing error signal FE, groove information (ADIP information recorded on the disc 90 by wobbling the track), and the like are extracted.

When the disc of the existing MD system is reproduced, the reproduction RF signal obtained by the RF amplifier is processed by an EFM demodulating unit 24 and an ACIRC decoder 25. That is, the reproduction RF signal is binarized to an EFM signal train and, thereafter, EFM demodulated by the EFM demodulating unit 24, and further, it is subjected to an error correction and a deinterleaving process by the ACIRC decoder 25. That is, the signal enters a state of ATRAC compression data at this time point.

When the disc of the existing MD system is reproduced, a B contact side of a selector 26 is selected and the demodulated ATRAC compression data is outputted as reproduction data from the disc 90.

When the disc of the next-generation MD1 or the next-generation MD2 is reproduced, the reproduction RF signal obtained by the RF amplifier is processed by an RLL(1-7)PP demodulating unit 22 and an RS-LDC decoder 25. That is, as for the reproduction RF signal, in the RLL(1-7)PP demodulating unit 22, reproduction data as an RLL(1-7) code train is obtained by the data detection using the PR(1, 2, 1)ML or PR(1, −1)ML and the Viterbi decoding, and the RLL(1-7) demodulating process is executed to the RLL(1-7) code train. Further, error correction and a deinterleaving process are executed by the RS-LDC decoder 23.

When the disc of the next-generation MD1 or the next-generation MD2 is reproduced, an A contact side of the selector 26 is selected and the demodulated data is outputted as reproduction data from the disc 90.

The tracking error signal TE and the focusing error signal FE which are outputted from the RF amplifier 21 are supplied to a servo circuit 27 and the groove information is supplied to an ADIP demodulating unit 30.

The ADIP demodulating unit 30 band-limits the groove information by a band pass filter, extracts wobble components, and thereafter, executes frequency demodulation and biphase demodulation, thereby demodulating the ADIP signal. The demodulated ADIP signal is supplied to an address decoder 32 and an address decoder 33.

In the disc of the existing MD system or the disc of the next-generation MD1, as shown in FIG. 9, the ADIP sector number consists of 8 bits. On the other hand, in the disc of the next-generation MD2, as shown in FIG. 11, the ADIP sector number consists of 4 bits. The address decoder 32 decodes the ADIP address of the existing MD or the next-generation MD1. The address decoder 33 decodes the address of the next-generation MD2.

The ADIP addresses decoded by the address decoders 32 and 33 are supplied to a drive controller 31. The drive controller 31 executes a desired control process on the basis of the ADIP addresses. The groove information is supplied to the servo circuit 27 in order to make spindle servo control.

The servo circuit 27 forms a spindle error signal for CLV or CAV servo control on the basis of, for example, an error signal obtained by integrating a phase error between the groove information and a reproducing clock (PLL system clock upon decoding).

The servo circuit 27 forms various servo control signals (a tracking control signal, a focusing control signal, a sled control signal, a spindle control signal, etc.) on the basis of the spindle error signal, the tracking error signal and the focusing error signal supplied from the RF amplifier 21, a track jump command or an access command from the drive controller 31, or the like and outputs them to a motor driver 28. That is, the various servo control signals are formed by executing necessary processes such as phase compensating process, gain process, target value setting process, and the like in response to the servo error signals or command.

In the motor driver 28, desired servo drive signals are formed on the basis of the servo control signals supplied from the servo circuit 27. As servo control signals here, there are biaxial drive signals (two kinds of signals in the focusing direction and the tracking direction) for driving a biaxial mechanism, a sled motor drive signal for driving the sled mechanism, and a spindle motor drive signal for driving the spindle motor 29. Focusing control and tracking control for the disc 90 and CLV or CAV control for the spindle motor 29 are made by those servo drive signals.

When the audio data is recorded by the disc of the existing MD system, a selector 16 is connected to a B contact, so that an ACIRC encoder 14 and an EFM modulating unit 15 function. In this case, the compression data from the audio processing unit 10 is interleaved and added with an error correction code by the ACIRC encoder 14 and, thereafter, EFM modulated by the EFM modulating unit 15.

The EFM modulation data is supplied to a magnetic head driver 17 via the selector 16. The magnetic head 18 applies a magnetic field to the disc 90 on the basis of the EFM modulation data, so that the recording of an audio track is performed.

When data is recorded to the disc of the next-generation MD1 or the next-generation MD2, the selector 16 is connected to an A contact, so that an RS-LDC encoder 12 and an RLL(1-7)PP modulating unit 13 function. In this case, high density data from the memory transfer controller 3 is interleaved and added with an error correction code based on the RS-LDC system by the RS-LDC encoder 12 and, thereafter, it is subjected to RLL(1-7) modulation by the RLL(1-7)PP modulating unit 13.

Recording data as an RLL(1-7) code train is supplied to the magnetic head driver 17 via the selector 16. The magnetic head 18 applies a magnetic field to the disc 90 on the basis of the modulation data, so that the recording of a data track is performed.

A laser driver/APC 20 allows the laser diode to executes a laser light emitting operation upon reproduction and recording as mentioned above and also executes what is called an APC (Automatic Lazer Power Control) operation.

That is, although not shown, a detector for monitoring a laser power is provided in the optical head 19 and its monitor signal is fed back to the laser driver/APC 20. The laser driver/APC 20 compares the present laser power which is obtained as a monitor signal with a set laser power and reflects a difference between them to the laser drive signal, thereby controlling so that the laser power which is generated from the laser diode is stabilized to a set value.

As a laser power, values as a reproducing laser power and a recording laser power are set into a register in the laser driver/APC 20 by the drive controller 31.

The drive controller 31 controls so that the foregoing operations (the operations for access, various servo, data writing, and data reading) are executed on the basis of instructions from the system controller 9.

In FIG. 17, each of an A portion and a B portion surrounded by an alternate long and short dash line can be constructed as, for example, a circuit portion of one chip.

5. With Respect to an Initializing Process of the Discs According to the Next-Generation MD1 and the Next-Generation MD2

As mentioned above, the UID (unique ID) is recorded out of the FAT on the discs according to the next-generation MD1 and the next-generation MD2 and security management is made by using the recorded UID. In the case of the discs corresponding to the next-generation MD1 and the next-generation MD2, in principle, the UID is preliminarily recorded in a predetermined position, for example, the lead-in area on the disc and the disc is shipped. The position where the UID is preliminarily recorded is not limited to the lead-in area. For example, if the position where the UID is written after the initialization of the disc is fixed, it can be also previously written in such a position.

On the other hand, as a disc according to the next-generation MD1, the disc according to the existing MD system can be used. Therefore, a number of discs according to the existing MD system which have already been on the market in a state where no UID is recorded are used as discs of the next-generation MD1.

Therefore, for such discs according to the existing MD system which have already been on the market in a state where no UID is recorded, an area protected by the standard is provided, a random number signal is recorded into such an area by the disc drive apparatus 1 upon initialization of the disc and used as a UID of the disc. The operation such that the user accesses the area in which the UID has been recorded is inhibited by the standard. The UID is not limited to the random number signal. For example, it is possible to combine a maker code, a device code, a device serial number, and random numbers and use them as a UID. Further, it is also possible to combine one of the maker code, the device code, and the device serial number or a plurality of them and the random numbers and use them as a UID.

Figure 18:
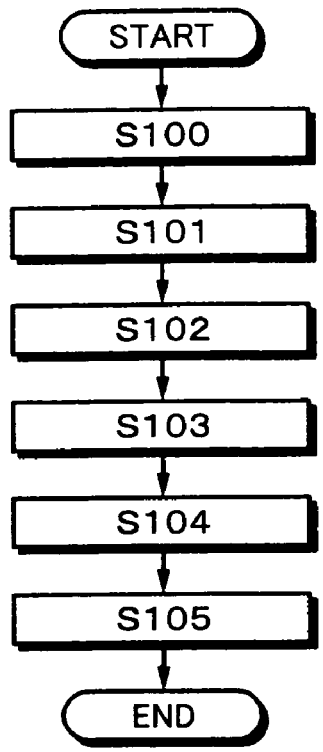
FIG. 18 is a flowchart showing an initializing process of an example of the disc according to the next-generation MD1.

FIG. 18 is a flowchart showing an initializing process of an example of the disc according to the next-generation MD1. In first step S100, a predetermined position on the disc is accessed and whether the UID has been recorded or not is discriminated. If it is determined that the UID has been recorded, the UID is read out and temporarily stored into, for example, the auxiliary memory 5.

The position which is accessed in step S100 is a position out of the FAT area of the format according to the next-generation MD1 system such as a lead-in area. If the DDT has already been provided for the disc 90, for example, like a disc which was initialized in the past, such an area can be accessed. The process in step S100 can be omitted.

Subsequently, the U-TOC is recorded by the EFM modulation in step S101. At this time, information for assuring the alert track and the track after the DDT in FIG. 2 mentioned above, that is, the area where the data is modulated by the 1-7 pp modulation and recorded is written into the U-TOC. In next step S102, the alert track is recorded by the EFM modulation into the area assured by the U-TOC in step S101. The DDT is recorded by the 1-7 pp modulation in step S103.

The UID is recorded into an area out of the FAT, for example, into the DDT in step S104. If the UID has been read out from a predetermined position on the disc and stored in the auxiliary memory 5 in step S100 mentioned above, the UID is recorded. If it is determined in step S100 that the UID is not recorded in the predetermined position on the disc or if step S100 mentioned above is omitted, the UID is formed on the basis of the random number signal and this formed UID is recorded. The creation of the UID is performed by, for example, the system controller 9 and the formed UID is supplied to the media drive 2 via the memory transfer controller 3 and recorded onto the disc 90.

Subsequently, in step S105, the data such as an FAT is recorded into the area where the data is modulated by the 1-7 pp modulation and recorded. That is, the area in which the UID is recorded is an area out of the FAT. As mentioned above, in the next-generation MD1, the initialization of the recordable area to be managed by the FAT is not always necessary.

Figure 19:
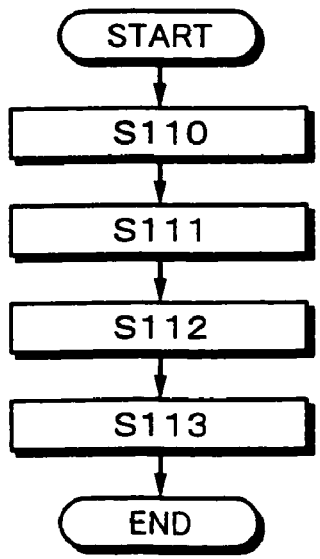
FIG. 19 is a flowchart showing an initializing process of an example of the disc according to the next-generation MD2.

FIG. 19 is a flowchart showing the initializing process of an example of the disc according to the next-generation MD2. In first step S110, a predetermined position where the UID has previously been written, for example, the lead-in area and, if the disc 90 is a disc which was initialized in the past, the DDT or the like provided at the time of the past initialization are accessed and whether the UID has been recorded or not is discriminated. If it is determined that the UID has been recorded, the UID is read out and temporarily stored into, for example, the auxiliary memory 5. Since the recording position of the UID has fixedly been determined on the format, the UID can be directly accessed without referring to other management information on the disc. It can be also applied to the processes described by using FIG. 18 mentioned above.

In next step S111, the DDT is recorded by the 1-7 pp modulation. Subsequently, the UID is recorded into an area out of the FAT, for example, into the DDT in step S112. As a UID which is recorded at this time, the UID read out from the predetermined position on the disc and stored in the auxiliary memory 5 in step S110 mentioned above is used. If it is determined in step S110 mentioned above that the UID is not recorded in the predetermined position on the disc, the UID is formed on the basis of the random number signal and recorded. The creation of the UID is made by, for example, the system controller 9 and the formed UID is supplied to the media drive 2 via the memory transfer controller 3 and recorded onto the disc 90.

The FAT or the like is recorded in step S113. That is, the area in which the UID is recorded is an area out of the FAT. As mentioned above, in the next-generation MD2, the initialization of the recordable area to be managed by the FAT is not performed.

6. With Respect to the First Management System of Music Data

As mentioned above, in the systems of the next-generation MD1 and the next-generation MD2 to which the invention is applied, the data is managed by the FAT system. The audio data to be recorded is compressed by a desired compression system and encrypted in order to protect the right of a copyrighter. As a compression system of the audio data, for example, use of ATRAC3, ATRAC5, or the like is considered. Naturally, another compression system such as MP3 (MPEG1 Audio Layer-3), AAC (MPEG2 Advanced Audio Coding), etc. can be also used. Not only the audio data but also still image data or motion image data can be also handled. Naturally, since the FAT system is used, it is also possible to record and reproduce general data.

A management system at the time of recording or reproducing the audio data onto/from the discs of the specifications of the next-generation MD1 and the next-generation MD2 as mentioned above will be described.

In the system of the next-generation MD1 and the system of the next-generation MD2, since music data of high sound quality of a long time can be reproduced, the number of music pieces which are managed by one disc is extremely large. Since they are managed by using the FAT system, affinity with computers is accomplished. Although it provides an advantage such that use efficiency can be improved, there is a possibility that the music data is illegally copied and the copyrighter cannot be protected. In the management system to which the invention is applied, a consideration is made to such a point.

Figure 28:
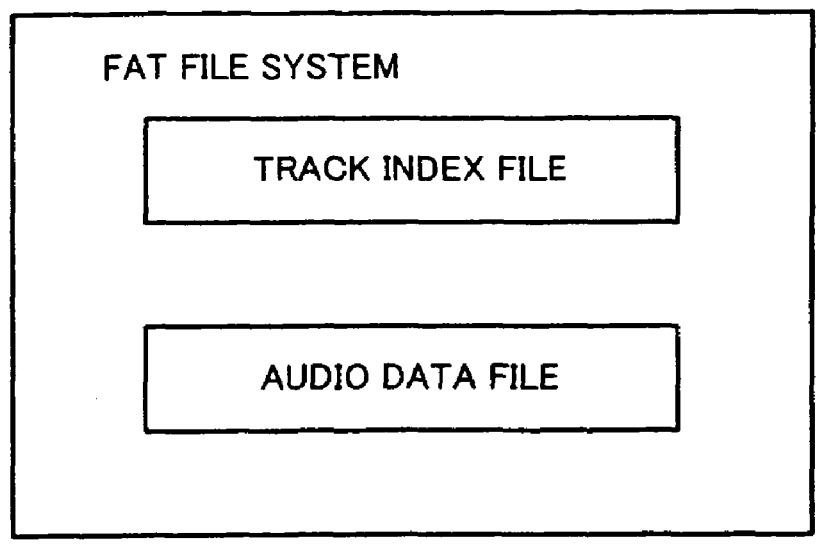
FIG. 28 is a diagram for use in explanation of the first example of a management system of audio data.

FIG. 28 shows the first example of the management system of the audio data. As shown in FIG. 28, in the management system of the first example, a track index file and an audio data file are formed on the disc. The track index file and the audio data file are files which are managed by the FAT system.

Figure 29:
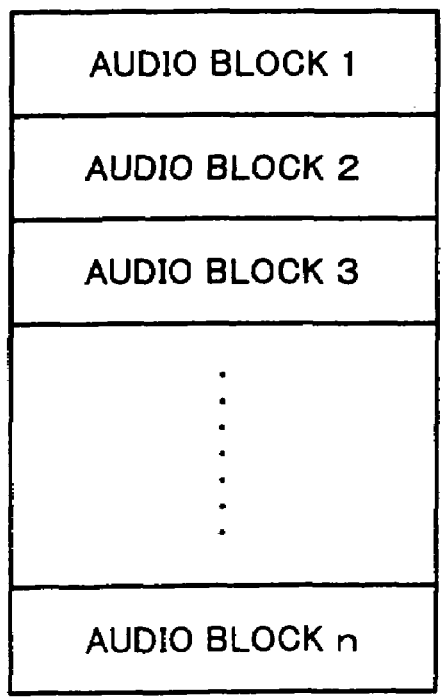
FIG. 29 is a diagram for use in explanation of an audio data file according to the first example of the management system of the audio data.

As shown in FIG. 29, the audio data file is a file obtained by enclosing a plurality of music data as one file. When the audio data file is seen in the FAT system, it seems like a giant file. The inside of the audio data file is divided into parts and the audio data is handled as a set of parts.

Figure 30:
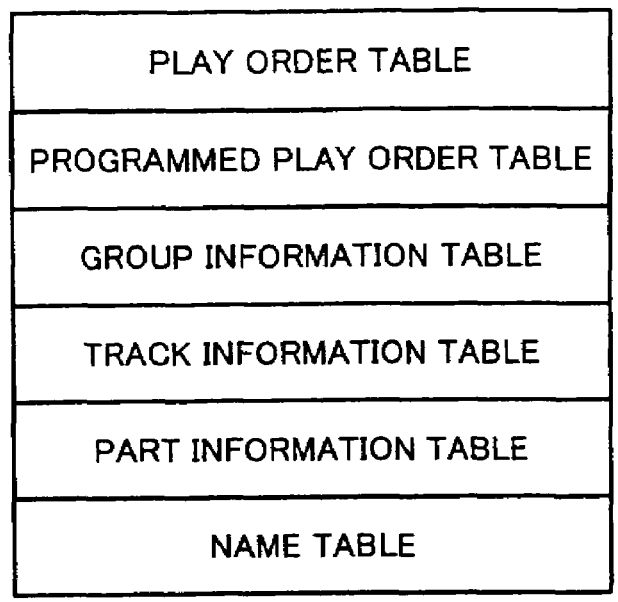
FIG. 30 is a diagram for use in explanation of a track index file according to the first example of the management system of the audio data.

The track index file is a file in which various information for managing the music data enclosed in the audio data file has been described. As shown in FIG. 30, the track index file comprises: a play order table; a programmed play order table; a group information table; a track information table; a parts information table; and a name table.

Figure 31:
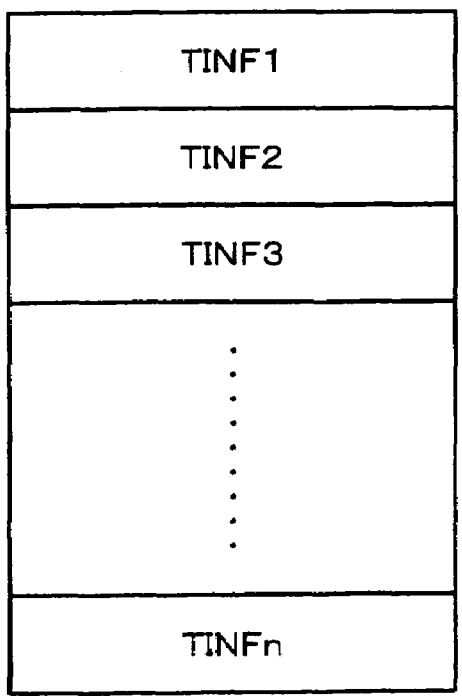
FIG. 31 is a diagram for use in explanation of a play order table according to the first example of the management system of the audio data.

The play order table is a table showing play order defined by a default. As shown in FIG. 31, information INF1, INF2, . . . each showing a link destination to a track descriptor (FIG. 34A) of the track information table regarding each track number (music piece number) has been stored in the play order table. The track numbers are continuous numbers starting from, for example, "1".

The programmed play order table is a table in which each user has defined the play order. As shown in FIG. 32, information track information PINF1, PINF2, . . . each showing a link destination to the track descriptor regarding each track number has been described in the programmed play order table.

As shown in FIGS. 33A and 33B, information regarding the group has been described in the group information table. The group is a set of one or more tracks having the continuous track numbers or a set of one or more tracks having the continuous programmed track numbers. As shown in FIG. 33A, the group information table is described by the group descriptor of each group. As shown in FIG. 33B, a track number at which the group is started, a number of an end track, a group name, and a flag have been described in the group descriptor.

As shown in FIGS. 34A and 34B, information regarding each music piece has been described in the track information table. As shown in FIG. 34A, the track information table comprises the track descriptor of each track (each music piece). As shown in FIG. 34B, a coding system, copyright management information, decrypting key information of contents, pointer information to a parts number serving as an entry in which the music piece starts, an artist name, a title name, original music piece order information, recording time information, and the like have been described in each track descriptor. In the artist name and the title name, pointer information to the name table has been described instead of the names themselves. The coding system shows a system of codec and becomes decoding information.

Figure 35A:
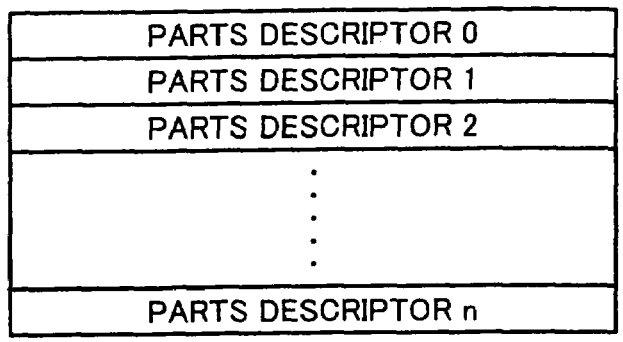
FIGS. 35A and 35B are diagrams for use in explanation of a parts information table according to the first example of the management system of the audio data.
Figure 35B:
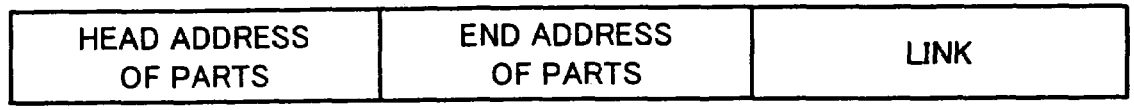

As shown in FIGS. 35A and 35B, pointers each for accessing the position of the actual music piece from the parts number have been described in the parts information table. As shown in FIG. 35A, the parts information table comprises a parts descriptor of each parts. The parts denote the whole one track (music piece) or the parts obtained by dividing one track. The entry of the parts descriptor is indicated by the track information table (FIG. 34B). As shown in FIG. 35B, a head address of the parts on the audio data file, an end address of the parts, and a link destination to the parts subsequent to such parts have been described in each parts descriptor.

As addresses which are used as pointer information of the parts number, as pointer information of the name table, and pointer information indicative of the position of the audio file, a byte offset of the file, a cluster number of the FAT, a physical address of the disc which is used as a recording medium, and the like can be used.

Figure 36A:
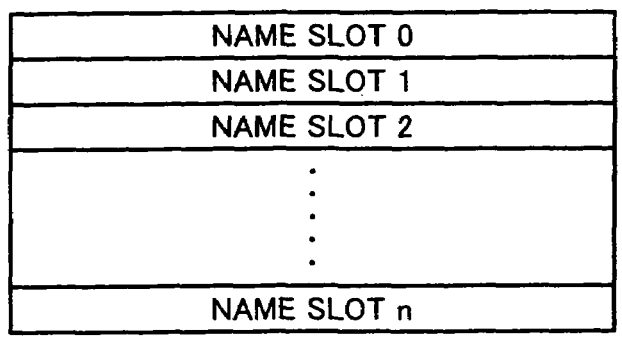
FIGS. 36A and 36B are diagrams for use in explanation of a name table according to the first example of the management system of the audio data.
Figure 36B:
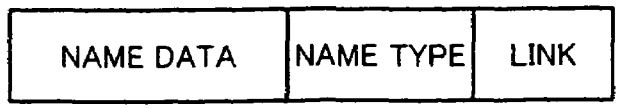

The name table is a table for expressing characters serving as a substance of the name. As shown in FIG. 36A, the name table comprises a plurality of name slots. Each name slot is linked from each pointer showing the name and called. As pointers for calling the name, there are an artist name and a title name of the track information table, a group name of the group information table, and the like. Each name slot can be called from a plurality of pointers. As shown in FIG. 36B, each name slot comprises: name data as character information; a name type as an attribute of the character information; and a link destination. A long name which cannot be enclosed in one name slot can be divided into a plurality of name slots and described. If the name cannot be enclosed in one name slot, the link destination to the name slot in which the subsequent name has been described is described.

Figure 37:
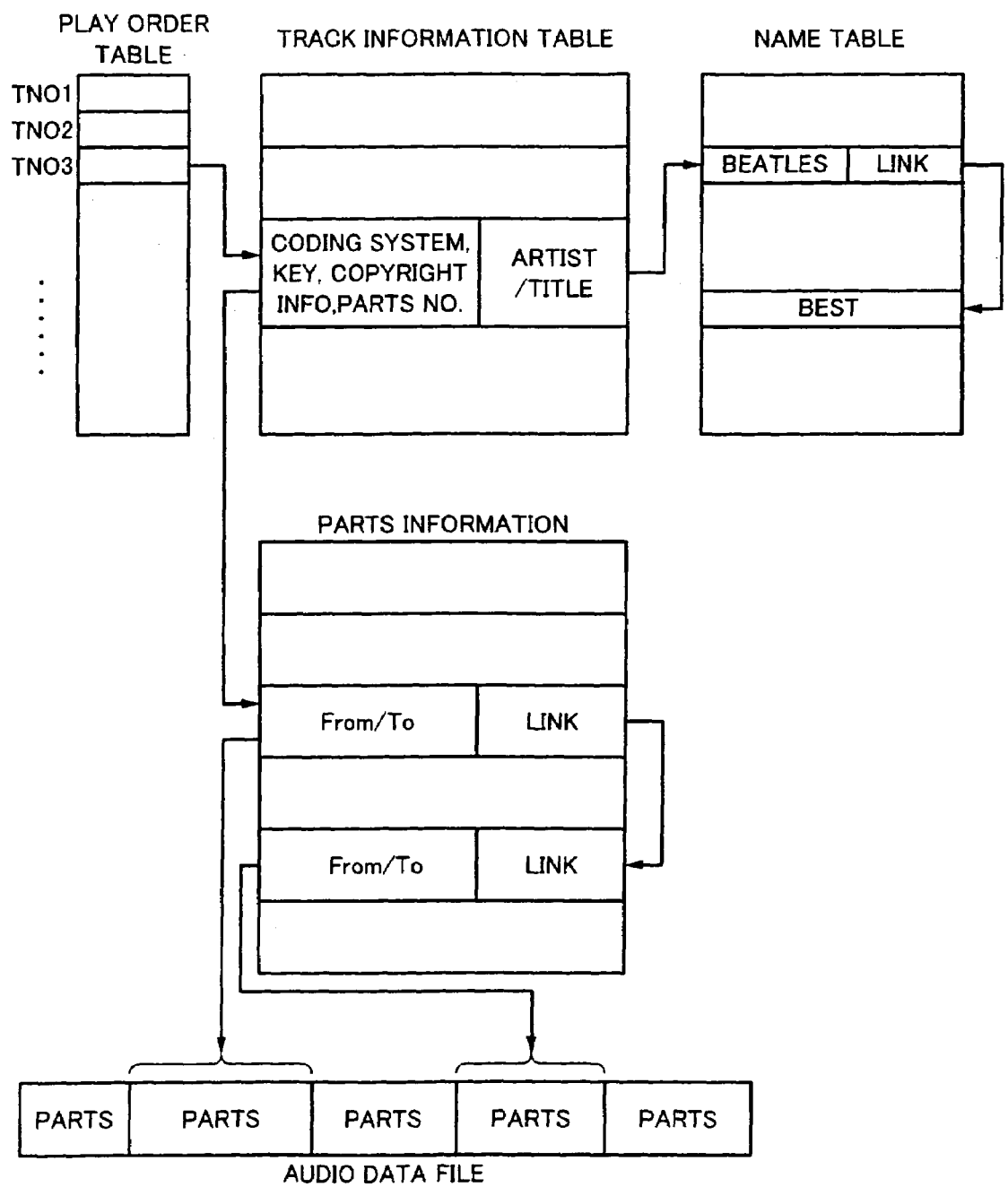
FIG. 37 is a diagram for explaining a process of an example according to the first example of the management system of the audio data.

In the first example of the management system of the audio data in the system to which the invention is applied, as shown in FIG. 37, when the number of the track to be reproduced is designated by the play order table (FIG. 31), the track descriptor (FIG. 34A) of the link destination of the track information table is read out. The coding system, the copyright management information, the decrypting key information to the contents, the pointer information to the parts number in which the music piece starts, the pointers of the artist name and the title name, the original music piece order information, the recording time information, and the like are read out from the track descriptor.

From the information of the parts number read out from the track information table, it is linked to the parts information table (FIG. 35A). The audio data file of the position of the parts corresponding to the start position of the track (music piece) is accessed from to the parts information table. If the data of the parts in the position designated by the parts information table of the audio data file is accessed, the reproduction of the audio data is started from this position. At this time, the decoding is performed on the basis of the coding system read out from the track descriptor of the track information table. If the audio data has been encrypted, the key information read out from the track descriptor is used.

If there are the parts subsequent to such parts, the link destination of the parts has been described in the parts descriptor and the parts descriptors are sequentially read out in accordance with the link destination. By tracing the link destinations of the parts descriptors and reproducing the audio data of the parts existing in the position which is designated by the parts descriptor on the audio data file, the audio data of a desired track (music piece) can be reproduced.

The name slot (FIG. 36A) of the name table existing in the position which is designated by the pointers of the artist name and the title name read out from the track information table is called. The name data is read out from the name slot existing in such a position.

Figure 38:
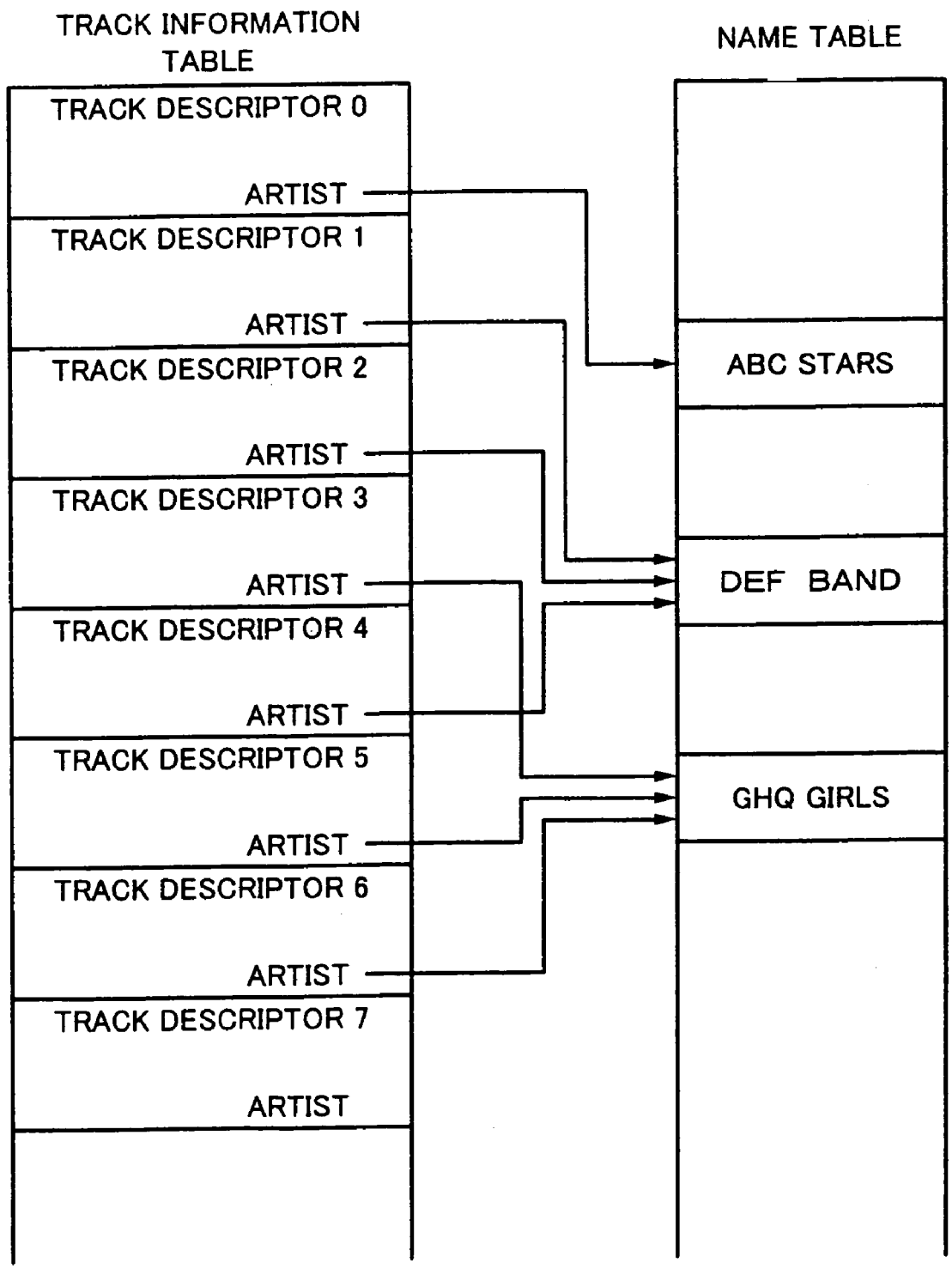

A plurality of name slots in the name table can be referred to as mentioned above. For example, there is a case where a plurality of music pieces of the same artist are recorded. In such a case, as shown in FIG. 38, the same name table is referred to as an artist name from a plurality of track information tables. In the example of FIG. 38, all of a track descriptor "1", a track descriptor "2", and a track descriptor "4" indicate music pieces of the same artist "DEF BAND" and refer to the same name slot as an artist name. All of a track descriptor "3", a track descriptor "5", and a track descriptor "6" indicate music pieces of the artist "GHQ GIRLS" in the same position and refer to the same name slot as an artist name. As mentioned above, by enabling the name slots in the name table to be referred to from a plurality of pointers, a capacity of the name table can be saved.

At the same time, for example, the link to such a name table can be used for displaying the information of the same artist name. For example, if the user wants to display a list of the music pieces of the artist name "DEF BAND", the track descriptors which refer to the address of the name slot of "DEF BAND" are traced. In this example, by tracing the track descriptors which refer to the address of the name slot of "DEF BAND", the information of the track descriptors "1", "2", and "4" is obtained. Thus, the list of the music pieces of the artist name "DEF BAND" among the music pieces enclosed in the disc can be displayed. Since a plurality of name tables can be referred to, the link for reversedly tracing from the name table to the track information table is not provided.

In the case of newly recording the audio data, unused areas in which a desired number or more recording blocks, for example, four or more recording blocks continue are prepared by the FAT table. The reason why the areas in which a desired number or more recording blocks continue are assured is because if the audio data is recorded into the continuous areas as possible, a wasteful access is eliminated.

When the areas for recording the audio data are prepared, one new track description is allocated onto the track information table. The key of the contents to encrypt the audio data is formed. The inputted audio data is encrypted and the encrypted audio data is recorded in the prepared unused areas. The areas in which the audio data has been recorded are coupled with the end of the audio data file on the file system of the FAT.

In association with the coupling of the new audio data with the audio data file, information of the coupling position is formed and the position information of the newly formed audio data is recorded in the newly assured parts description. Key information and a parts number have been described in the newly assured track description. Further, the artist name, the title name, and the like are described in the name slot as necessary, and the pointers which link to the artist name and the title name of the name slot have been described in the track description. The number of the track description is registered in the play order table. The copyright management information is updated.

In the case of reproducing the audio data, information corresponding to the designated track number is obtained from the play order table and the track descriptor of the track to be reproduced is obtained.

The key information is obtained from the track descriptor of the track information table. The parts description showing the area in which the data of the entries has been stored is obtained. The position on the audio data file at the head of the parts in which desired audio data has been stored is obtained from the parts description and the data stored in this position is extracted. The encryption of the data which is reproduced from this position is decrypted by using the obtained key information and the audio data is reproduced. If the link to the parts description exists, it is linked to the designated parts and a similar procedure is repeated.

In the case of changing the music piece of the track No. "n" to the track No. "n+m" on the play order table, a track description Dn in which the information of the track has been described is obtained from track information TINFn in the play order table. All values (track description numbers) of track information TINFn+1 to TINFn+m are shifted to one-preceding position, respectively. The number of the track description Dn is stored in the track information TINFn+m.

In the case of erasing the music piece of the track No. "n" in the play order table, the track descriptor Dn in which the information of the track has been described is obtained from the track information TINFn in the play order table. All valid track descriptor numbers after the track information TINFn+1 in the play order table are shifted to one-preceding position, respectively. From the obtained track descriptor Dn, the coding system and the decrypting key corresponding to the track are obtained in the track information table and the number of a parts descriptor Pn indicative of the area where the head music data has been stored is obtained. The audio blocks in a range designated by the parts descriptor Pn is disconnected from the audio data file on the file system of the FAT. Further, the track descriptor Dn of the track in the track information table is erased.

For example, in FIG. 39A, it is assumed that parts A, B, and C have been coupled so far and the parts B is erased from them. It is assumed that the parts A and B share the same audio block (and the same FAT cluster) and the FAT chain continues. It is assumed that although the parts C is located just after the parts B in the audio data file, when the FAT table is examined, it is actually located in a remote position.

In the case of this example, as shown in FIG. 39B, the clusters which can be actually disconnected from the FAT chain (returned to a space area) when the parts B is erased are two FAT clusters in which the cluster is not shared with the existing parts. That is, the audio data file is reduced into four audio blocks. All numbers of the audio blocks recorded in the parts C and the subsequent parts are reduced by 4 in association with it, respectively.

The erasure can be performed to a part of the track instead of the whole one track. If a part of the track is erased, the information of the residual tracks can be decrypted by using the coding system and the decrypting key obtained from the parts descriptor Pn and corresponding to the track in the track information table.

In the case of coupling the track n and the track n+1 on the play order table, a track descriptor number Dn in which the information of the track has been described is obtained from the track information TINFn in the play order table. A track descriptor number Dm in which the information of the track has been described is obtained from the track information TINFn+1 in the play order table. All values (track descriptor numbers) of the valid TINF after TINFn+1 in the play order table are shifted to one-preceding TINF, respectively. The programmed play order table is searched and all tracks which refer to the track descriptor Dm are erased. A new encrypting key is generated, a list of the parts descriptors is extracted, and the list of the parts descriptors extracted from the track descriptor Dm is coupled with the end of the list of the parts descriptors.

In the case of coupling the tracks, it is necessary that both track descriptors are compared, thereby confirming that there is no problem on management of the copyright, the parts descriptors are obtained from the track descriptor, and whether the provisions regarding fragments are satisfied in the case of coupling both tracks or not is confirmed by the FAT table. It is also necessary to update the pointer to the name table.

In the case of dividing the track n into the track n and the track n+1, the track descriptor number Dn in which the information of the track has been described is obtained from TINFn in the play order table. A track descriptor number Dm in which information of the track has been described is obtained from track information TINFn+1 in the play order table. All values (track descriptor numbers) of the valid track information TINF after TINFn+1 in the play order table are shifted to one-subsequent position, respectively. A new key is formed with respect to the track descriptor Dn. The list of the parts descriptors is extracted from the track descriptor Dn. A new parts descriptor is allocated and contents of the parts descriptor before the division are copied to the parts descriptor. The parts descriptor in which a dividing point is included is reduced to a position just before the dividing point. The link of the parts descriptors after the dividing point is disconnected. A new parts descriptor is set to a position just after the dividing point.

7. The Second Example of the Management System of Music Data

Figure 40:
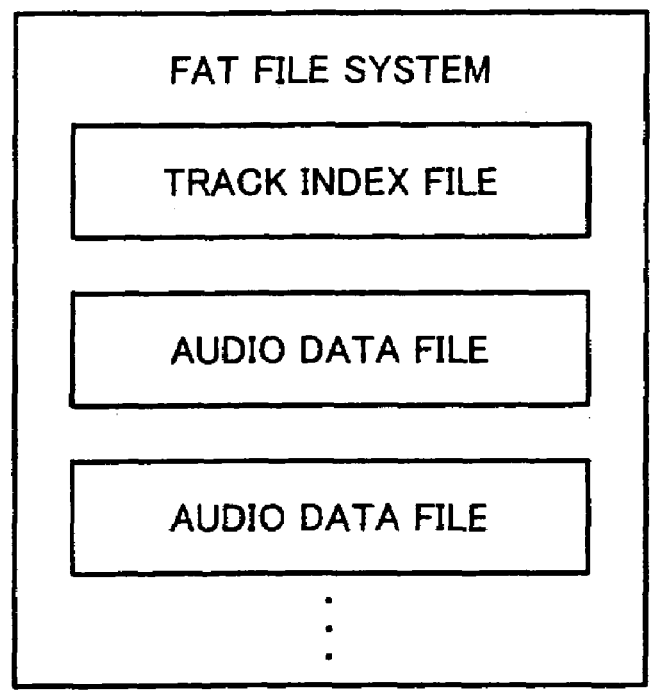
FIG. 40 is a diagram for use in explanation of the second example of a management system of audio data.

Subsequently, the second example of the management system of audio data will be described. FIG. 40 shows the second example of the management system of the audio data. As shown in FIG. 40, according to the management system in the second example, a track index file and a plurality of audio data files are formed on the disc. The track index file and the plurality of audio data files are files which are managed by the FAT system.

Figure 41:
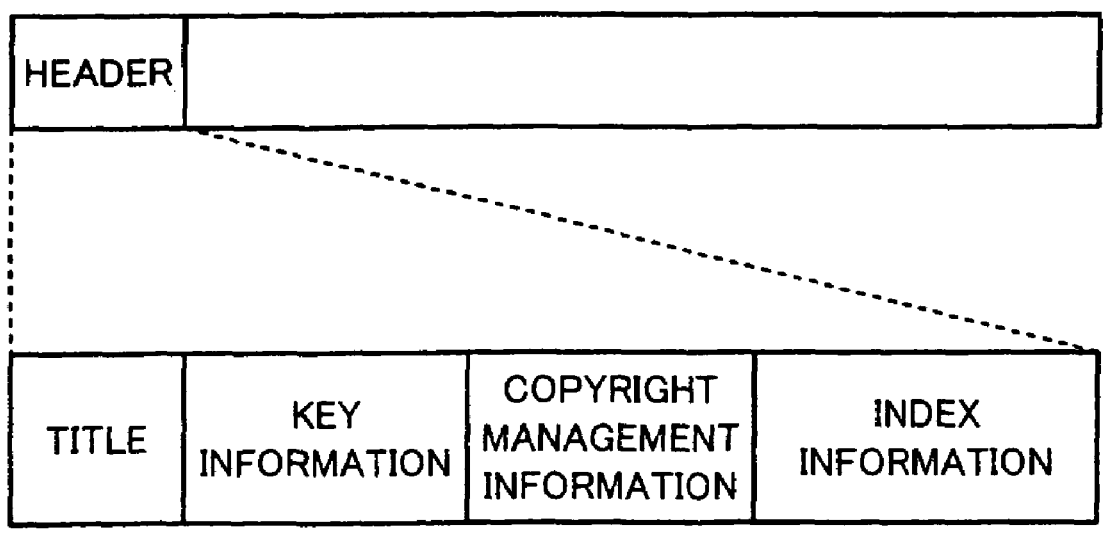
FIG. 41 is a diagram showing a structure of an audio data file according to the second example of the management system of the audio data.

As shown in FIG. 41, in principle, the audio data file is a file such that music data in which one music piece corresponds to one file has been stored. A header is provided for the audio data file. The title, the decrypting key information, and the copyright management information are recorded in the header and the index information is also provided. The indices are used to divide the music piece of one track into a plurality of pieces. The position of each track divided by the indices is recorded in the header in correspondence to an index number. For example, 255 indices can be set.

Figure 42:
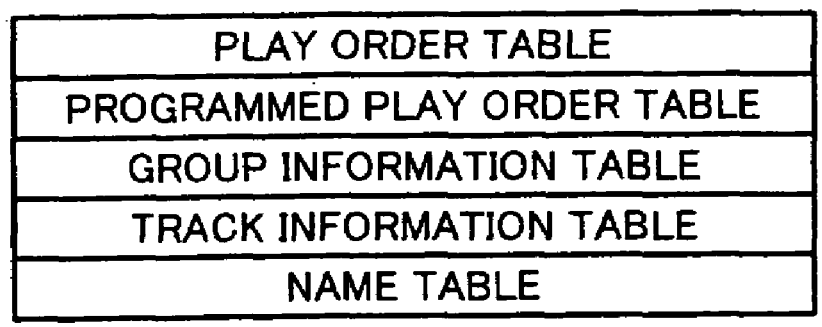
FIG. 42 is a diagram for use in explanation of a track index file according to the second example of the management system of the audio data.

The track index file is a file in which various information for managing the music data enclosed in the audio data file has been described. As shown in FIG. 42, the track index file comprises: a play order table; a programmed play order table; a group information table; a track information table; and a name table.

Figure 43:
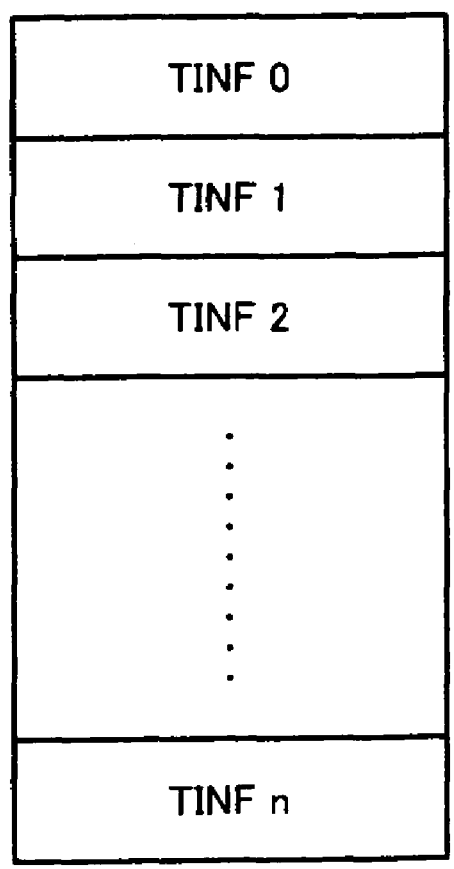
FIG. 43 is a diagram for use in explanation of a play order table according to the second example of the management system of the audio data.

The play order table is a table showing play order defined by a default. As shown in FIG. 43, information INF1, INF2, . . . each showing a link destination to the track descriptor (FIG. 46A) of the track information table regarding each track number (music piece number) has been stored in the play order table. The track numbers are continuous numbers starting from, for example, "1".

Figure 44:
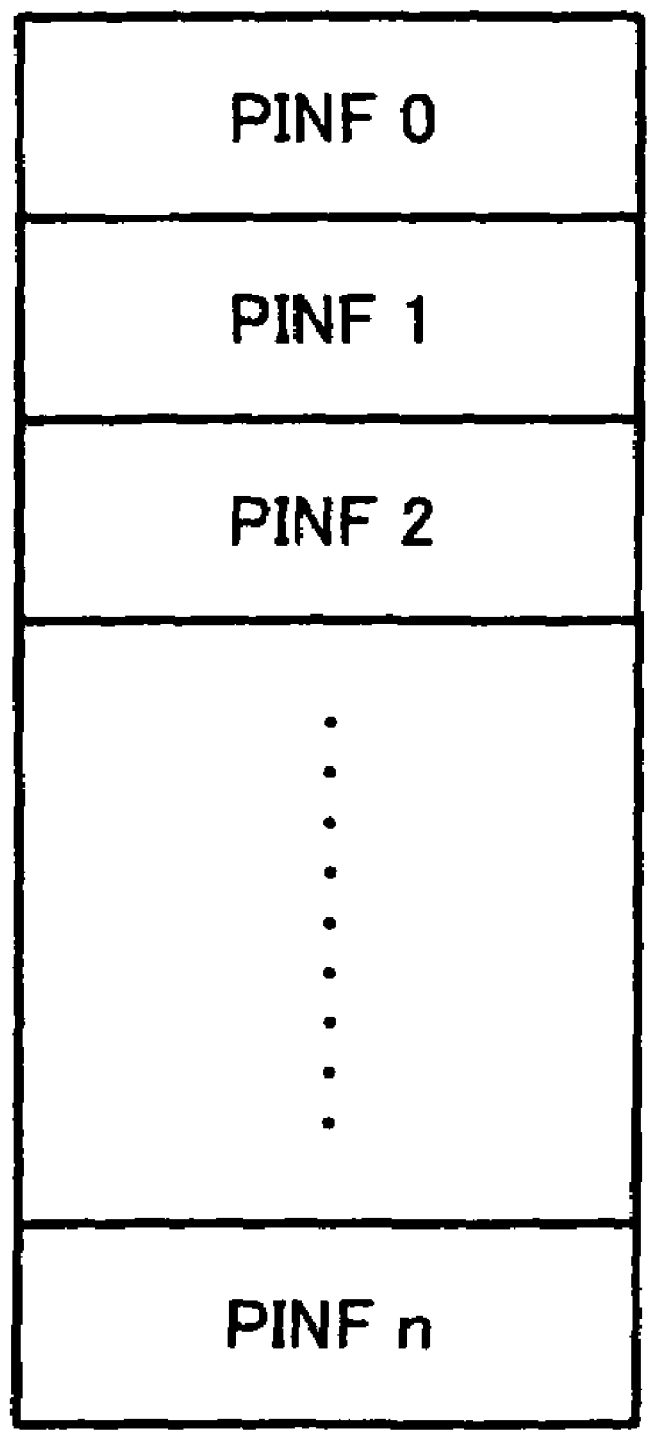
FIG. 44 is a diagram for use in explanation of a programmed play order table according to the second example of the management system of the audio data.

The programmed play order table is a table in which the play order has been defined by each user. As shown in FIG. 44, the information track information PINF1, PINF2, . . . each showing the link destination to the track descriptor regarding each track number has been described in the programmed play order table.

Information regarding the group has been described in the group information table as shown in FIGS. 45A and 45B. The group is a set of one or more tracks having the continuous track numbers or a set of one or more tracks having the continuous programmed track numbers. As shown in FIG. 45A, the group information table is described by the group descriptor of each group. As shown in FIG. 45B, a track number at which the group is started, a number of an end track, a group name, and a flag have been described in the group descriptor.

As shown in FIGS. 46A and 46B, information regarding each music piece has been described in the track information table. As shown in FIG. 46A, the track information table comprises the track descriptor of each track (each music piece). As shown in FIG. 46B, a pointer of the file of the audio data file in which the music piece has been enclosed, an index number, an artist name, a title name, original music piece order information, recording time information, and the like have been described in each track descriptor. In the artist name and the title name, pointers to the name table have been described instead of the names themselves.

Figure 47A:
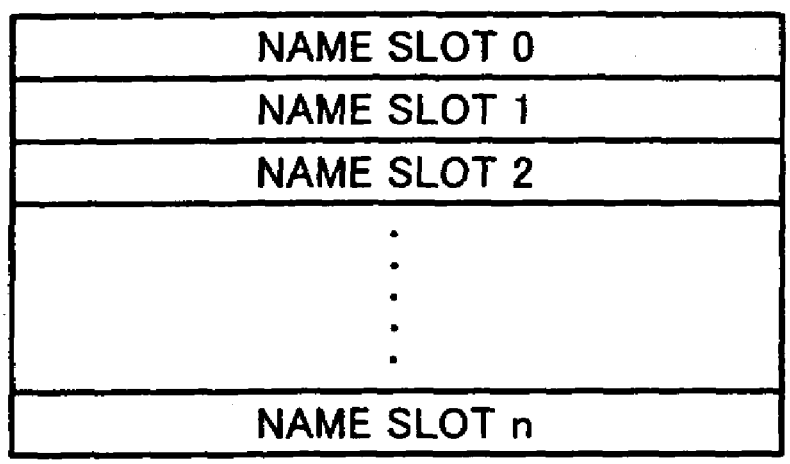
FIGS. 47A and 47B are diagrams for use in explanation of a name table according to the second example of the management system of the audio data.
Figure 47B:
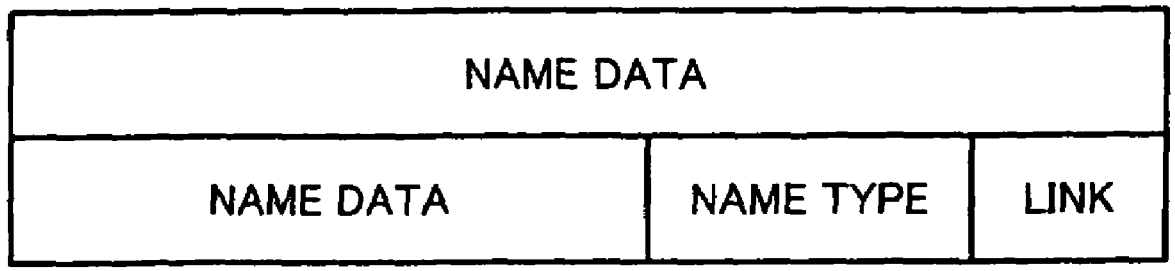

The name table is a table for expressing characters serving as a substance of the name. As shown in FIG. 47A, the name table comprises a plurality of name slots. Each name slot is linked from each pointer showing the name and called. As pointers for calling the name, there are an artist name and a title name of the track information table, a group name of the group information table, and the like. Each name slot can be called from a plurality of pointers. As shown in FIG. 47B, each name slot comprises: name data; a name type; and a link destination. A long name which cannot be enclosed in one name slot can be divided into a plurality of name slots and described. If the name cannot be enclosed in one name slot, the link destination to the name slot in which the subsequent name has been described is described.

Figure 48:
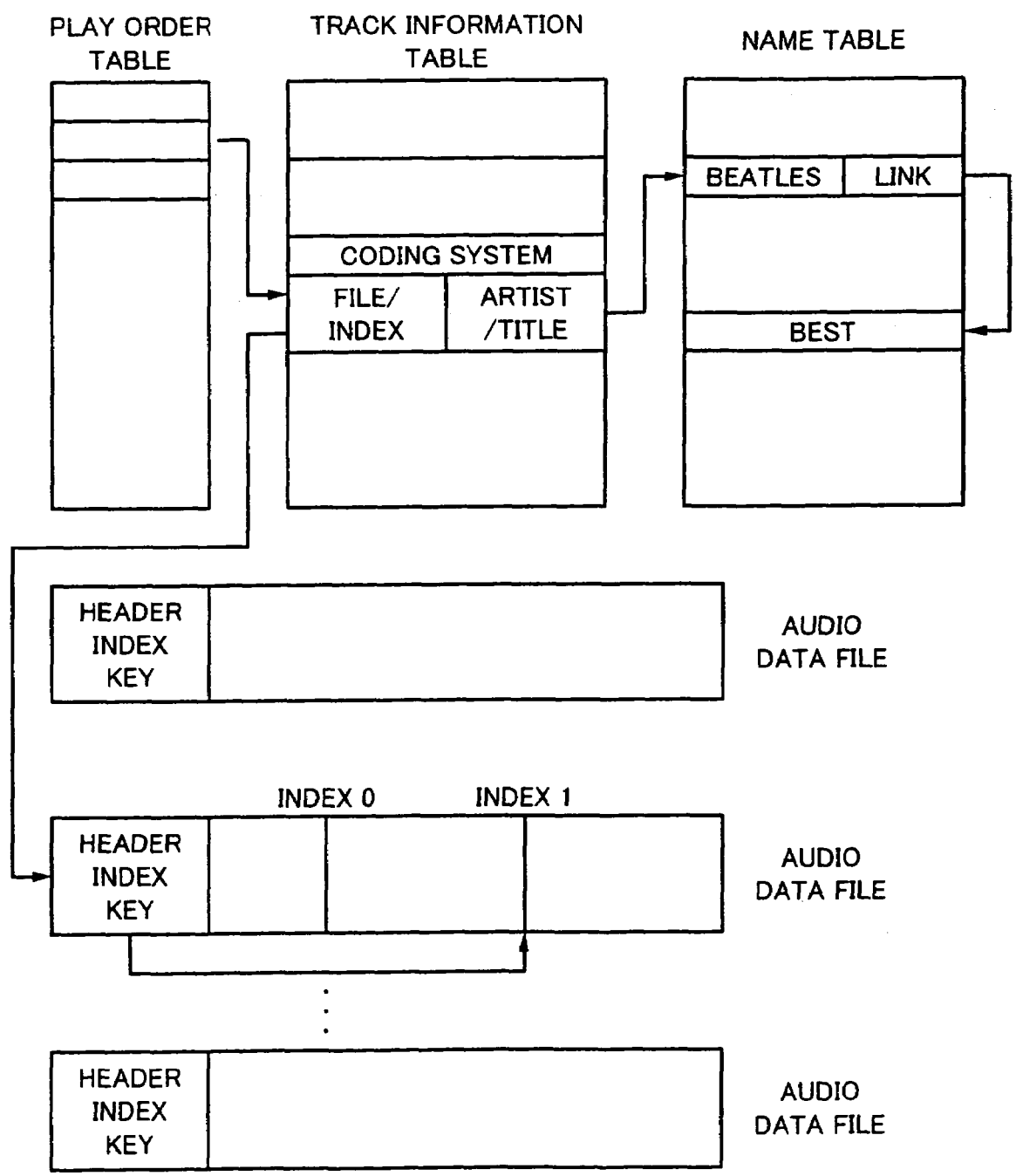
FIG. 48 is a diagram for explaining a process of an example according to the second example of the management system of the audio data.

In the second example of the management system of the audio data, as shown in FIG. 48, when the number of the track to be reproduced is designated by the play order table (FIG. 43), the track descriptor (FIG. 46A) of the link destination of the track information table is read out. A file pointer and an index number of the music piece, pointers of an artist name and a title name, original music piece order information, recording time information, and the like are read out from the track descriptor.

The audio data file is accessed from the pointers of the file of the music piece and information of a header of the audio data file is read out. If the audio data has been encrypted, key information read out from the header is used. The audio data file is reproduced. At this time, if the index number has been designated, the position of the designated index number is detected from the information of the header and the reproduction is started from the position of the index number.

The name slot in the name table existing in the position indicated by the pointers of the artist name and the title name read out from the track information table is called. The name data is read out from the name slot existing in this position.

In the case of newly recording the audio data, unused areas in which a desired number or more recording blocks, for example, four or more recording blocks continue are prepared by the FAT table.

When the areas for recording the audio data are prepared, one new track descriptor is allocated to the track information table. A contents key for encrypting the audio data is formed. The inputted audio data is encrypted and an audio data file is formed.

A file pointer of a newly formed audio data file and key information are described in the newly assured track descriptor. Further, as necessary, the artist name, the title name, and the like are described in the name slot and the pointers which are linked to the artist name and the title name in the name slot are described in the track description. The number of the track description is registered into the play order table. The copyright management information is updated.

In the case of reproducing the audio data, information corresponding to the designated track number is obtained from the play order table and the track descriptor of the track to be reproduced in the track information table is obtained.

The file pointer and the index number of the audio data in which the music data has been stored are obtained from the track descriptor. The audio data file is accessed and the key information is obtained from the header of the file. The encryption of the data in the audio data file is decrypted by using the obtained key information and the audio data is reproduced. If the index number is designated, the reproduction is started from the position of the designated index number.

In the case of dividing the track n into the track n and the track n+1, the track descriptor number Dn in which the information of the track has been described is obtained from TINFn in the play order table. The track descriptor number Dm in which the information of the track has been described is obtained from the track information TINFn+1 in the play order table. All values (track descriptor numbers) of the valid track information TINF after TINFn+1 in the play order table are shifted to one-subsequent position, respectively.

As shown in FIG. 49, the data of one file is divided into a plurality of index areas by using the indices. The index number and the position of the index area are recorded into the header of the audio track file. The file pointer of the audio data and the index number are described in the track descriptor Dn. The file pointer of the audio data and the index number are described in the track descriptor Dm. Thus, a music piece Ml of one track in the audio file is seemingly divided into music pieces M11 and M12 of two tracks.

In the case of coupling the track n and the track n+1 on the play order table, the track descriptor number Dn in which the information of the track has been described is obtained from the track information TINFn in the play order table. The track descriptor number Dm in which the information of the track has been described is obtained from the track information TINFn+1 in the play order table. All values (track descriptor numbers) of the valid TINF after TINFn+1 in the play order table are shifted to one-preceding position, respectively.

If the track n and the track n+1 exist in the same audio data file and have been divided by the index, as shown in FIG. 50, they can be coupled by erasing the index information in the header. Thus, music pieces M21 and M22 of two tracks are coupled, so that a music piece M23 of one track is obtained.

Figure 51:
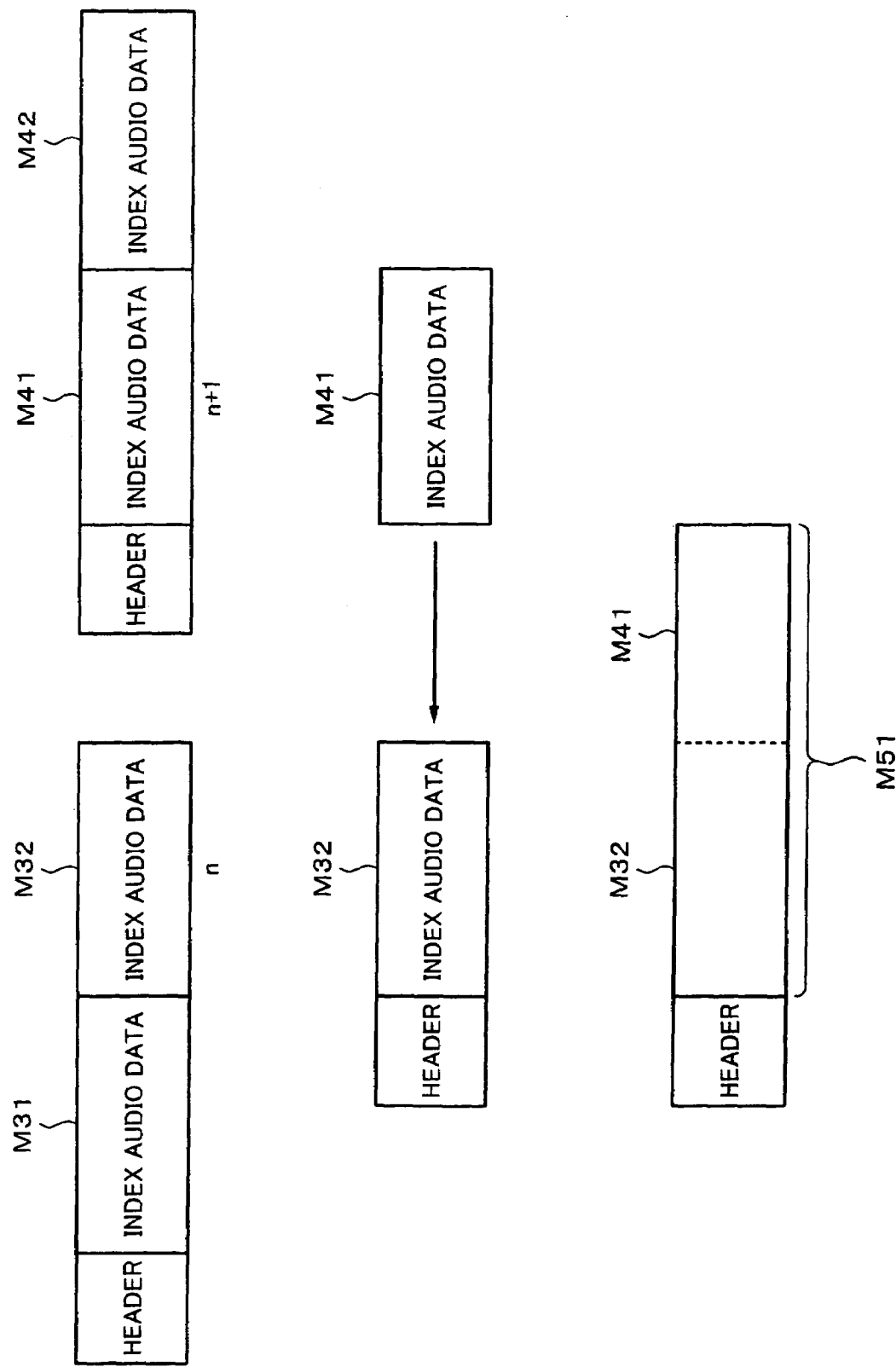
FIG. 51 shows the second example of the management system of the audio data and is a diagram for use in explanation of coupling of tracks according to another method.

Assuming that the track n is the latter half obtained by dividing one audio data file by the index and the track n+1 exists in the head of another audio data file, as shown in FIG. 51, a header is added to the data of the track n divided by the index and an audio data file of a music piece M32 is formed. The header of the audio data file of the track n+1 is removed and audio data of the track n+1 of a music piece M41 is coupled with the audio data file of the music piece M32. Thus, music pieces M32 and M41 of the two tracks are coupled as a music piece M51 of one track To realize the above processes, there are provided: the function for adding the header to the tracks divided by the index, encrypting the data by another encrypting key, and converting the audio data according to the index into one audio data file; and the function for removing the header of the audio data file and coupling this file with another audio data file.

8. With Respect to the Operation Upon Connection to the Personal Computer

In the next-generation MD1 and the next-generation MD2, the FAT system is used as a management system of data in order to provide affinity with the personal computer. Therefore, the discs according to the next-generation MD1 and the next-generation MD2 cope with the reading and writing operations of not only the audio data but also the data which is generally handled in the personal computer.

The audio data is reproduced by the disc drive apparatus 1 while it is read out from the disc 90. Therefore, particularly, in consideration of access performance of the disc drive apparatus 1 of the portable type, it is preferable that a series of audio data is continuously recorded onto the disc. On the other hand, the general data writing operation by the personal computer is executed by properly allocating empty areas on the disc without considering such continuity.

In the recording and reproducing apparatus to which the invention is applied, therefore, when the personal computer 100 and the disc drive apparatus 1 are connected by the USB hub 7 and the writing is performed from the personal computer 100 onto the disc 90 loaded into the disc drive apparatus 1, the writing of the general data is performed under the management of the file system on the personal computer side and the writing of the audio data is performed under the management of the file system on the disc drive apparatus 1 side.

Figure 52A:
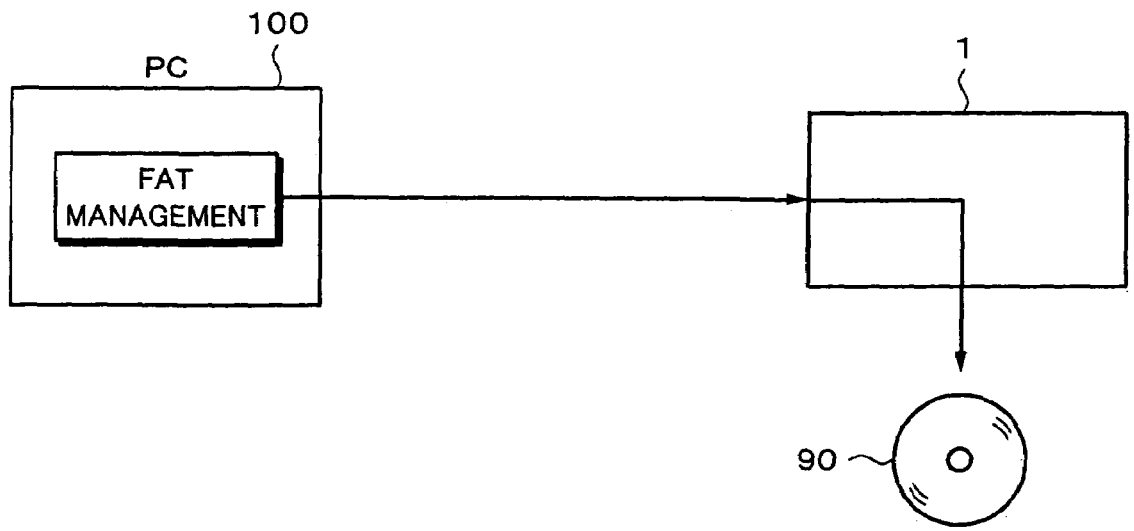
FIGS. 52A and 52B are diagrams for explaining that management authority is shifted in accordance with a type of data to be written in a state where a personal computer and a disc drive apparatus are connected.
Figure 52B:
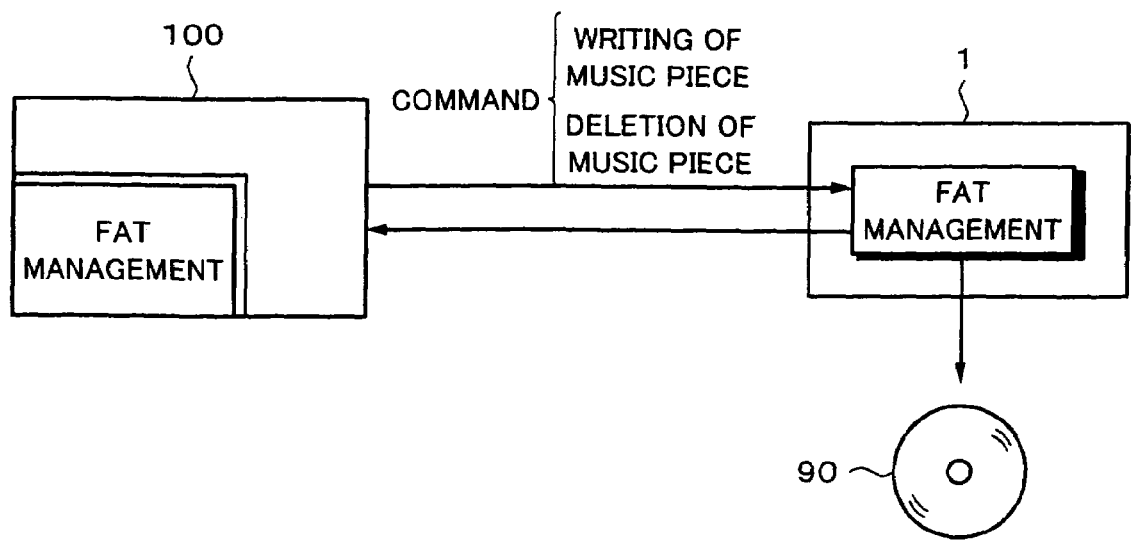

FIGS. 52A and 52B are diagrams for explaining that management authority is shifted in accordance with a type of data to be written in the state where the personal computer 100 and the disc drive apparatus 1 are connected by the USB hub 7 (not shown). FIG. 52A shows the example in which the general data is transferred from the personal computer 100 to the disc drive apparatus 1 and recorded onto the disc 90 loaded into the disc drive apparatus 1. In this case, the FAT management on the disc 90 is made by the file system on the personal computer 100 side.

It is assumed that the disc 90 is a disc formatted by the system of either the next-generation MD1 or the next-generation MD2.

That is, on the personal computer 100 side, the connected disc drive apparatus 1 seems like one removable disc which is managed by the personal computer 100. Therefore, for example, the data can be read out or written from/onto the disc 90 loaded into the disc drive apparatus 1 as if it were read out or written from/onto a flexible disc in the personal computer 100.

Such a file system on the personal computer 100 side can be provided as a function of an OS (Operating System) as fundamental software which is installed in the personal computer 100. As is well known, the OS is recorded as a predetermined program file into, for example, a hard disk drive equipped for the personal computer 100. When the personal computer 100 is activated, such a program file is read out and executed in a predetermined manner, so that each function as an OS can be provided.

FIG. 52B shows the example in which the audio data is transferred from the personal computer 100 to the disc drive apparatus 1 and recorded onto the disc 90 loaded into the disc drive apparatus 1. For example, in the personal computer 100, the audio data has been recorded onto, for example, a recording medium such as a hard disk drive (hereinafter, referred to as an HDD) equipped for the personal computer 100.

It is assumed that utility software for ATRAC compression encoding the audio data and requesting the disc drive apparatus 1 to write the audio data onto the loaded disc 90 and erasing the audio data recorded on the disc 90 has been installed in the personal computer 100. The utility software further has a function for referring to the track index file of the disc 90 loaded into the disc drive apparatus 1 and browsing the track information recorded on the disc 90. The utility software is recorded as a program file onto, for example, the HDD of the personal computer 100.

For example, the case where the audio data recorded on the recording medium of the personal computer 100 is recorded onto the disc 90 loaded into the disc drive apparatus 1 will be described. It is assumed that the foregoing utility software has previously been activated.

First, the personal computer 100 is operated by the user so that predetermined audio data (assumed to be audio data A) recorded on the HDD is recorded onto the disc 90 loaded into the disc drive apparatus 1. On the basis of this operation, a write request command to request the recording of the audio data A onto the disc 90 is outputted by the utility software. The write request command is transmitted from the personal computer 100 to the disc drive apparatus 1.

Subsequently, the audio data A is read out from the HDD of the personal computer 100. The read-out audio data A is subjected to the ATRAC compression encoding process by the utility software installed in the personal computer 100 and converted into ATRAC compression data. The audio data A converted into the ATRAC compression data is transferred from the personal computer 100 to the disc drive apparatus 1.

On the disc drive apparatus 1 side, it is recognized that since the write request command transmitted from the personal computer is received, the audio data A converted into the ATRAC compression data is transferred from the personal computer 100 and the transferred data is recorded as audio data onto the disc 90.

In the disc drive apparatus 1, the audio data A transferred from the personal computer 100 is received from the USB 7 and sent to the media drive unit 2 via the USB interface 6 and the memory transfer controller 3. The system controller 9 makes control in a manner such that when the audio data A is sent to the media drive unit 2, the audio data A is written onto the disc 90 on the basis of an FAT managing method of the disc drive apparatus 1. That is, on the basis of the FAT system of the disc drive apparatus 1, the audio data A is continuously written on a recording block unit basis in which four recording blocks, that is, 64 kbytes×4 are set to the minimum recording length.

Until the writing of the data onto the disc 90 is finished, data, a status, and commands are transmitted and received between the personal computer 100 and the disc drive apparatus 1 in accordance with a predetermined protocol. Thus, a data transfer speed is controlled so that, for example, an overflow or an underflow of the cluster buffer 4 does not occur on the disc drive apparatus 1 side.

As examples of the commands which can be used on the personal computer 100 side, there is an erasing request command besides the write request command mentioned above. The erasing request command is a command for requesting the disc drive apparatus 1 to erase the audio data recorded on the disc 90 loaded into the disc drive apparatus 1.

For example, when the personal computer 100 and the disc drive apparatus 1 are connected and the disc 90 is loaded into the disc drive apparatus 1, the track index file on the disc 90 is read out by the foregoing utility software and the read-out data is transmitted to the personal computer 100. In the personal computer, for example, a list of the titles of the audio data recorded on the disc 90 can be displayed on the basis of the above data.

In the case of erasing the audio data (assumed to be audio data B) on the basis of the displayed title list in the personal computer 100, information showing the audio data B to be erased is transmitted to the disc drive apparatus 1 together with the erasing request command. In the disc drive apparatus 1, when the erasing request command is received, the requested audio data B is erased from the disc 90 on the basis of control of the disc drive apparatus 1 itself.

Since the audio data is erased by the control based on the FAT system of the disc drive apparatus 1 itself, for example, the process for erasing the audio data existing in the giant file in which a plurality of audio data is bound as one file as described by using FIGS. 39A and 39B is also possible.

9. With Respect to Copy Limitation of the Audio Data Recorded on the Disc

To protect a copyright of the audio data recorded on the disc 90, it is necessary to provide limitation to the copy of the audio data recorded on the disc 90 to another recording medium or the like. For example, a case where the audio data recorded on the disc 90 is transferred from the disc drive apparatus 1 to the personal computer 100 and recorded onto the HDD or the like of the personal computer 100 is considered.

It is now assumed that the disc 90 is a disc formatted by the system of the next-generation MD1 or the next-generation MD2. It is also assumed that the operations such as check-out, check-in, and the like, which will be explained hereinbelow are executed under management of the foregoing utility software which is installed on the personal computer 100.

Figure 53A:
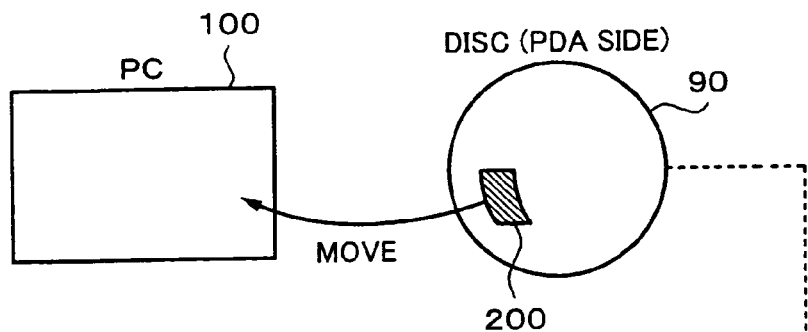
FIGS. 53A, 53B, and 53C are diagrams for explaining a series of check-out procedures of the audio data.

First, as shown in FIG. 53A, audio data 200 recorded on the disc 90 is moved to the personal computer (PC) 100. The movement mentioned here denotes a series of operations such that the target audio data 200 is copied to the personal computer 100 and the target audio data is erased from the original recording medium (disc 90). That is, the data on the moving source side is erased and the data is transferred to the movement destination side by the movement.

The operation such that the data is copied from a certain recording medium to another recording medium and a copy number right showing the number of times of copy permission of copy source data is reduced by 1 is called "check-out". The operation such that the check-out data is erased from the check-out destination side and the copy number right of the data on the check-out source side is returned is called "check-in".

Figure 53B:
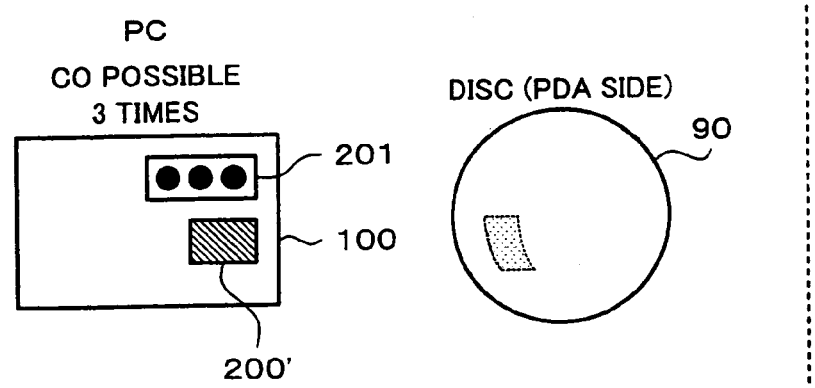

When the audio data 200 is moved to the personal computer 100, the audio data 200 is moved onto the recording medium, for example, the HDD of the personal computer 100 (audio data 200') and the audio data 200 is erased from the original disc 90. As shown in FIG. 53B, in the personal computer 100, the number of check-out (CO) possible times 201 is set for the moved audio data 200'. The number of check-out possible times 201 is set to 3 times here as shown by "● black circle". That is, in the case of the audio data 200', the check-out which is executed from the personal computer 100 to an external recording medium is further permitted by the number of times set in the number of check-out possible times 201.

A case where a state in which the check-out audio data 200 has been erased from the original disc 90 is inconvenience for the user is considered. Therefore, the audio data 200' which has been checked out to the personal computer 100 is written back to the disc 90.

Figure 53C:
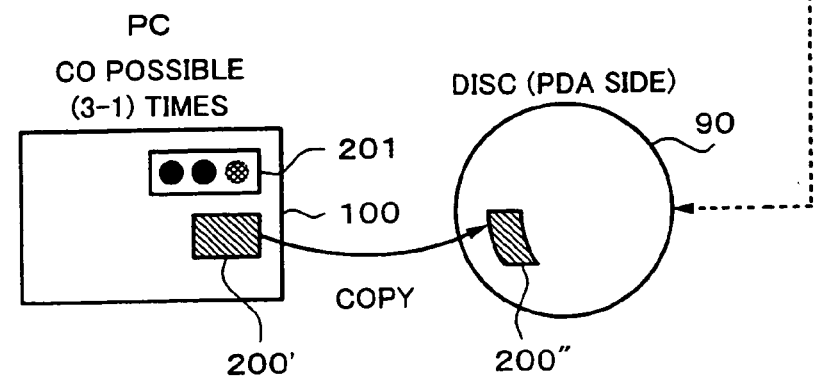

When the audio data 200' is written back from the personal computer 100 to the original disc 90, as shown in FIG. 53C, the number of check-out possible times is consumed once and the number of check-out possible times is set to (3−1=2) times. At this time, since the right in which the audio data 200' in the personal computer 100 can be checked out still remains by two times, this data is not erased from the personal computer 100. That is, the audio data 200' in the personal computer 100 is copied from the personal computer to the disc 90, so that audio data 200" obtained by copying the audio data 200' is recorded onto the disc 90.

The number of check-out possible times 201 is managed by the copyright management information of the track descriptor in the track information table (refer to FIG. 34B). Since the track descriptor is provided every track, the number of check-out possible times 201 can be set every track (music data). The track descriptor copied from the disc 90 to the personal computer 100 is used as control information of the corresponding audio data moved to the personal computer 100.

For example, when the audio data is moved from the disc 90 to the personal computer 100, the track descriptor corresponding to the moved audio data is copied to the personal computer 100. On the personal computer 100, the management of the audio data moved from the disc 90 is made by the track descriptor. When the audio data is moved and recorded onto the HDD or the like of the personal computer 100, the number of check-out possible times 201 is set to the specific number of times (3 times in this example) in the copyright management information in the track descriptor.

Besides the number of check-out possible times 201, a device ID for identifying a device on the check-out source side and a contents ID for identifying contents (audio data) which has been checked out are also managed as copyright management information. For example, in the procedure of FIG. 53C mentioned above, a device ID of a device on the copy destination side is authenticated on the basis of the device ID in the copyright management information corresponding to the audio data to be copied. If the device ID in the copyright management information and the device ID of the device on the copy destination side are different, "no more copies" can be set.

Since the audio data on the disc 90 is moved once to the personal computer 100 and again written back from the personal computer 100 to the disc 90 in the series of check-out processes according to FIGS. 53A, 53B and 53C mentioned above, the procedure is complicated and tiresome for the user. Also, since it takes time to read out the audio data from the disc 90 and write back the audio data onto the disc 90, there is a fear that such a time is felt wasteful. Further, it is possible that the user feels it unfamiliar that the audio data is erased once from the disc 90.

Therefore, at the time of the check-out of the audio data recorded on the disc 90, the halfway processes mentioned above are omitted by regarding that they have been executed, thereby enabling only the result shown in FIG. 53C to be realized. An example of such a procedure is shown below. The procedure which is shown below is executed by a single instruction from the user such as "Check out the audio data xx recorded on the disc 90".

(1) The audio data recorded on the disc 90 is copied to the HDD of the personal computer 100 and the audio data on the disc 90 is erased by invalidating a part of management data of the audio data. For example, the link information INFn to the track descriptor corresponding to the audio data is erased from the play order table and the link information PINFn to the track descriptor corresponding to the audio data is erased from the programmed file order table. It is also possible to erase the track descriptor itself corresponding to the audio data. Thus, the audio data is set to a use-impossible state on the disc 90 and the audio data is moved from the disc 90 to the personal computer 100.

(2) When the audio data is copied to the personal computer 100 in the procedure (1), the track descriptor corresponding to the audio data is also copied to the HDD of the personal computer 100.

(3) Subsequently, in the personal computer 100, the specific number of times, for example, 3 times is set to the number of check-out possible times in the copyright management information in the track descriptor corresponding to the audio data which has been copied from the disc 90 and moved.

(4) Subsequently, in the personal computer 100, the contents ID corresponding to the moved audio data is obtained on the basis of the track descriptor copied from the disc 90 and this contents ID is recorded as a contents ID indicative of the audio data which can be checked in.

(5) Subsequently, in the personal computer 100, the number of check-out possible times in the copyright management information in the track descriptor corresponding to the moved audio data is decreased by 1 from the specific number of times set in the foregoing procedure (3). In this example, the number of check-out possible times is set to (3−1=2) times.

(6) Subsequently, the track descriptor corresponding to the moved audio data is validated in the disc drive apparatus 1 (not shown) into which the disc 90 is loaded. For example, the track descriptor corresponding to the audio data is validated by reconstructing or restructuring the link information INFn and PINFn erased in the above procedure (1), respectively. When the track descriptor corresponding to the audio data is erased in the above procedure (1), the track descriptor is restructured. The corresponding track descriptor recorded on the personal computer 100 can be also transferred to the disc drive apparatus 1 and recorded onto the disc 90.

By the above procedures (1) to (6), it is regarded that the series of check-out processes have been completed. By this method, the copy of the audio data from the disc 90 to the personal computer 100 can be realized while protecting the copyright of the audio data and troublesomeness of the user can be omitted.

It is preferable that the copy of the audio data by the above procedures (1) to (6) is applied to audio data recorded (recorded) by the user by himself by using the disc drive apparatus 1.

When the check-in is performed after the check-out, the personal computer 100 searches the audio data recorded by itself and the control information, for example, copyright management information in the track descriptor, makes a judgment on the basis of the searched audio data and control information, and executes the check-in.

10. With Respect to Coexistence of the Next-Generation MD1 System and the Existing MD System The disc which is used in the existing MD system can be used in the next-generation MD1 system. On the other hand, the disc format of the disc of the next-generation MD1 largely differs from that of the disc according to the existing MD system. Therefore, it is necessary that the user can separately use the disc of the next-generation MD1 and the disc according to the existing MD system by the same disc drive apparatus 1 without confusion.

FIG. 54 conceptually shows a state of coexistence of the next-generation MD1 system and the existing MD system in the disc drive apparatus 1. The disc drive apparatus 1 corresponds to both of a digital system and an analog system as an audio signal which is inputted and outputted.

In a next-generation MD1 system 70, a watermark in the audio signal of the digital system is detected by a predetermined method and the signal is encrypted by using key information 74 by an encrypting unit 72 and supplied to a recording/reproducing unit 73. The audio signal of the analog system is also converted into audio data of the digital system by an A/D converting unit (not shown), a watermark is detected, and the data is similarly supplied to the recording/reproducing unit 73. In the recording/reproducing unit 73, the encrypted audio data is compression encoded by the ATRAC system. The compression encoded audio data is 1-7 pp modulated together with the key information 74 and recorded onto the disc 90 (not shown).

When the watermark including, for example, copy inhibition information is detected from the inputted audio signal, control can be made so as to, for example, inhibit the recording process by the recording/reproducing unit 73 by using the detected watermark.

Upon reproduction, the audio data and the corresponding key information 74 are reproduced from the disc 90 by the recording/reproducing unit 73. The encryption is decrypted by a decrypting unit 75 by using the key information 74, so that the audio signal of the digital system is obtained. The audio signal of the digital system is converted into an audio signal of the analog system by a D/A converting unit (not shown) and outputted. It can be also outputted as an audio signal of the digital system without passing through the D/A converting unit. Also upon reproduction, the watermark can be detected from the audio signal reproduced from the disc 90.

If the copy inhibition information is included in the detected watermark, control can be made by using the watermark so as to, for example, inhibit the reproducing process by the recording/reproducing unit 73.

In an existing MD system 71, generation management information is added to the audio signal of the digital system by an SCMS (Serial Copy Management System) and the resultant signal is supplied to a recording/reproducing unit 76. The audio signal of the analog system is also converted into audio data of the digital system by the A/D converting unit (not shown) and supplied to the recording/reproducing unit 76. In this case, the generation management information by the SCMS is not added. In the recording/reproducing unit 76, the supplied audio data is compression encoded by the ATRAC system, EFM-modulated, and recorded onto the disc 90 (not shown).

Upon reproduction, the audio data is reproduced from the disc 90 by the recording/reproducing unit 76 and becomes the audio signal of the digital system. The audio signal of the digital system is converted into the audio signal of the analog system by the D/A converting unit (not shown) and outputted. It can be also outputted as an audio signal of the digital system without passing through the D/A converting unit.

In the disc drive apparatus 1 in which the next-generation MD1 system and the existing MD system coexist as mentioned above, the switch 50 for clearly switching an operating mode according to the next-generation MD1 system and an operating mode according to the existing MD system is provided. The switch 50 is effectively made to act, particularly, when the audio data is recorded onto the disc 90.

Figure 55:
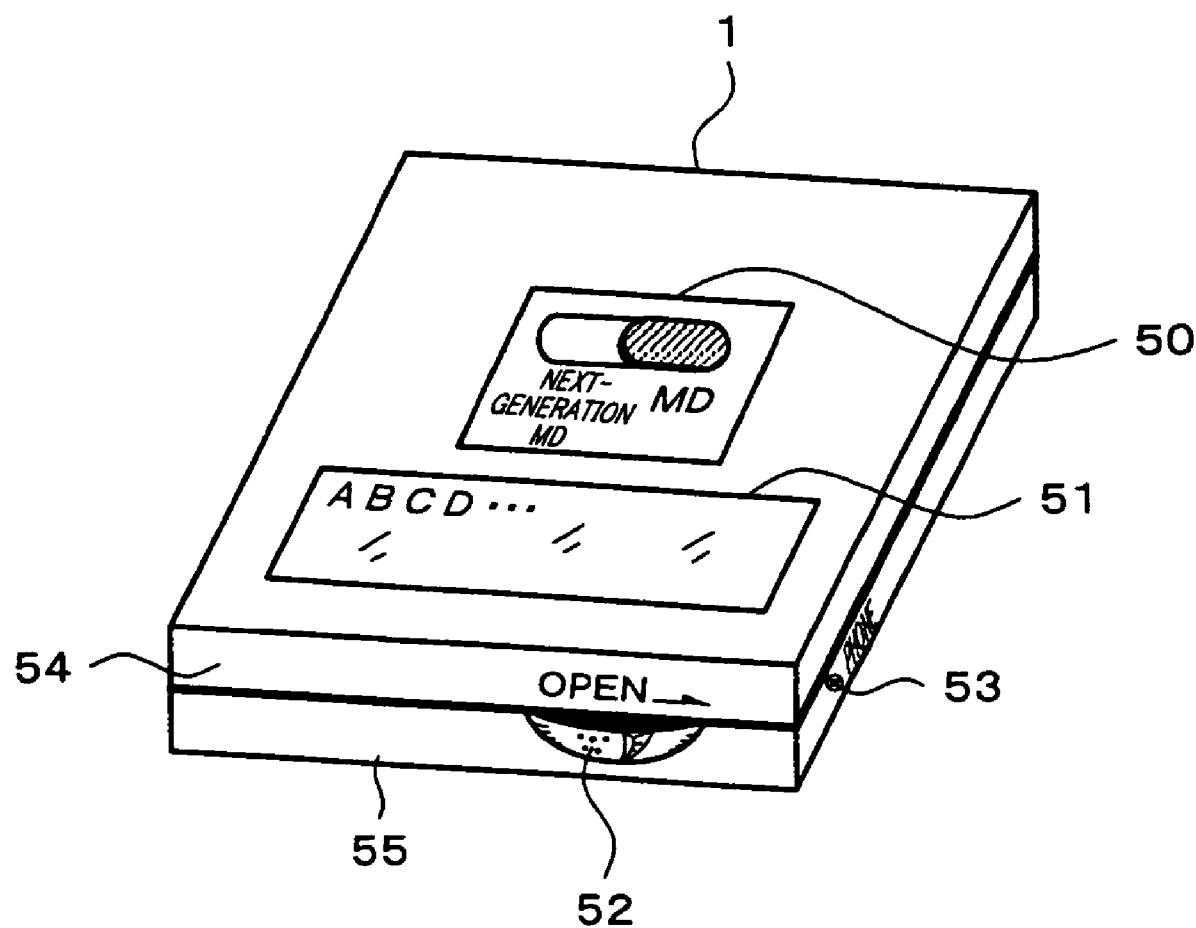
FIG. 55 is an external view of an example of a disc drive apparatus constructed in a portable type.

FIG. 55 is an external view of an example of the disc drive apparatus 1 constructed as a portable type. In FIG. 55, a hinge portion is provided for a portion which is hidden on the rear side and a lid portion 54 and a main body portion 55 are opened by sliding a slider 52. A guide to load the disc 90 is provided for an opening portion. By inserting the disc 90 along this guide and closing the lid portion 54, the disc 90 is loaded into the disc drive apparatus 1. When the disc 90 is loaded into the disc drive apparatus 1, the lead-in area and the U-TOC of the loaded disc 90 are automatically read out by the disc drive apparatus 1 and the information of the disc 90 is obtained.

A phone jack 53 is an output terminal of the audio signal of the analog system. By inserting a phone plug connected to audio reproducing means such as headphones or the like into the phone jack 53, the user can enjoy the audio data reproduced from the disc 90 as an audio sound.

Although not shown in FIG. 55, for the disc drive apparatus 1, there are further provided: various keys for instructing the operation of the disc 90 such as play, recording, stop, temporary stop (pause), fast forward feed, and fast rewind of the loaded disc 90; keys for editing the audio data and the various information recorded on the disc 90; keys for inputting predetermined commands and data to the disc drive apparatus 1; and the like. Those keys are provided, for example, on the main body portion 55 side.

The switch 50 mentioned above is provided for the lid portion 54 of the disc drive apparatus 1. For example, as shown in FIG. 55, the large switch 50 is provided in a conspicuous position so as to easily attract attention of the user. In FIG. 55, the operating mode according to the existing MD system is displayed as "MD" and the operating mode according to the next-generation MD1 system is displayed as "next-generation MD" for the switch 50.

A display 51 is further provided for the lid portion 54. Various modes in the disc drive apparatus 1, track information recorded on the disc 90 loaded in the disc drive apparatus 1, and the like are displayed on the display 51. Further, characters are also displayed on the display 51 in association with the operating mode set by the switch 50.

Figure 56:
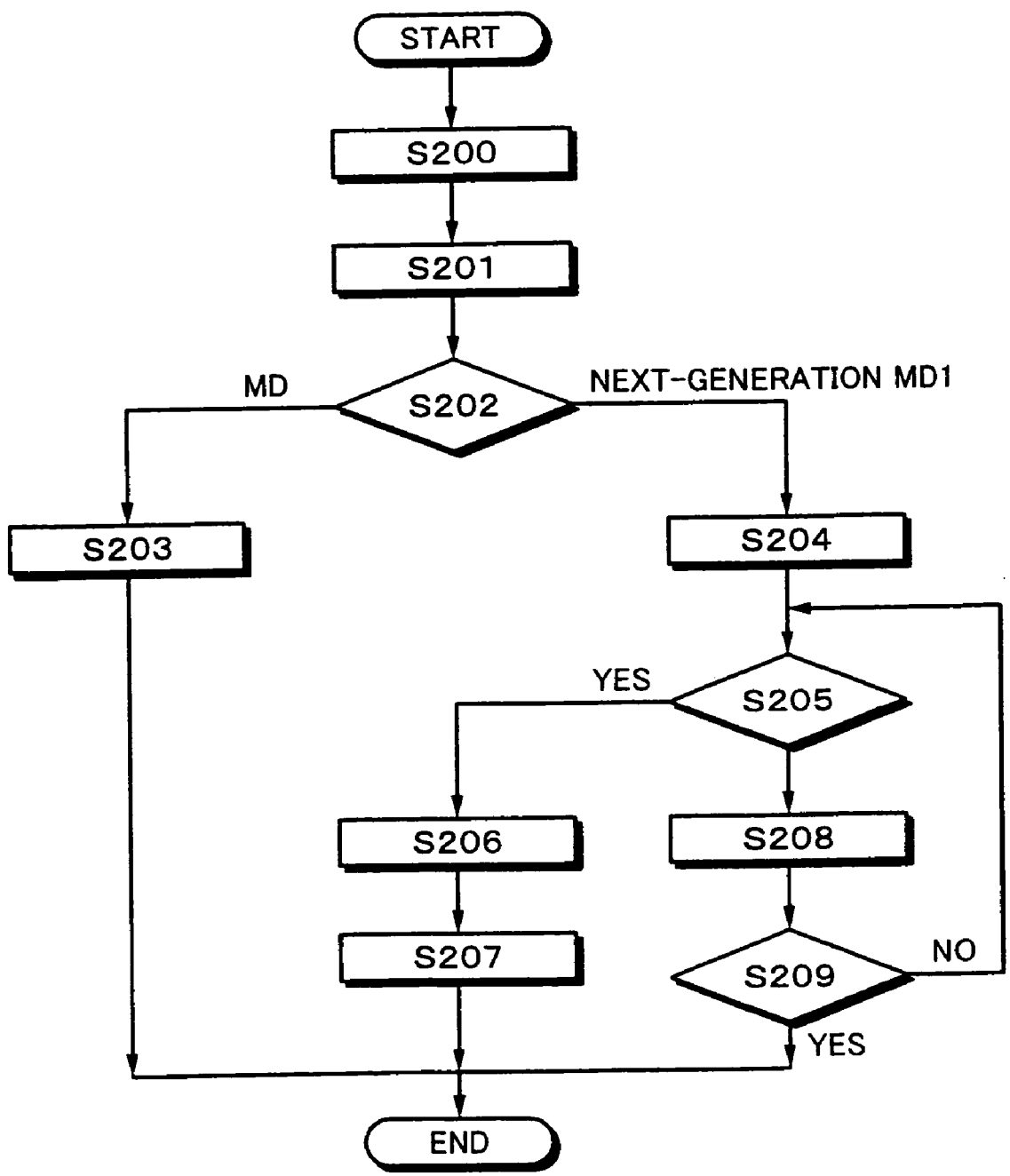
FIG. 56 is a flowchart showing the operation of an example of the disc drive apparatus in the case where the disc is unformatted.

First, the operation of an example of the disc drive apparatus 1 when the disc 90 is not formatted will be described by using a flowchart of FIG. 56. In the flowchart of FIG. 56, processes in the case of using an unused disc, that is, so-called a virgin disc are shown. In first step S200, the disc 90 according to the existing MD system is loaded into the disc drive apparatus 1. When the disc 90 is loaded, the U-TOC is readout subsequently to the lead-in area of the disc 90 in step S201.

In next step S202, in the disc drive apparatus 1, to which one of the existing MD system and the next-generation MD1 system the operating mode of the main body has been set is discriminated on the basis of the setting of the switch 50. If the main body operating mode is set to the existing MD system, the processing routine advances to step S203. Since a process for formatting the disc is unnecessary in the existing MD system, it is determined in step S203 that the loaded disc 90 can be used as a disc of the existing MD system. A message showing that the disc 90 is the blank disc is displayed on the display 51.

If it is determined in step S202 that the operating mode of the main body has been set to the next-generation MD1 system, the processing routine advances to step S204. A message showing that the disc 90 is the blank disc is displayed on the display 51. After it is display, for example, for a few seconds, the processing routine advances automatically to step S205.

A message of contents for confirming whether the disc 90 is actually formatted or not is displayed on the display 51 in step S205. If the formatting of the disc 90 is instructed by the user, the processing routine advances to step S206. The instruction from the user is inputted to the disc drive apparatus 1 when the user operates the key provided for the main body portion 55 of the disc drive apparatus 1.

In step S206, the formatting process by the next-generation MD1 system is executed to the disc 90 by the disc drive apparatus 1 in accordance with the flow shown in FIG. 18 mentioned above. During the formatting process, it is preferable that a message showing that the disc is being formatted is displayed on the display 51. After completion of the formatting process in step S206, the processing routine advances to step S207. A message showing that the loaded disc 90 is the blank disc according to the next-generation MD1 system is displayed on the display 51.

If the user instructs not to format the disc 90 in step S205 mentioned above, the processing routine advances to step S208. A message to urge the user to set the switch 50 so as to switch the operating mode of the disc drive apparatus 1 to the operating mode according to the existing MD system is displayed on the display 51. If it is determined in step S209 that the setting of the switch 50 is not switched even after the elapse of a predetermined time in a state where the display of the message in step S208 is held, it is determined that the time-out has occurred. The processing routine is returned to step S205.

Figure 57:
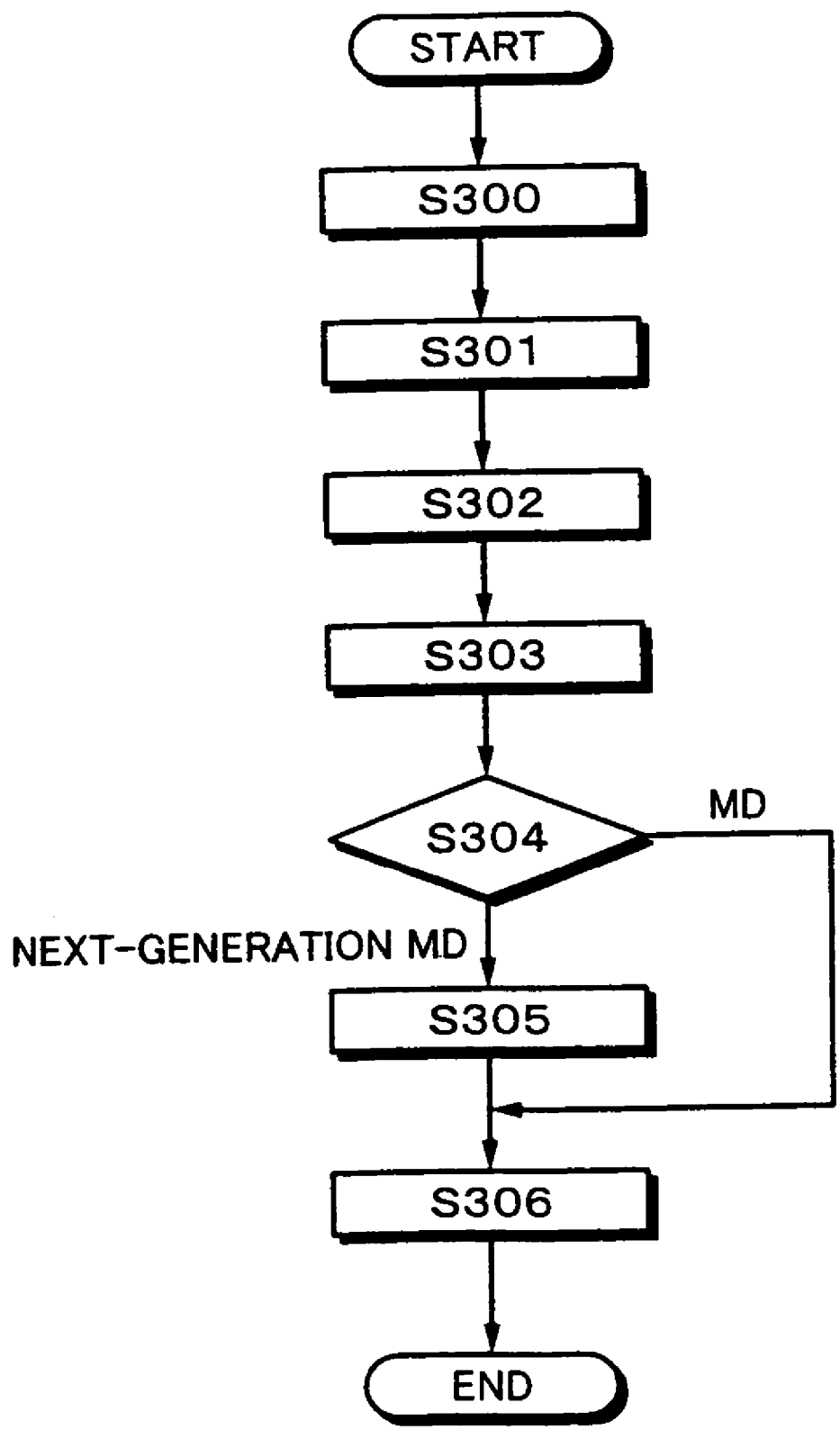
FIG. 57 is a flowchart showing another example of a formatting process in the case where a disc as a virgin disc has been inserted into the disc drive apparatus.

FIG. 57 is a flowchart showing another example of the formatting process in the case where the disc 90 as a virgin disc has been inserted into the disc drive apparatus 1. When the disc 90 as an unused blank disc is inserted into the disc drive apparatus 1 in step S300, the U-TOC is read out subsequently to the lead-in area of the disc 90 in next step S301. A message showing that the disc 90 is a blank disc is displayed on the display 51 on the basis of the read-out U-TOC information (step S302).

In step S303, a predetermined operation is executed for a record key (not shown) provided for the disc drive apparatus 1 and the recording to the disc 90 inserted in the disc drive apparatus 1 is instructed. The instruction of the recording is not limited to the instruction from the record key provided for the disc drive apparatus 1 but, for example, it can be made to the disc drive apparatus 1 by the personal computer 100 connected to the disc drive apparatus 1.

When the recording is instructed to the disc drive apparatus 1, the processing routine advances to step S304. To which one of the next-generation MD1 system and the existing MD system the operating mode of the main body has been set by the switch 50 is discriminated. If it is determined that the operating mode of the disc drive apparatus 1 has been set to the existing MD system by the switch 50, the processing routine advances to step S306. The recording process by the existing MD system to the disc 90 is started.

If it is determined in step S304 that the operating mode of the disc drive apparatus 1 has been set to the next-generation MD1 system by the switch 50, the processing routine advances to step S305. The formatting according to the next-generation MD1 system is executed to disc 90 on the basis of the processes which have already been described by using FIG. 18. The processing routine advances to step S306. The recording process is executed to the disc 90 to which the formatting according to the next-generation MD1 system has been performed.

Figure 58:
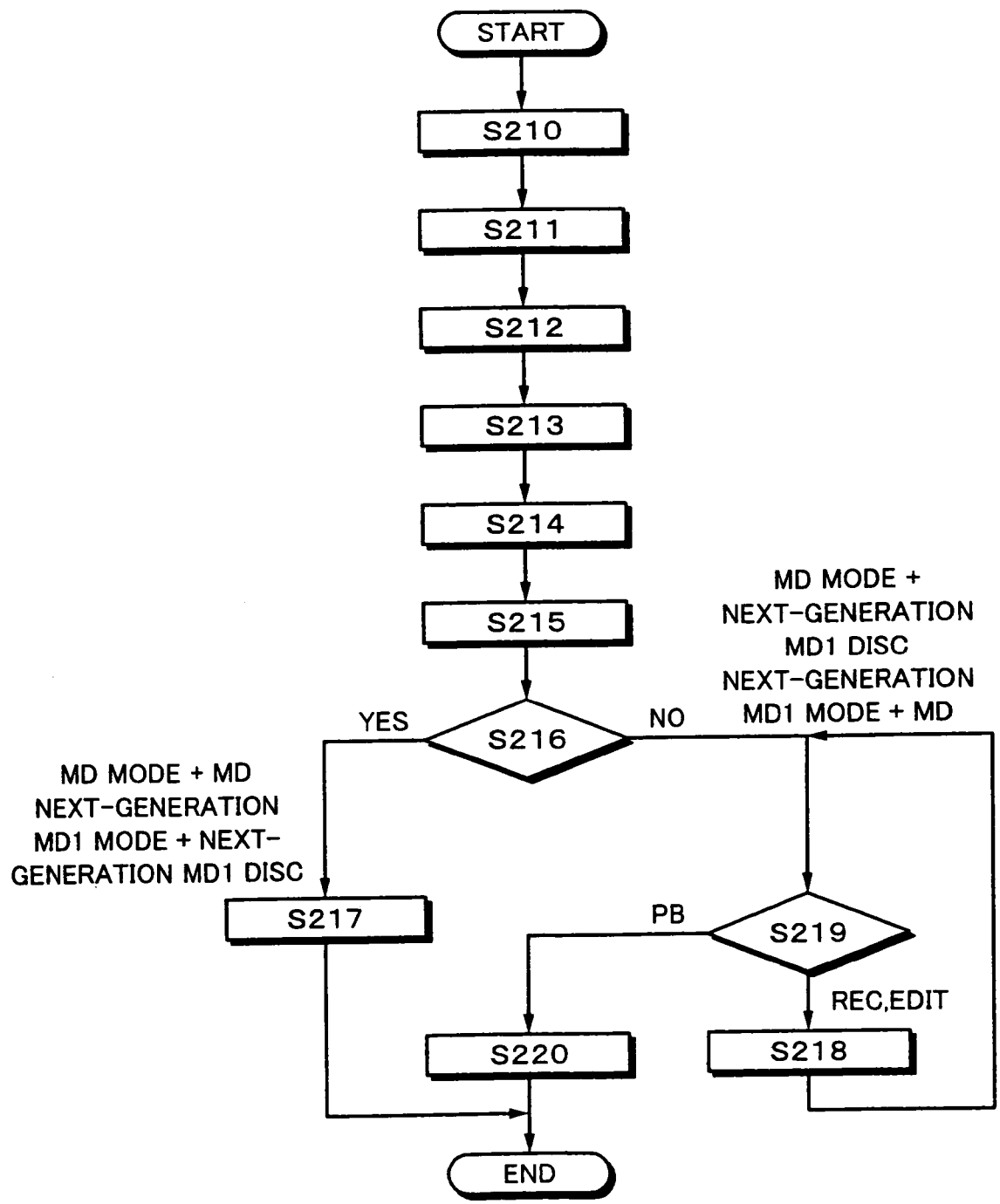
FIG. 58 is a flowchart showing the operation of an example of the disc drive apparatus in the case of recording audio data onto the disc.

Subsequently, the operation of an example of the disc drive apparatus 1 at the time of recording the audio data onto the disc 90 will be described with reference to a flowchart of FIG. 58. In this case, processes are different in dependence on whether the operating mode of the main body of the disc drive apparatus 1 coincides with the type of disc 90 or not. The type of disc 90 is based on whether the formatting according to the next-generation MD1 system has been performed to the disc 90 or not.

In first step S210, the disc 90 is loaded into the disc drive apparatus 1. When the disc 90 is loaded, the U-TOC is read out subsequently to the lead-in area of the disc 90 in step S211.

In next step S212, the type of the loaded disc 90 is discriminated, that is, whether the disc 90 is a disc formatted by which one of the next-generation MD1 system and the existing MD system is discriminated on the basis of the information of the read U-TOC. For example, such discrimination can be made by checking whether the information of the FAT has been written into the U-TOC or not. Such discrimination can be also made by checking whether the information of the start position of the alert track has been written in the U-TOC or not.

The information indicative of the type of disc discriminated in step S212 is displayed on the display 51 in step S213. Further, the state of the loaded disc 90 is displayed on the display 51 in step S214 on the basis of the information read out from the U-TOC. For example, if the disc 90 is not the blank disc as a result of the discrimination result about whether the disc 90 is a blank disc or not, information such as disc name and track name is displayed. The rotation of the disc 90 is stopped in step S215.

In next step S216, whether the type of disc discriminated in step S212 coincides with the operating mode of the main body set by the switch 50 or not is discriminated. If they coincide, the processing routine advances to step S217.

That is, if the operating system has been set to the existing MD system by the switch 50 and the disc 90 is a disc according to the existing MD system or if the operating system has been set to the next-generation MD1 system by the switch 50 and the disc 90 is a disc formatted by the next-generation MD1 system, the processing routine advances to step S217.

In step S217, the apparatus is set into a mode in which the audio data can be recorded onto the disc 90 or the audio data can be reproduced from the disc 90. Naturally, an operation for editing the U-TOC can be also operated.

At this time, the media drive unit 2 is controlled by the system controller 9 in a predetermined manner on the basis of the discrimination result about the disc type in step S212 mentioned above. For example, a signal path corresponding to the modulation system of the discriminated disc type is selected by the selector 26. Thus, it is possible to automatically switch reproducing formats of demodulation systems which are different in dependence on the next-generation MD1 system and the existing MD system and reproduce the audio data. Switching between file systems which are different in dependence on the next-generation MD1 system and the existing MD system is also similarly made by the control of the system controller 9 based on the discrimination result about the disc type.

If it is determined in step S216 mentioned above that the disc type discriminated in step S212 does not coincide with the operating mode of the main body set by the switch 50, the processing routine advances to step S219.

That is, if the operating system has been set to the existing MD system by the switch 50 and the disc 90 is a disc formatted by the next-generation MD1 system or if the operating system has been set to the next-generation MD1 system by the switch 50 and the disc 90 is a disc according to the existing MD system, the processing routine advances to step S219.

The operation to the disc 90 by the user is discriminated in step S219. If the user executes the operation to reproduce (PB) the audio data recorded on the disc 90, the processing routine advances to step S220. The audio data recorded on the disc 90 is reproduced in accordance with the operation of the user in step S220.

As mentioned above, even if the disc type does not coincide with the operating mode of the main body set by the switch 50, the audio data recorded on the disc 90 can be reproduced irrespective of the setting of the switch 50.

That is, the media drive unit 2 is controlled by the system controller 9 in a predetermined manner on the basis of the disc type discriminated in step S212 mentioned above. For example, a signal path corresponding to the modulation system of the discriminated disc type is selected by the selector 26. Thus, it is possible to automatically switch the reproducing formats of the demodulation systems which are different in dependence on the next-generation MD1 system and the existing MD system and reproduce the audio data. The switching between the file systems which are different in dependence on the next-generation MD1 system and the existing MD system is also similarly made by the control of the system controller 9 based on the discrimination result about the disc type.

If the user executes the operation for recording (REC) the audio data onto the disc 90 or the operation for executing the erasure, edit, or the like (EDIT) of the recorded audio data in step S217, the processing routine advances to step S218. A message informing that the type of the disc 90 does not coincide with the operating mode of the main body is displayed on the display 51 in step S218. If the user executes the recording operation, a message informing that the data cannot be recorded is displayed. If the user executes the editing operation, a message informing that the data cannot be edited is displayed.

If the user executes the operation for rewriting the U-TOC as an editing operation during the reproduction also in step S217 mentioned above, a message informing that the type of the disc 90 does not coincide with the operating mode of the main body and a message informing that the data cannot be edited are displayed on the display 51, respectively.

When the disc type does not coincide with the operating mode of the main body set by the switch 50 as mentioned above, the operation to change the information recorded on the disc 90 is inhibited.

Subsequently, the format conversion of the disc 90 will be described. The format according to the next-generation MD1 system can be changed to the format according to the existing MD system or the format according to the existing MD system can be changed to the format according to the next-generation MD1 system.

Figure 59:
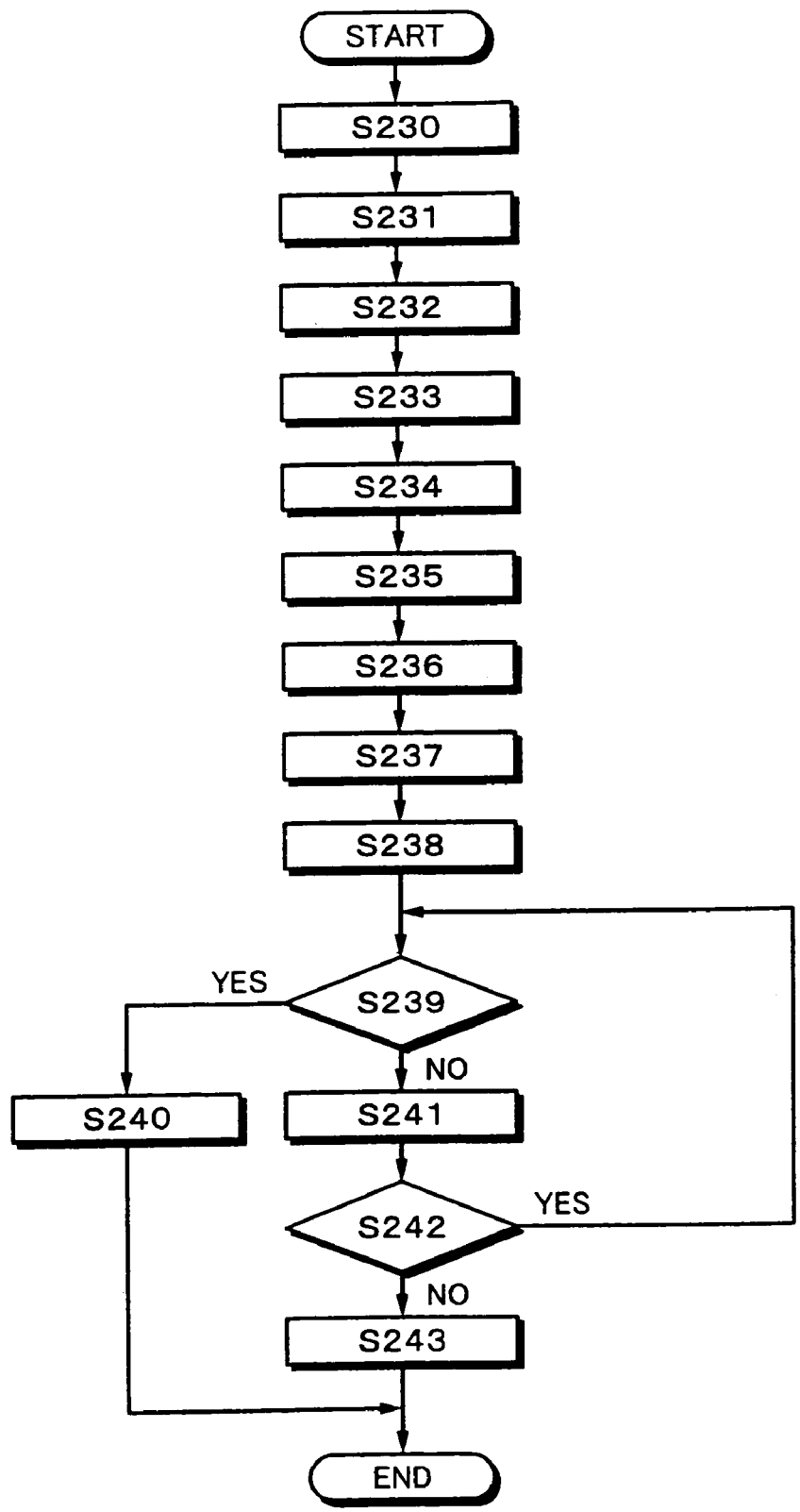
FIG. 59 is a flowchart showing a process of an example in which a format of the disc is changed from a format according to the next-generation MD1 system to a format according to the existing MD system.

FIG. 59 is a flowchart showing the process of an example in the case of changing the format of the disc 90 from the format according to the next-generation MD1 system to the format according to the existing MD system. It is now assumed that the switch 50 has been preset to the operating mode according to the next-generation MD1 system.

In first step S230, the disc 90 is loaded into the disc drive apparatus 1. When the disc 90 is loaded, the U-TOC is read out subsequently to the lead-in area of the disc 90 in step S231. It is determined that the loaded disc 90 is a disc formatted in accordance with the next-generation MD1 system (step S232). The rotation of the disc 90 is stopped in step S233.

In next step S234, all data managed by the FAT and recorded on the disc 90 is erased. For example, the operation for editing (EDIT) the data recorded on the disc 90 under the FAT management is executed and erasure of all data (ALL ERASE) is further selected from the editing operations by the user. In step S234, it is more preferable that a message for making the user confirm that all of the data recorded on the disc 90 is erased is displayed onto the display 51.

When all of the data recorded on the disc 90 under the FAT management is erased in accordance with the operation by the user, the message informing that the loaded disc 90 becomes a blank disc is displayed on the display 51 in step S235.

The processing routine advances to step S236. The switch 50 is operated by the user so as to set the operating mode of the main body to the operating mode of the existing MD system. Thus, the U-TOC of the loaded disc 90 is read out in next step S237. It is discriminated that the disc is a disc formatted according to the next-generation MD1 system (step S238).

In next step S239, the message informing that the loaded disc 90 is a blank disc of the next-generation MD1 system is displayed on the display 51. Subsequently, a message to confirm whether the user cancels the format according to the next-generation MD1 system or not is displayed. That is, the cancellation of the format according to the next-generation MD1 system denotes that, that is, the format of the disc 90 is changed from the format according to the next-generation MD1 system to the format according to the existing MD system.

If the cancellation of the format is instructed on the basis of the operation by the user, the processing routine advances to step S240. The format of the loaded disc 90 according to the next-generation MD1 system is cancelled. For example, the format is cancelled by erasing the FAT information recorded in the U-TOC and the alert track. The format of the next-generation MD1 system can be also cancelled by erasing only the alert track without erasing the FAT information.

If an instruction indicating that the format is not cancelled is made on the basis of the operation by the user in step S239 mentioned above, the processing routine advances to step S241. In step S241, a message to urge the user to set the switch 50 so as to change the operating mode of the main body to the operating mode according to the next-generation MD1 system is displayed on the display 51.

If the user operates the switch 50 within a predetermined time from such a display so as to change the operating mode of the main body to the operating mode according to the next-generation MD1 system (step S243), a series of processes is finished. The loaded disc 90 can be used as a blank disc formatted by the next-generation MD1 system (step S243). If the setting of the switch 50 is not performed within a predetermined time after the display, it is determined that the time-out has occurred. The processing routine is returned to step S239.

The process for changing the format from the format of the existing MD system to the format of the next-generation MD1 system is executed as follows. The mode of the main body is set to the operating mode of the existing MD system by the switch 50. All of the audio data recorded on the disc 90 in the format according to the existing MD system is erased. After that, the disc 90 is formatted by the next-generation MD1 system by the foregoing method by using FIG. 18.

According to the invention, music data is stored in an audio data file. A header is provided for the audio data file. A title, decrypting key information, and copyright management information are recorded in the header and index information is also provided. The index divides a music piece of one track into a plurality of pieces.

A track information file is a file in which various information for managing the music data stored in the audio data file has been described. The track information file comprises: a play order table (reproducing procedure table); a programmed play order table; a group information table (group information table); a track information table (track information table); and a name table.

The play order table is a table showing the reproducing order defined by a default. Information showing a link destination to a track descriptor of the track information table regarding each track number (music piece number) is stored in the play order table.

Information regarding each music piece is described in the track information table. The track information table comprises the track descriptor of each track (each music piece). A file pointer of an audio data file in which the music pieces have been stored, an index number, an artist name, a title name, original music piece order information, recording time information, and the like are described in each track descriptor.

When the number of the track to be reproduced is designated by the play order table, the track descriptor of the link destination is read out. The file pointer and index number of the music piece, pointers of the artist name and title name, the original music piece order information, the recording time information, and the like are read out from the track descriptor.

The audio data file is accessed from the file pointer of the music piece and information of the header of the audio data file is read out. If the audio data has been encrypted, the key information read out from the header is used. The audio data file is reproduced. At this time, if the index number has been designated, a position of the designated index number is detected from the information of the header and the reproduction is started from the position of the index number.

Thus, the audio data can be efficiently managed by using a disc similar to the MD.

The invention claimed is:

1. A recording medium on which each independent data is recorded, comprising:
    a single file storing area in which said respective data is recorded as a single file;
    a position information recording area in which a position information file showing a recording position of each of said data in said single file is recorded; and
    a parts information recording area in which a parts information file having parts information that identifies each of said data and is associated with the position information in said position information file and decrypting information corresponding to each of said data is recorded.

2. A recording medium according to claim 1, wherein said position information file has a start position of the recording and an end position of the recording of each of said data in said single file.

3. A recording medium according to claim 1, further comprising an association information recording area in which association information associated with said data is recorded, and
    said position information file further has link information for associating each of said data with said association information.

4. A reproducing method of reproducing designated recording data recorded on a recording medium, comprising the steps of:
    reading out decrypting information of said designated recording data and position information recording position information showing a recording position of position information read out from a position information file in which said position information showing a recording position of said designated recording data has been recorded from a recording data information file;
    reading out the position information from said position information file on the basis of said read-out position information recording position information; and
    reading out said designated recording data from a single file on the basis of said position information from the recording medium on which a plurality of recording data has been managed and recorded as a single file and decrypting the read-out recording data on the basis of said read-out decrypting information.

5. A reproducing method according to claim 4, wherein said position information recorded in said position information file has a start position of the recording and an end position of the recording of the recording data stored in said single file.

6. A reproducing method according to claim 4, wherein association information associated with said data is further recorded in said recording medium, and
    the association information associated with said designated recording data is further read out on the basis of link information for associating said recording data which has further been recorded in said recording data information file with said association information.

7. A reproducing method according to claim 4, wherein said designated data is further divided into a plurality of parts and recorded into said single file,
    said position information further has link information for designating said divided parts, the divided parts are coupled on the basis of said link information, and the designated data is reproduced.

8. A reproducing apparatus for reproducing designated recording data recorded on a recording medium, comprising:

recording data information file reading means for reading out decrypting information of said designated recording data and position information recording position information showing a recording position of position information read out from a position information file in which the position information showing a recording position of said designated recording data has been recorded from a recording data information file;

position information reading means for reading out the position information from said position information file on the basis of said read-out position information recording position information; and decrypting and reproducing means for reading out said designated recording data from a single file on the basis of said position information from the recording medium on which a plurality of recording data has been managed and recorded as a single file and decrypting the read-out recording data on the basis of said read-out decrypting information.

9. A reproducing apparatus according to claim 8, wherein said position information recorded in said position information file has a start position of the recording and an end position of the recording of the recording data stored in said single file, and said recording data is read out on the basis of said recording start position and said recording end position.

10. A reproducing apparatus according to claim 8, wherein association information associated with said data is further recorded in said recording medium, and the association information associated with said designated recording data is further read out on the basis of link information for associating said recording data which has further been recorded in said recording data information file with said association information.

11. A reproducing apparatus according to claim 8, wherein said designated data is further divided into a plurality of parts and recorded into said single file, said position information further has link information for designating said divided parts, the divided parts are coupled on the basis of said link information, and the designated data is reproduced.

12. A recording method of recording inputted data onto a recording medium, comprising the steps of:

encoding the inputted data and recording the encoded data so as to be coupled with a recorded data file;

recording management information of the data file with which said encoded data has been coupled and which has been recorded on said recording medium on the basis of an end position of the recording of said encoded data;

recording coupling position information of said coupled encoded data onto the recording medium; and recording a parts number for designating the coupling position information of the coupled encoded data which is recorded into a coupling position information file in which a plurality of coupling position information is recorded and encoding information at the time when the encoding is executed.

13. A recording method according to claim 12, wherein in said encoding, predetermined encryption is executed to said inputted data.

14. A recording method according to claim 12, wherein association information which is associated with said data and inputted is recorded, and link information showing association of said associating method and said coupled data is further recorded.

* * * * *

UNITED STATES PATENT AND TRADEMARK OFFICE
CERTIFICATE OF CORRECTION

| | |
|---|---|
| PATENT NO. | : 7,301,856 B2 |
| APPLICATION NO. | : 10/508536 |
| DATED | : November 27, 2007 |
| INVENTOR(S) | : Manabu Kii et al. |

It is certified that error appears in the above-identified patent and that said Letters Patent is hereby corrected as shown below:

Column 34, line 16, after "track" insert --.--

Signed and Sealed this

Eighth Day of July, 2008

JON W. DUDAS
*Director of the United States Patent and Trademark Office*